United States Patent [19]
Anthony et al.

[11] Patent Number: 5,805,452
[45] Date of Patent: Sep. 8, 1998

[54] SYSTEM AND METHOD FOR MATERIALS PROCESS CONTROL

[75] Inventors: William S. Anthony, Greenville; Richard K. Byler, Stoneville, both of Miss.

[73] Assignee: The United States of America as represented by the Secretary of Agriculture, Washington, D.C.

[21] Appl. No.: 691,069

[22] Filed: Aug. 1, 1996

[51] Int. Cl.[6] .................................................... G06F 19/00
[52] U.S. Cl. .................... 364/470.13; 19/66 CC; 364/470.14; 364/156
[58] Field of Search ................. 364/470.01, 470.13, 364/470.14, 470.15, 468.05–468.1, 148, 156, 470.1; 395/207, 208; 19/66 R, 66 CC, 200, 300; 57/264, 265; 705/7, 8

[56] References Cited

U.S. PATENT DOCUMENTS

| | | | |
|---|---|---|---|
| 3,922,642 | 11/1975 | Tooka | 364/154 X |
| 4,698,766 | 10/1987 | Entwistle et al. | 364/468.06 X |
| 4,807,108 | 2/1989 | Ben-Arieh et al. | 364/468.06 X |
| 5,282,141 | 1/1994 | Faas et al. | 364/470.13 |
| 5,361,450 | 11/1994 | Shofner et al. | 19/66 R |
| 5,517,404 | 5/1996 | Biber et al. | 364/470.1 X |

*Primary Examiner*—Joseph Ruggiero
*Attorney, Agent, or Firm*—M. Howard Silverstein; Joseph A. Lipovsky; John D. Fado

[57] ABSTRACT

System and method for optimizing the processing of materials, particularly the processing of cotton in a cotton gin or a textile mill. Cotton moisture, color, and foreign matter measurements are made with electronic sensors at three stations. For a gin, a dynamic programming model uses input information relative to the moisture and trash content, color, lint turnout, staple length, cotton price structure, and energy costs to select an optimum drying and cleaning sequence for the cotton. The dynamic programming model optimizes cotton producer profits by selecting the amount of gin machinery necessary to achieve the most beneficial market value while minimizing the machinery used. Automated directional valves are used to route the cotton through the selected optimum combination of seed cotton cleaners, multi-path driers, and lint cleaners. For a mill, algorithms are used to select an optimum mill machine sequence that maximizes lint quality, and automated directional values are used to route lint through the selected sequence of cleaners.

31 Claims, 23 Drawing Sheets

Microfiche Appendix Included
(3 Microfiche, 291 Pages)

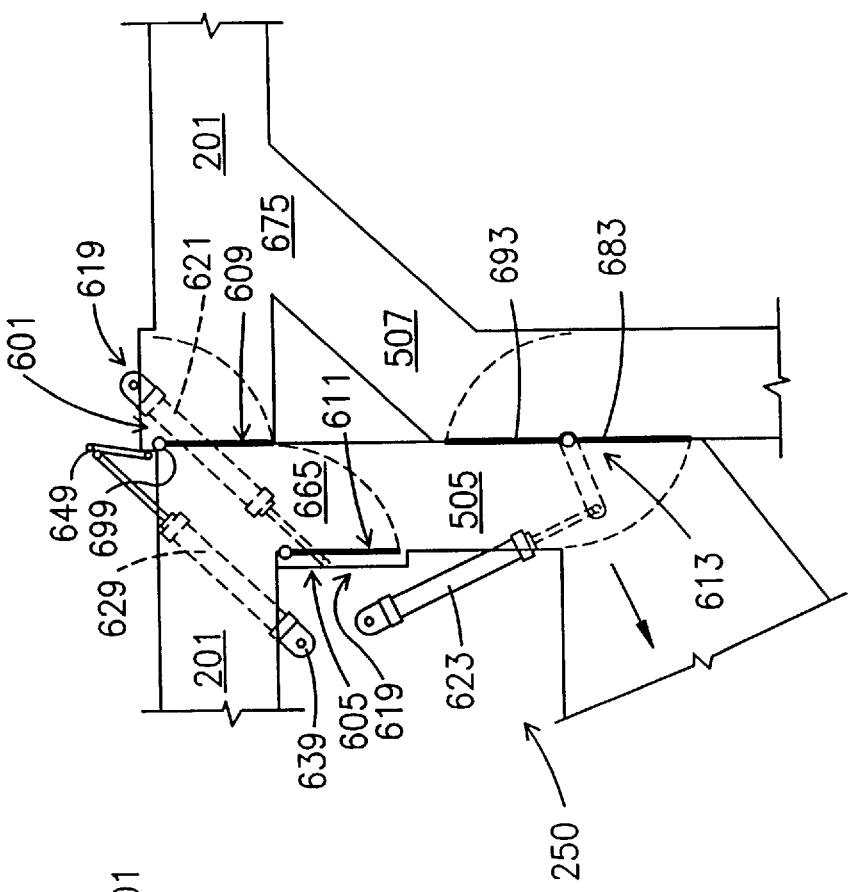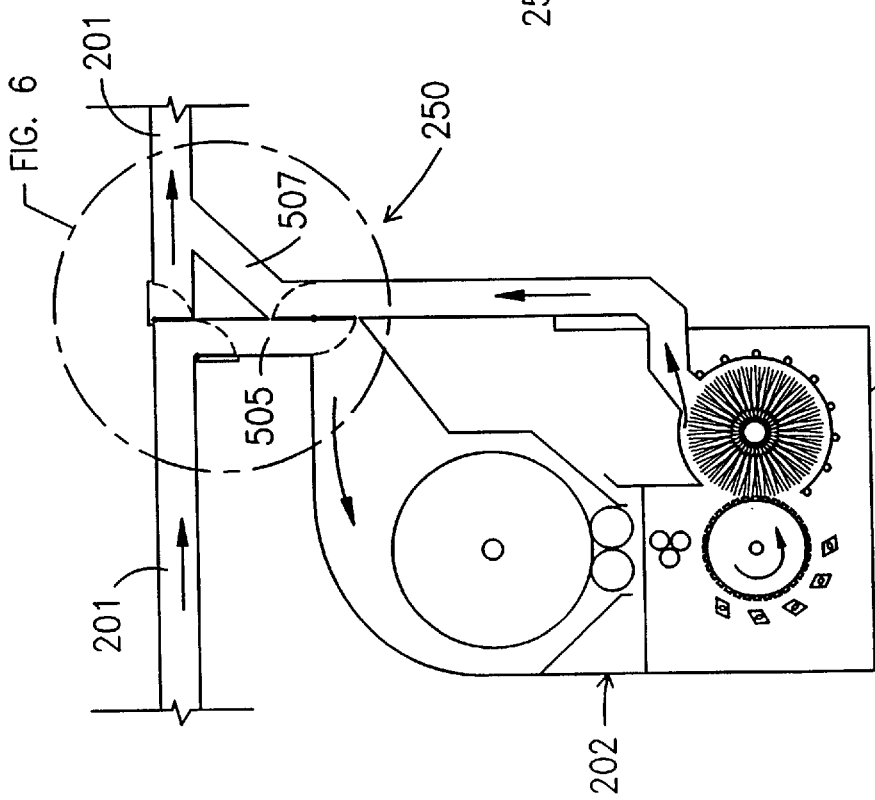

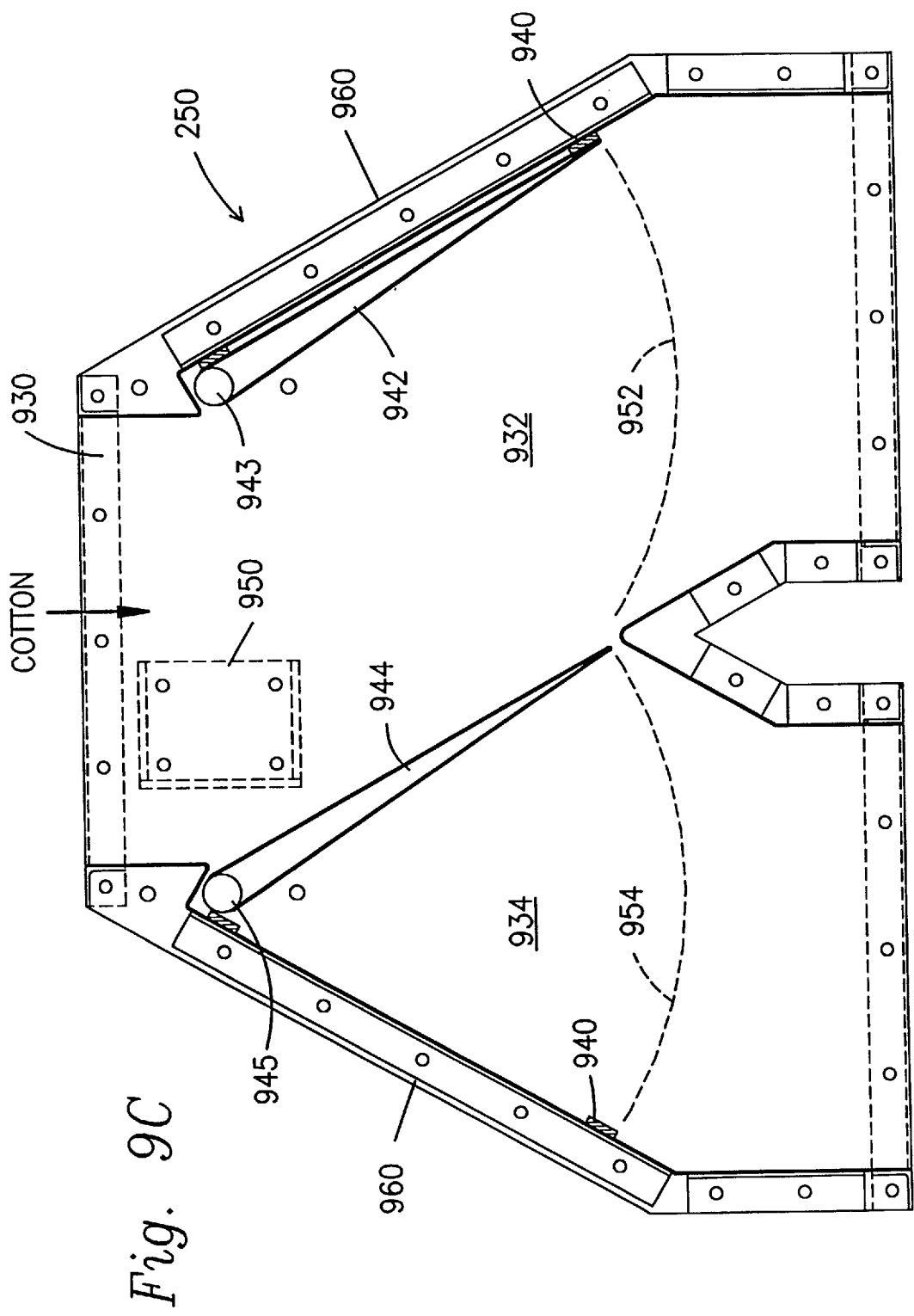

```
     MACHINE SEQUENCES                    ENTRY  EXIT   BYPASS  FILTER  WEIGHT       MEASUREMENT
     ABCDEFGHIJKLMNOPQRSTUVWXYZ           TIME   TIME   TIME    TIME    %            STATIONS
                YYYYYYYY
1D1                                        4.61  1.45    0.00    4.00   0.50
1D2         YYYY                           4.81  1.96    0.00    4.00   0.50              #1
1D3      YYYY                              5.01  5.64    1.08    4.00   0.50       RATE    1.00
                                                                                   FILTER  4.00
                        YYYYYYYY Y
CC1                 YYYYY         YYYY Y   8.73  2.63    1.67    4.00   0.50
SM1                                       13.15  1.50    0.38    4.00   0.50              #2
                                                                                   RATE    1.00
      YY     YY    YY    YY                                                        FILTER  4.00
2D1   Y      Y     Y     Y     Y          16.60  0.89    0.00    4.00   0.50       ENTRY  30.11
2D2   Y      Y     Y     Y                16.80  2.05    0.00    4.00   0.50       WEIGHT  0.01
2D3                                       17.00  5.29    1.21    4.00   0.50

CC2                                Y      22.71  2.46    0.34    4.00   0.50              #3
IC1      YYY     YYY   YYY    YYY  Y      25.38  2.47    1.03    4.00   0.50       RATE    1.00
                                                                                   FILTER  4.00
LC1    YY YY YY YY YY YY   YYY            31.98  2.70    0.01    5.00   0.50       ENTRY  33.48
LC2    Y   Y   Y  Y  Y  Y  YY             32.29  2.70    0.01    5.00   0.50       WEIGHT  0.01
LC3                         YY            32.48  2.61    0.01    5.00   0.50
F1

EXIT GIN CONFIGURATION FILE: GINGFG.DAT
```

*Fig. 15*

Current Date/Time: Tue Feb 06 07:48:04 1996    Elapsed Time: 0:02:17

MEASUREMENT STATION #1   Rd 61.8   +b 5.2   Code 61   Area 88   Count 55   Code 8
 Filtered Reading: Moisture 8.48   Color 31   Trash 76
 Error Feedback:             - 0.00        + 0.00         - 0.0
FIRST STAGE   Machine Sequence V   CC1 Y   SM1 Y   CC2   IC1 Y
              Dryer Sequence F    1D1     1D2    1D3 Y  2D1     2D2    2D3

MEASUREMENT STATION #2   Rd 56.3   +b 6.38   Code 31   Area 54   Count 31   Code 5
 Filtered Reading: Moisture 6.38   Color 31   Trash 84
 Error Feedback:             +0.14        +0.00         +1.4
 Predicted Value:             9.75                      31              84
SECOND STAGE  Machine Sequence C   LC1 Y   LC2 Y   LC3

MEASUREMENT STATION #3   Rd 73.9   +b 10.1   Code 32   Area 9   Count 6   Code 1
 Filtered Reading: Moisture 8.97   Color 32   Trash 106
 Predicted Value:             6.75                      31                       94

F1        Decision Matrix File:        C:MODALL70.DAT
EXIT      Gin Configuration File:      C:GINCFG.DAT
          Simulated Data File:         C:87350.SML

Fig. 17A

F1=Main Menu;   F2=+Bale N;   F3=–Bale N;   F4=Ba/Cal
CURRENT COLOR %AREA MOISTURE

| | Color | %AREA | MOISTURE | |
|---|---|---|---|---|
| Station 1 | 61-4 | 1.2 | 8.2 | Flapper Closed |
| Station 2 | 51-2 | 0.8 | 6.0 | Flapper Closed |
| Station 3 | 41-1 | 0.4 | 5.5 | Flapper Closed |

Last 8 Bales

| Bale No. | Before L.C. | | After LC | | Moisture | | |
|---|---|---|---|---|---|---|---|
| | Color | LF | Color | LF | 1# | 2# | 3# |
| 43273 | 41 | 4 | 31 | 3 | 8.4 | 5.9 | 5.5 |
| 43272 | 51 | 5 | 41 | 4 | 8.3 | 5.9 | 5.4 |
| 43271 | 51 | 5 | 42 | 4 | 8.4 | 5.8 | 5.4 |
| 43270 | 51 | 5 | 41 | 4 | 8.1 | 5.8 | 5.5 |
| 43269 | 61 | 6 | 41 | 4 | 8.0 | 5.9 | 5.5 |
| 43268 | 61 | 6 | 51 | 5 | 8.1 | 5.8 | 5.6 |
| 43267 | 61 | 6 | 51 | 5 | 8.1 | 5.8 | 5.6 |
| 43266 | 61 | 6 | 51 | 5 | 8.0 | 5.9 | 5.6 |

Working On Station 1

01/01 12:00:00

Gin 1 -[1] Lint cleaners
Gin 2 -[1] Lint cleaners
Gin 3 -[1] Lint cleaners

[T] Cleaners Recommended

| %AREA | Leaf |
|---|---|
| 0.0 – 0.1 | 2 |
| 0.2 – 0.3 | 3 |
| 0.4 – 0.5 | 4 |
| 0.6 – 0.8 | 5 |
| 0.9 – 1.2 | 6 |
| 1.3 – 2.3 | 7 |
| > 2.3 | 8 |

Fig. 17B

OPTIMUM GINNING DECISIONS
INPUT STATES

| OPR | DEC | SLF | SM | SRD | STO | SLN | SPB |
|---|---|---|---|---|---|---|---|
| DRI | 4 | 6.00 | 14.00 | 56.00 | 38.00 | 1.10 | 7.80 |
| CCI | 1 | 6.00 | 8.50 | 56.00 | 35.91 | 1.10 | 7.80 |
| STMCH | 1 | 5.70 | 8.50 | 57.20 | 35.71 | 1.10 | 7.73 |
| ICI | 1 | 5.45 | 8.50 | 57.92 | 35.44 | 1.10 | 7.71 |
| DR2 | 0 | 5.12 | 8.50 | 58.95 | 35.24 | 1.10 | 7.67 |
| CC2 | 1 | 5.12 | 8.50 | 58.95 | 35.24 | 1.10 | 7.67 |
| IC2 | 1 | 4.77 | 8.50 | 60.03 | 35.03 | 1.10 | 7.65 |
| GINSTD |  | 4.77 | 8.50 | 60.03 | 35.03 | 1.10 | 7.65 |
| LC | 0 | 4.77 | 8.50 | 63.52 | 35.63 | 1.12 | 7.86 |
| OUTPUT |  | 4.77 | 8.50 | 63.52 | 35.63 | 1.12 | 7.86 |

Final Color = 51    Selling price = $67.00    Final value = $23.87

Fig. 18

SYSTEM AND METHOD FOR MATERIALS PROCESS CONTROL

A portion of the disclosure of this patent document contains material which may be subject to copyright protection. The copyright owner has no objection to the facsimile reproduction by anyone of the patent disclosure, as it appears in the Patent and Trademark Office patent files or records, but otherwise reserves all copyright rights whatsoever.

MICROFICHE APPENDIX

This application includes a computer program listing microfiche appendix that contains 3 microfiche and a total of 291 frames.

BACKGROUND OF THE INVENTION

1. Field of the Invention

The present invention relates generally to a system and method for processing materials, particularly agricultural solids such as cotton. More particularly, the present invention relates to a system and method for optimizing the processing of cotton in a cotton gin.

1. Related Art

Cotton quality after ginning is a function of its initial quality as well as the type and degree of cleaning and drying that it receives during the gin process. The term "cotton" is generally used to refer to either seed cotton or lint. Seed cotton has the fibers or lint attached to the cottonseed, and is usually referred to as "seed cotton". After the fiber is removed from the cottonseed, it is usually referred to as "lint". Ginning includes drying, trash removal from seed cotton, lint-seed separation, trash removal from lint, and bale packaging. Processing cotton in a gin is an intricate task that proceeds at rates as high as 150,000 pounds per hour. Cotton ginning systems consist of several different types of processing machines, and each machine influences several physical properties of the cotton fiber (lint).

The efficiency of the ginning process is strongly influenced by the quantity of moisture and trash that the cotton contains. Cotton contains varying amounts of trash and moisture, and is of varying colors. However, most cotton in the United States is conventionally processed through the same machines in a standard sequence, regardless of the level of trash in the cotton or the cotton color. The amount of drying received by the cotton is also relatively constant, regardless of the actual moisture content of the cotton. Therefore, in conventional cotton processing, some cotton may be over-dried, or processed through more cleaners than necessary for the level of trash in the cotton. Conventional cotton processing does not account for variations in the cotton being processed. This can result in decreased fiber quality, and increased costs and/or processing time.

One way to optimize the cotton processing sequence is to bypass certain machines, such as driers, seed cotton cleaners, and lint cleaners, that may not be necessary for the particular cotton being processed. However, in a conventional ginning system, physical properties of the cotton, such as trash content, moisture content and color, are not continuously measured as the cotton is processed in the gin. Further, no system or method exists for determining the optimal processing sequence for cotton, or for carrying out such a sequence. Additionally, changing the number of cleaners used in a conventional cotton ginning system requires downtime for the ginning system, as well as labor costs for changing the valve configurations in the system. At least five minutes is required to change the valves on a single gin stand lint cleaner device. A gin typically has three or more sets of lint cleaners in parallel processing lines. There is also the potential for malfunctions that arise when the valves are manually changed. Other gin machines and driers do not routinely have bypass valves, requiring that valves be provided.

To bypass a machine such as a lint clearer, in a conventional ginning system, the flow of cotton is stopped through the gin stand that immediately precedes the lint cleaner. The valves to the machine to be bypassed are then closed, usually manually, and then the bypassed machine is stopped. To put the bypassed machine back on-line, the process must be reversed. In order to bypass a machine such as a seed cotton cleaner or drier, all of the preceding machines must be stopped. The flow of cotton is stopped throughout the entire system, for a period of several minutes so that the seed cotton cleaner valves can be manually changed. Once the machines are ready for operation, the valves to the bypassed machines are then opened, restoring flow to the bypassed machines.

A conventional ginning system does not continuously measure the physical properties of the cotton as it is being processed, and is not capable of determining the gin machine sequence that optimizes processing of cotton having those physical properties. An operator of a conventional ginning system cannot readily assess the need to alter the gin machine sequence to optimize cotton processing. Further, in a conventional ginning system, it is not possible to bypass a machine, or to divert the flow of entrained cotton to an auxiliary treatment unit outside the primary flow through the ginning system, without stopping the flow of cotton throughout the system. Further, bypassing machines in a conventional ginning system is slow, requires operator intervention, and requires repeated starting and stopping of the machines as they are bypassed or brought back on-line.

Thus, there is a need for an automated system that measures the physical properties of the materials as they are being processed, determines the optimum processing sequence for the materials, and implements the optimum processing sequence.

SUMMARY OF THE INVENTION

In one aspect of the present invention, a computer program product is provided that comprises a computer useable medium having computer program logic or software recorded thereon for enabling a processor in a computer system to control the processing of cotton through a gin to produce lint. The computer program logic enables the processor to measure sensor data that correspond to color, moisture content, and trash content of the cotton as it enters the gin. The computer program logic enables the processor to generate a gin decision matrix that includes optimum process control decisions that maximize net return from the lint as a function of the input state of the cotton entering the gin. The computer program logic enables the processor to select an optimum process control decision from the gin decision matrix for an input state corresponding to the measured sensor data. The optimum process control decision corresponds to an optimum gin machine sequence for cotton with the measured input state. The processor is enabled by the computer program logic to implement she optimum process control decision by routing cotton through the optimum gin machine sequence. The computer program logic also enables the processor to compute and store predicted values for color, moisture content, and trash content for the cotton after processing through a first portion of the optimum gin machine sequence.

The gin decision matrix may be generated using a plurality of tabular transition functions. The gin decision matrix may also be generated using an algorithm for each gin machine in the optimum gin machine sequence. Each algorithm and tabular transition function quantifies the effect of that gin machine on leaf trash, moisture content, reflectance (Rd), turnout, length, and yellowness (+b).

The computer program logic of the present invention may also enable the processor to measure second sensor data that correspond to color, moisture content, and trash content of the cotton after it has been processed through the first portion of the optimum gin machine sequence. The processor may also be enabled to compare the second sensor data to the predicted values to generate an error, and to adjust the optimum gin machine sequence and the predicted values to compensate for the error.

The computer program logic of the present invention may also enable the processor to measure lint sensor data that correspond to color, moisture content, and trash content of the cotton after it has been processed through a second portion of the optimum gin machine sequence. The processor may also be enabled to compute and store second predicted values for color, moisture content, and trash content for the cotton after processing through the second portion of the optimum gin machine sequence. The computer program logic may also enable the processor to compare the lint sensor data and the second predicted values to generate a second error, and to adjust the second portion of the optimum gin machine sequence and the second predicted values to compensate for the second error.

In a further aspect of the present invention, a program storage device readable by a machine is provided. The program storage device embodies a program of instructions executable by the machine to perform method steps for processing cotton through a gin to produce lint. The method steps include: measuring sensor data at a measurement station that correspond to color, moisture content, and trash content of the cotton at the measurement station; determining an optimum gin machine sequence for cotton entering the gin based on a physical state of the cotton at the measurement station that corresponds to the sensor data so that the optimum gin machine sequence maximizes net return from the lint; and routing the cotton through the optimum gin machine sequence. The measurement of sensor data may be performed at the measurement station as the cotton enters the gin, after the cotton has been processed through a first portion of the optimum gin machine sequence, or after the cotton has been completely processed through the optimum gin machine sequence.

The program storage device of the present invention may include an error feedback feature that may include the following method steps: measuring second sensor data at a second measurement station that correspond to color, moisture content, and trash content of the cotton after it has been processed through a first portion of the optimum gin machine sequence; computing and storing predicted values for color, moisture content, and trash content for the cotton after processing through the first portion of the optimum gin machine sequence; comparing the second sensor data to the predicted values to generate an error; and adjusting the optimum gin machine sequence and the predicted values to compensate for the error.

The program storage device of the present invention may also include a second error feedback feature that may include the following method steps: measuring lint sensor data that correspond to color, moisture content, and trash content of the cotton after it has been completely processed through said optimum gin machine sequence; computing and storing second predicted values for color, moisture content, and trash content for the cotton after processing completely through the optimum gin machine sequence; comparing the lint sensor data to the second predicted values to generate a second error; and adjusting a second portion of the optimum gin machine sequence and the second predicted values to compensate for the second error.

In yet a further aspect of the present invention, a control system is provided that controls the processing of cotton through a gin to produce lint. Such a gin has a plurality of auxiliary treatment units and a duct through which entrained cotton flows. The control system of the present invention comprises measuring means for measuring sensor data that correspond to color, moisture content, and trash content of the cotton. Processing means are coupled to the measuring means. The processing means processes the sensor data, and selects a set of the plurality of auxiliary treatment units in the gin through which the cotton is processed to produce lint. The set selected by the processing means corresponds to an optimum gin machine sequence that maximizes net return from the lint.

Each of the auxiliary treatment units in the gin is equipped with a cotton diversion means that is coupled to the processing means. The processing means activates the cotton diversion means to divert cotton to flow through each of the auxiliary treatment units in the selected set. The processing means deactivates the cotton diversion means to bypass each of the auxiliary treatment units that are not in the selected set.

The control system of the present invention may also include second measuring means coupled to the processing means for measuring sensor data that correspond to color, moisture content, and trash content of the cotton as it enters a second stage. This second stage may be a ginning stage, or a lint cleaning stage for which lint clearer sensor data is measured. A third measuring means may also be provided for measuring color, moisture content, and trash content of the lint after processing by the set of auxiliary treatment units. The control system of the present invention may also be provided with cotton diversion means in the form of automated directional valves for controlling the flow of cotton through the set of auxiliary treatment units.

In still a further aspect of the present invention, a control system is provided for controlling the processing of lint through a mill that has a plurality of auxiliary treatment units and a duct through which lint flows. The control system includes measuring means for measuring sensor data that correspond to color, moisture content, and trash content of the lint. Processing means coupled to the measuring means is provided for processing the sensor data. The processing means selects a set, from the plurality of auxiliary treatment units, through which the lint is processed to produce lint of a predetermined quality. The set corresponds to an optimum mill machine sequence.

The control system also includes lint diversion means coupled to each of the auxiliary treatment units and coupled to the processing means. The processing means activates the lint diversion means to divert lint to flow through each of the auxiliary treatment units in the set. The processing means deactivates the lint diversion means to bypass each of the auxiliary treatment units not in the set.

In yet a further aspect of the present invention, a program storage device is provided that embodies a program of instruction to perform method steps for processing input material through a processing plant to produce processed material. The method steps comprise measuring sensor data at a measurement station that correspond to a physical state of the input material at the measurement station; determining an optimum processing machine sequence for input material entering the processing plant based on the physical state of the input material at the measurement station that corresponds to the sensor data, the optimum processing sequence maximizing net return from the processed material; and routing the input material through the optimum processing machine sequence.

Features and Advantages

A feature of the present invention is that it optimizes materials processing to maximize monetary return to producers, while minimizing the amount of machinery used and preserving quality of the materials.

A further feature of the present invention is that it provides for automated control of the gin process. The present invention has the added feature that the degree of automated control can be selected by the ginner, and customized for a particular gin.

It is yet a further feature of the present invention that it provides a real-time display to the ginner of physical properties of the cotton as it is being processed. The display also advises the ginner of the machinery sequence being used to process the cotton. The display may be located within the gin itself, as well as at other locations remote from the gin.

A still further feature of the present invention is that it can be adapted for use with fluid-entrained materials other than cotton, such as seeds, man-made fibers, or pharmaceuticals.

A still further feature of the present invention is that it provides instantaneous directional changes in the flow of fluid-entrained materials, particularly air-entrained cotton.

Yet a further feature of the present invention is that it can be adopted for use in a textile mill to control the processing and cleaning of lint to maximize quality of the lint.

An advantage of the present invention is that only the necessary machinery will be used to process a particular run of cotton, thereby saving on energy costs and minimizing waste and damage to the cotton by eliminating unnecessary processing steps. Cotton fiber quality and profitability are improved.

A further advantage of the present invention is that it can be installed in an existing gin, as well as be included in the design of a new gin.

Still another advantage of the present invention is that the flow of cotton or other solids can be diverted without stopping the flow or shutting down machinery to carry out a manual valve changing operation.

A still further advantage of the present invention is that the flow of cotton can be diverted as necessary for cotton cleaning to provide cotton with an appropriate level of foreign matter and color. When cleaning is not necessary, the cleaning machines can be bypassed without stopping the machinery or the flow of cotton through the primary processing system.

A still further advantage of the present invention is that the continuous redirection of the flow of cotton occurs without choking a cotton duct in a ginning system.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 5 shows a partial view of a ginning system in which the automated directional valves of the present invention are installed with a lint cleaner;

FIG. 6 is an expanded view of the automated directional valves of the present invention;

FIGS. 9A–9D show alternate embodiments of the automated directional valves of the present invention;

FIG. 15 shows a screen display for editing a gin configuration file;

FIG. 17a shows one embodiment of a screen display for the process control system of the present invention;

FIG. 17b shows an alternate embodiment of a screen display for the process control system of the present invention;

FIG. 18 shows an output of optimum ginning decisions from a dynamic programming model of the present invention;

DETAILED DESCRIPTION OF THE EMBODIMENTS

Overview

The present invention is designed for use in a system that processes fluid-entrained materials. The invention will be described herein with reference to a ginning system that processes air-entrained cotton. In a ginning system equipped with the present invention, physical properties of the cotton are analyzed to determine the optimum ginning sequence to maximize return to cotton producers while producing cotton having desired fiber properties.

The present invention evaluates the physical properties and quality parameters of cotton before, during, and after the ginning process. Measurements of cotton color, moisture content, and trash content are made at three stations in the ginning system. A dynamic programming model uses these measurements, as well as information relative to staple length, lint turnout, cotton price structure, and energy cost to generate a matrix of optimum drying and cleaning sequences. The dynamic programming model optimizes producer profits by selecting the amount of gin machinery necessary to achieve the most beneficial market value, yet minimize the machinery used. The dynamic programming model uses the market price structure for cotton, and the performance characteristics for each gin machine, to determine optimum machinery sequences. The decision at each stage of processing depends on the state of the cotton entering that stage. Once the solution to the total problem has been obtained, the decisions can be related to the state of cotton when it enters the gin. Thus, the optimum decision at each stage: processing can be determined from the initial state of the cotton. The objective is to maximize the net return from the lint; i.e., the revenue from the lint minus the costs of the ginning operation. Any revenues or costs that do not vary with the processing decisions (e.g., revenue from seed and operating costs of the gin stand) are not included in the dynamic programming model because they do not affect the optimum decision. The present invention allows a ginner to process each increment of cotton through the minimum machinery necessary to achieve maximum returns, rather than processing all cotton identically.

Figure 2:
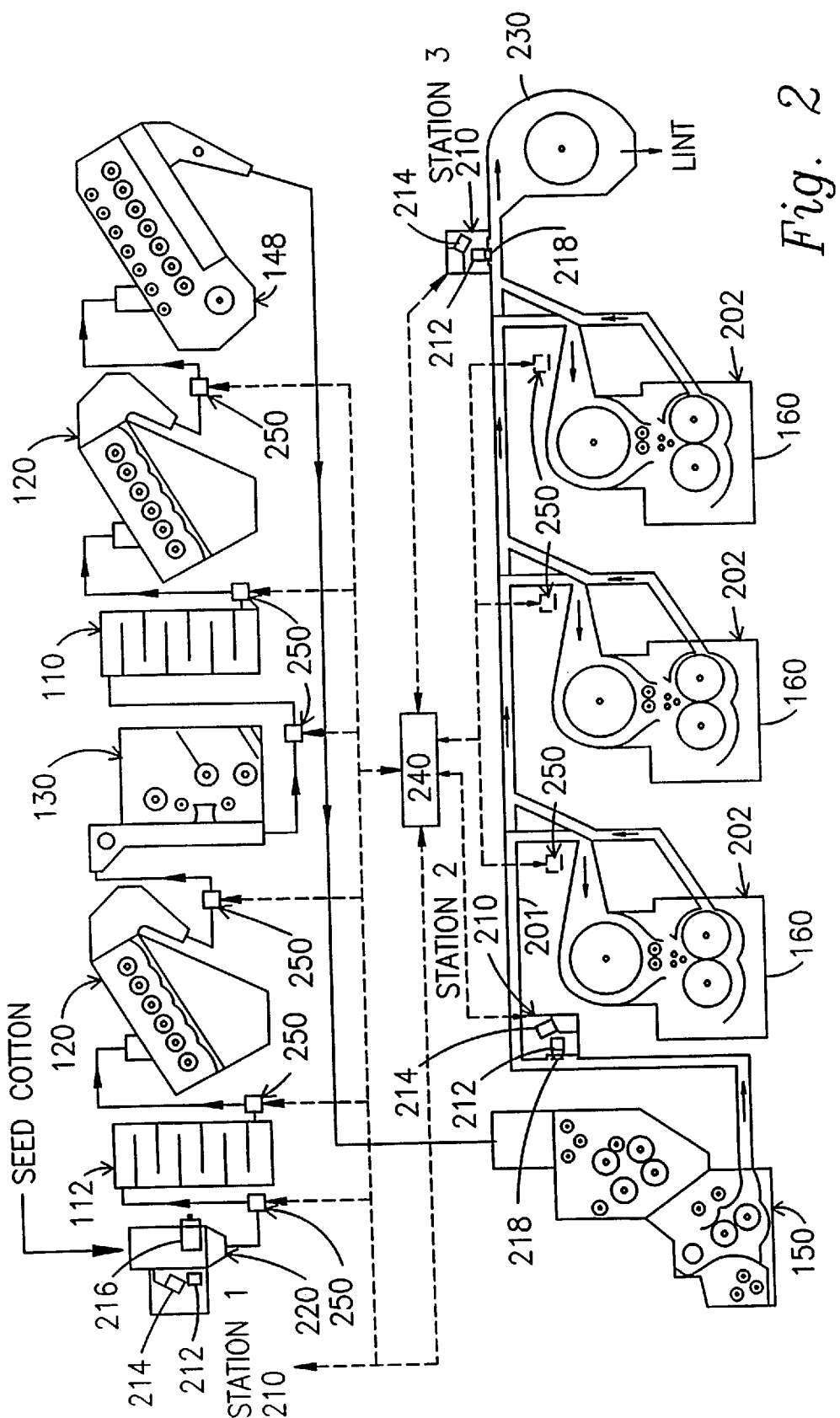
FIG. 2 shows a schematic of a small-scale ginning system in which the present invention is installed.

Multiple fiber quality factors such as moisture content, color grade (yellowness and greyness), and trash content (area, number, shape, and type of trash particles) are measured before the gin process (Station 1 in FIG. 2). These measurements are used to ascertain the optimum seed cotton cleaning machinery, and drying temperature and exposure time, to produce specifically desired fiber properties that maximize monetary returns to cotton producers. Color is subdivided into two components for use in the process control system of the present invention: yellowness (+b) and reflectance (Rd). Color, trash, and moisture sensors are installed perpendicularly to the flow of cotton. The cotton is forced to pause for a finite time period (typically approximately 1 second) as a sample collection means compresses the cotton against the sensors to provide a uniform measurement surface in a continuous, automatic, batch-type process. Electrical signals are transmitted from the sensors to a computer system for processing and storage.

Predicted values of each measured fiber property are stored in the computer system for subsequent comparison of the predicted value with the actual value after cleaning and drying of the seed cotton. The change in other common fiber properties such as fiber length, length distribution, uniformity, neps (small entanglements of cotton fibers), short fiber content, micronaire, seed coat fragment size and weight, strength, upper quartile length, mean length, coefficient of variation length, elongation, lint turnout, etc. is estimated and recorded.

A second measurement station (Station 2 in FIG. 2) is used midway through the ginning system. A third measurement station (Station 3 in FIG. 2) is used after all cleaning, ginning, and drying has occurred to determine the final quality of the cotton, to provide error feedback to Station 2, and to provide data that may be used in making machinery decisions. Samples of cotton are captured at Stations 2 and 3, and analyzed with sensors similar to those at Station 1. Measurement data obtained at Stations 1, 2, or 3 may be used by the computer system to determine the optimum gin processing sequence for the cotton being processed. The computer system is configured to selectively activate and deactivate cotton diversion means to individually control flow through each of the selected machines in the optimum gin processing sequence. For example, a clean cotton needs almost no cleaning to achieve its best possible grade. As such, the process control system of the present invention would determine which machines were not needed, and would bypass those cleaners.

The present invention diverts the flow of cotton through the selected combination of gin processing machines by controlling valves, such as the automated directional valves disclosed herein. The valves are configured to provide for complete flow stoppage, or unrestricted flow. The opening and closing of the valves are sequentially controlled to allow cotton to clear the individual machines.

System Description

Figure 1:
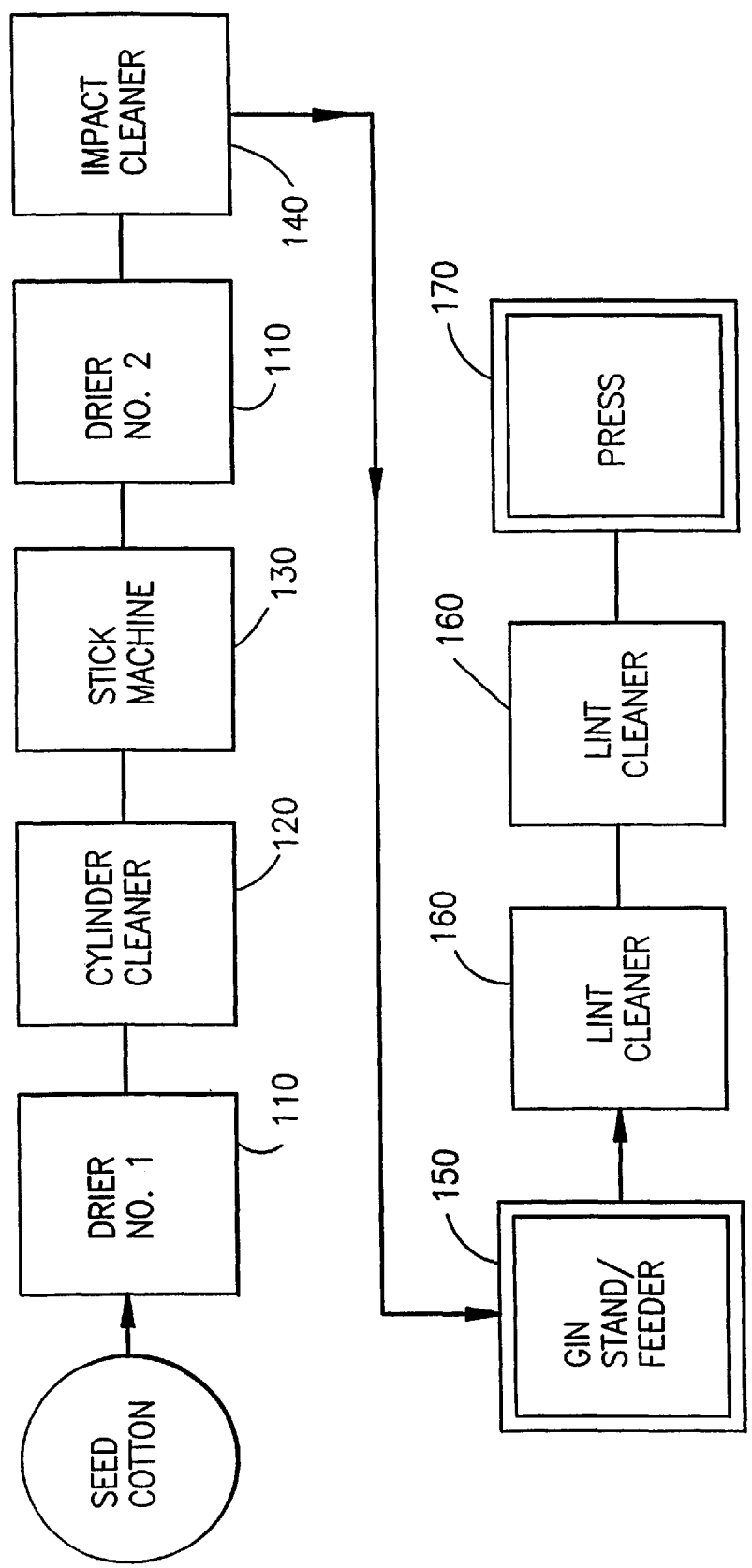
FIG. 1 shows typical processing stages for a cotton ginning system.

Typical processing stages for a cotton ginning system are shown in FIG. 1. The stages associated with a gin stand/feeder 150 and a bale press 170 are always required; the stages associated with the other illustrated machinery are optional. The ginning machinery combination recommended by the U.S. Department of Agriculture (USDA) includes two seed cotton driers 110, three seed cotton cleaners, gin stand, and two lint cleaners 160. The seed cotton cleaners typically include one or more cylinder cleaners 120, one or more stick machines 130, and one or more impact cleaners 140. The processing machinery illustrated in FIG. 1 is conventional in the gin processing industry, and the configuration and operation of the machinery is known to one of skill in the relevant art. A description of this machinery can be found, for example, in *Cotton Ginners Handbook*, USDA, Agricultural Handbook Number 503, December 1994, the entirety of which is incorporated herein by reference.

Most cotton in the United States is processed through the same standard USDA-recommended sequence of machines regardless of the trash level and cotton color. The amount of drying received by the cotton is also relatively constant regardless of the cotton's moisture content. Although the USDA-recommended ginning machinery sequence achieves satisfactory bale value and limits damage to the inherent quality of the fiber, it does not maximize the net cash value of each individual bale and minimize fiber damage.

The system and method of the present invention processes cotton through the minimum machinery necessary to achieve maximum returns. Rather than processing all cotton identically, the present invention provides for customized or prescription ginning of the cotton to preserve fiber quality and maximize monetary returns to cotton producers. A schematic of a small-scale ginning system in which the present invention is installed is shown in FIG. 2. The configuration shown in FIG. 2 has been provided for illustrative purposes only. A full-scale gin may include more or less machinery, or a different arrangement of machinery, than that illustrated in FIG. 2. It is to be understood that the present invention can be used with a variety of gin configurations, and is not limited to the configuration shown in FIG. 2. The ginning system of FIG. 2 includes a feed control 220 into which seed cotton is fed, two driers 110, two cylinder cleaners 120, stick machine 130, impact cleaner 140, extractor-feeder/gin stand 150, and three lint cleaners 160. At the end of the machinery sequence is a condenser 230 from which lint is expelled.

The ginning system of FIG. 2 is equipped with the process control system of the present invention which includes a computer system 240. The function and operation of computer system 240 is explained more fully below in Section 3 (Computer Program Implementation of the Preferred Embodiment).

Figure 4:
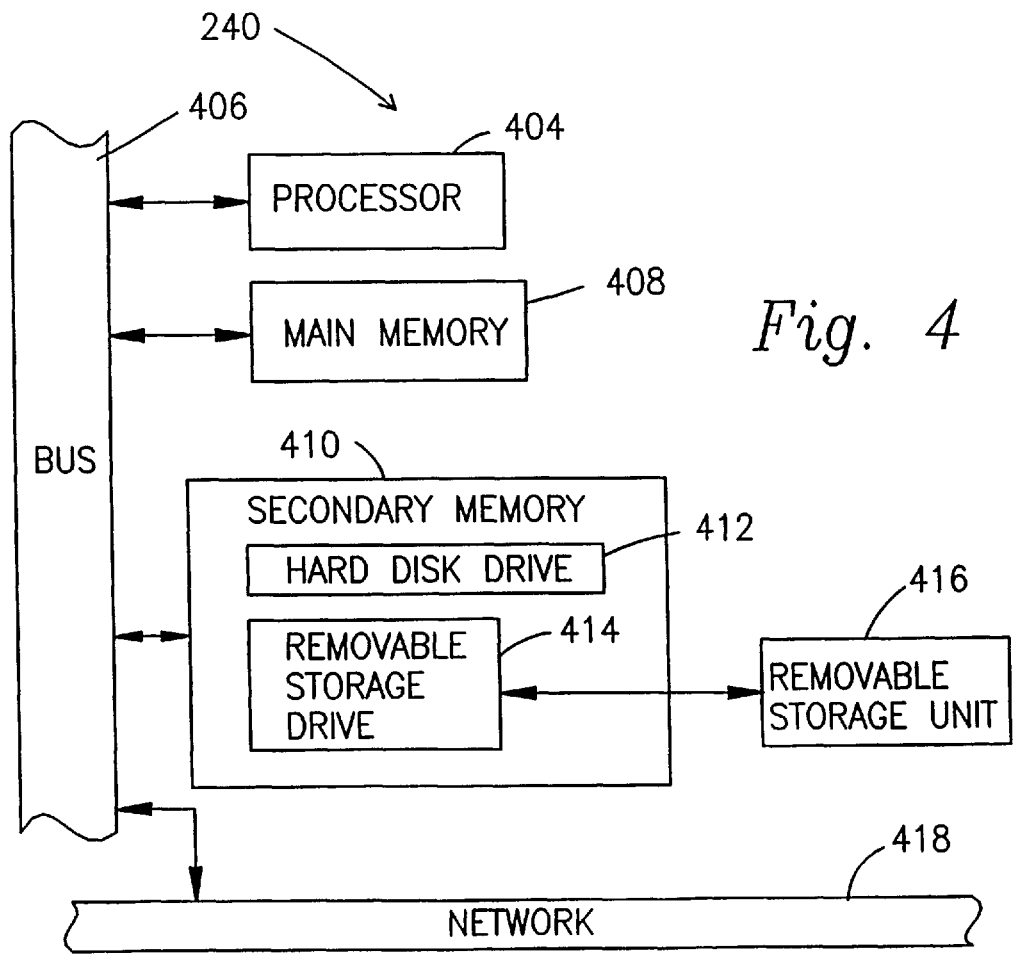
FIG. 4 shows an exemplary computer system suitable for use with the present invention.

An exemplary computer system 240 for use in the process control system of the present invention is shown in FIG. 4. In a preferred embodiment computer system 240 is a microcomputer such as an IBM-PC. Computer system 240 preferably includes a display, keyboard, and input/output circuitry suitable for interfacing with measuring means 210 and cotton diversion means 250. Computer system 240 includes one or more processors, such as processor 404. Processor 404 is connected to a communication bus 406. Computer system 240 may communicate with other similarly configured computer systems or with a display (not shown) via a network 418, such as an ETHERNET local area network.

Computer system 240 also includes a main memory 408, preferably random access memory (RAM), and a secondary memory 410. Secondary memory 410 includes, for example, a hard disk drive 412 and/or a removable storage drive 414, representing a floppy disk drive, a magnetic tape drive, a compact disk drive, etc. Removable storage drive 414 reads from and/or writes to a removable storage unit 416 in a well known manner.

Removable storage unit 416, also called a program storage device or a computer program product, represents a floppy disk, magnetic tape, compact disk, etc. As will be appreciated, removable storage unit 416 includes a computer usable storage medium having stored therein computer software and/or data.

Computer programs (also called computer control logic) are stored in main memory 408 and/or secondary memory 410. Such computer programs, when executed, enable computer system 240 to perform the features of the present invention as discussed herein. In particular, the computer programs, when executed, enable processor 404 to perform the features of the present invention. Accordingly, such computer programs represent controllers of computer system 240.

In one embodiment, the invention is a computer system operating according to software. In another embodiment, the invention is a computer program product having control logic which causes the computer to operate as discussed herein.

In another embodiment, the present invention is implemented primarily in hardware using, for example, a hardware state machine. Implementation of the hardware state machine so as to perform the functions described herein would be apparent to persons skilled in the relevant arts.

Computer system 240 is used to measure cotton characteristics at three measurement stations, shown as Stations 1, 2, and 3 in FIG. 2. Each station contains measuring means 210 for taking moisture, color, and foreign matter (trash) measurements on samples of cotton being processed. Station 1 evaluates seed cotton, whereas Stations 2 and 3 evaluate lint. Each of measuring means 210 includes a moisture meter 214 to measure moisture content of the cotton, and a camera 212 to measure color and trash content. Suitable cameras include the "Color/Trash Meter" camera made by Motion Control, Inc., and a similar device made by Spinlab, Inc., both now owned by Zellweger Uster. Suitable moisture sensors include infrared moisture sensors, such as those made by Infrared Engineering, Inc. or Moisture Systems Corporation. Resistance moisture sensors may also be used. A particularly preferred resistance moisture sensor is described in U.S. Pat. No. 5,514,973, the entirety of which is incorporated herein by reference.

The three channels of data from the three cameras 212 shown in FIG. 2 are connected to a video multiplexer, such as model DT2859 made by Data Translation of Marlboro, Mass. The multiplexer connects one of the eight input lines on the board with an output line under control of computer system 240. The appropriate camera 212 for a measurement is selected through the multiplexer. The output of the multiplexer is connected to a frame grabber, such as model HRT256 made by Catenary Systems of St. Louis, Mo. The frame grabber converts a video frame to a set of digital pixel values that indicate light and dark areas of the image. Foreign material normally appears darker than the surrounding cotton fibers. The number of pixels which are dark compared to the neighboring pixels are counted to determine count data. The percent of the total number of pixels which are dark is used as the percent area of trash. The color meter is an instrument with two light sensors covered with different filters that approximate the ICI Standard Observer tristimulus values of Y and Z. The light sensors with filters produce a voltage that is calibrated to correspond to Y and Z. The Y and Z values are converted to the Nickerson-Hunter Rd (reflectance), +b (yellowness), and color code and quadrant values for cotton lint. One such transformation is contained in the COLORF.C file (discussed in more detail in Section 3.a.ii. below) in the attached microfiche appendix. The digital values of percent area trash, Rd, and +b are input to computer system 240 for processing and analysis.

Figure 20:
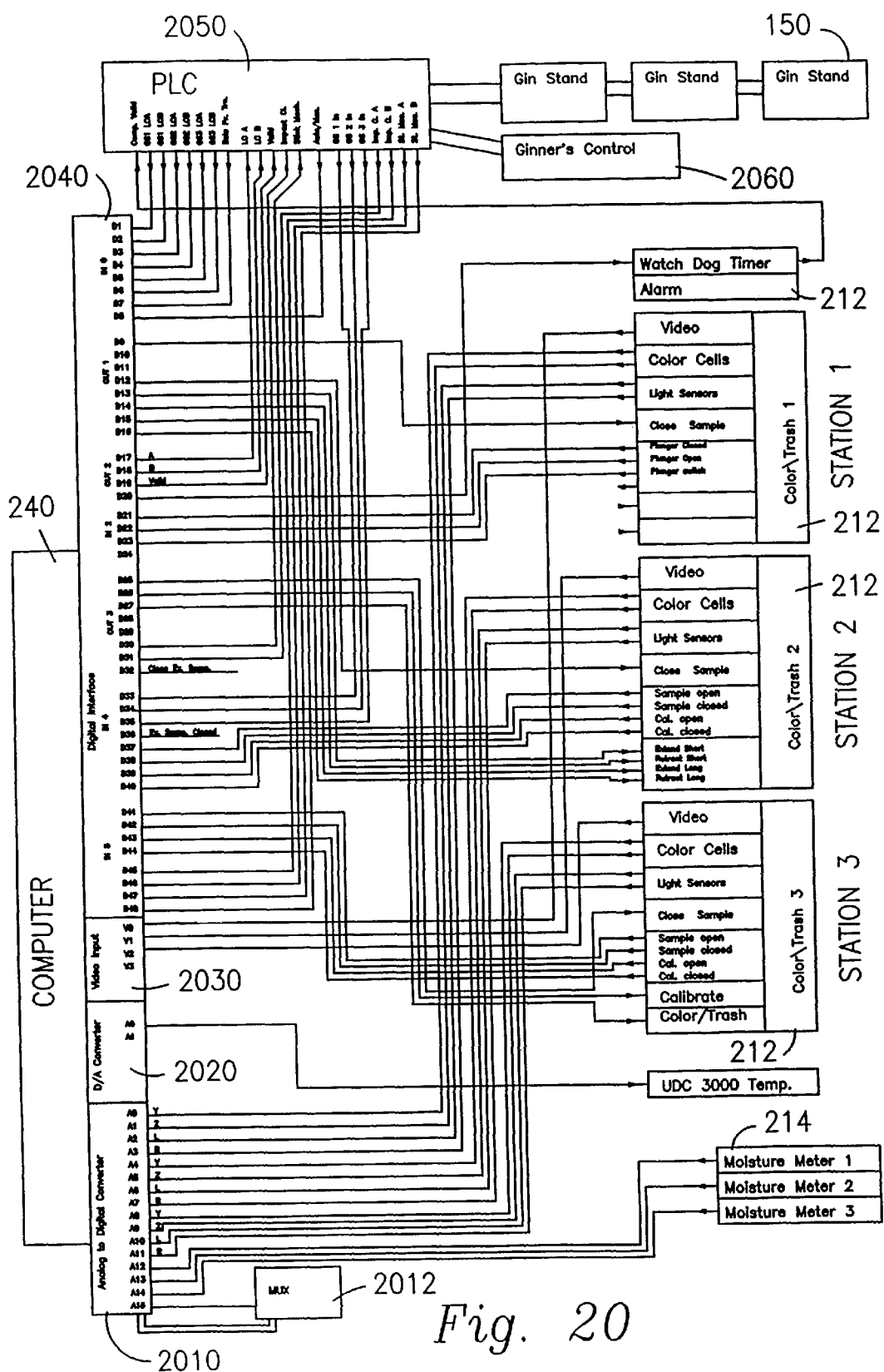
FIG. 20 illustrates one embodiment of a hardware interface suitable for use with the process control system of the present invention.

Turning now to FIG. 20, one embodiment of a hardware interface to computer system 240 is shown. The input to computer system 240 from the three cameras 212 of Stations 1, 2, and 3 is represented by video input lines V0, V1, and V2, respectively, of a video input 2030. The video multiplexer and frame grabber referred to above are contained within video input 2030. In a preferred embodiment, a digital interface 2040 is provided that consists of two 24-bit input/output (I/O) ports. These two 24-bit I/O ports are identified as lines D1 through D48 of digital interface 2040. In a particularly preferred embodiment, one 24-bit I/O port is the PIO (programmable input/output) portion of a CIO-DAS16 board available from ComputerBoards, Inc., Mansfield, Mass. The other 24-bit I/O port is preferably a Computer Boards CIO-DIO24 board. The 24 PIO lines from each of the digital I/O boards are connected to a ComputerBoards SSRRACK24 containing 24 optoisolator modules. The optoisolator modules isolate computer system 240 from dangerous voltages associated with the digital I/O system, and are available from Gordos or OPTO22. The 24 PIO lines from each of the digital I/O boards can be programmed for either input or output on each line, and the optoisolator modules are available for either input or output.

A digital-to-analog (D/A) converter 2020 is provided, and in a preferred embodiment is part of the CIO-DAS16 board. D/A converter 2020 may be used, for example, to control the temperature of the burners in drier 110. The burners in a drier are typically controlled by a burner control that is configured to receive an analog input. To change the temperature of the burners, the voltage is adjusted on line A0 of D/A converter 2020. The burner control then raises or lowers the temperature of the burners based upon this analog input.

The analog inputs to computer system 240 are captured with an analog-to-digital (A/D) converter 2010, such as the 12-bit A/D converter that is part of the CIO-DAS16 board. The two color output channels and two light level channels from each of the three measurement stations (cameras 212) are connected to A/D converter 2010. The color cells include two lines, Y and Z. The light level sensors include two additional lines, L and R. These four lines from each of the three measurement stations are input to A/D converter 2010 (lines A0 through A11). The analog output of the three moisture meters 214 is connected to A/D converter 2010 (lines A12 through A14). In other embodiments, a digital output from moisture meter 214 is used, and is input to computer system 240 as a digital, rather than analog, input.

An analog multiplexer 2012, such as CIO-EXP32, connects to the CIO-DAS16 board. Analog signals representing the temperature of the burners in drier 110 can be connected to analog inputs on analog multiplexer 2012.

The sampling of cotton at the three measurement stations is controlled by computer system 240 through digital interface 2040. As explained more fully below, sample collection means is used to capture a sample of cotton for measurement at each of the three measurement stations. This is achieved through the "close sample" line at Stations 1, 2, and 3 (D9, D12, and D25, respectively). Proximity sensors or switches are installed at each measurement station so that the position of the sample collection means (open, closed, or neither) can be measured by computer system 240 through digital interface 2040. As shown in FIG. 2 and discussed below, Station 1 uses a plunger or compression-ram type of sample collection means. Alternatively, Station 1 can be configured with a paddle-sampler type of sample collection means, as shown in FIG. 2 for Stations 2 and 3. The position of this sample collection means is input to computer system 240 on the lines labeled "Plunger Closed", "Plunger Open", and "Plunger Switch" (D21, D22, and D23). Stations 2 and 3 are shown in FIG. 2 as configured with a "flapper" or paddle-sampler type of sample collection means. Stations 2 and 3 can alternatively be configured with a compression-ram type of sample collection means. Such a configuration is useful when Station 2 is located above the feeder shown in the lower left corner of FIG. 2. The position of the paddle sampler shown in FIG. 2 at Stations 2 and 3 is input to computer system 240 through the lines labeled "sample open" and "sample closed". The position of the paddle sampler used in connection with calibration at Stations 2 and 3 is input to computer system 240 through the lines labeled "cal. open" and "cal. closed".

FIG. 20 shows four output lines from digital interface 2040 (D13–D16) that are input to Station 2. These lines are used to extend and retract a short stroke air cylinder and a long stroke air cylinder. These air cylinders are used during calibration of the sensors, as described in U.S. Pat. No. 5,639,955.

In a preferred embodiment as shown in FIG. 20, a PLC (programmable logic controller) 2050 is used by computer system 240 to control the flow of cotton through the various gin machines. PLC 2050 is linked to a ginner's control panel 2060 that includes a switch for selecting the method of valve control to be used, either automatic control or manual control. If automatic control is selected, computer system 240 and PLC 2050 automatically control switching of the valves to configure the gin machinery in accordance with the optimum gin machine sequence that corresponds to the optimum process control decision. If manual control is selected, then the valve settings are switched by an operator to configure the gin machinery in accordance with the optimum gin machine sequence that corresponds to the optimum process control decision, or the desires of the ginner. PLC 2050 reads the setting of this switch on ginner's control panel 2060. As discussed below in Section 3.b., PLC 2050 is programmed to read this switch setting before initiating a change in the setting of the valves. In this manner, the degree of automated control can be selected by the ginner, and the system and method of the present invention can be customized for a particular gin.

The first line input to PLC 2050 is a computer valid line. This line is connected to a watch dog timer that is connected to line D20 of digital interface 2040. The watch dog timer switches the computer valid line to false if a monostable multivibrator is not reset by computer system 240. If the computer valid line is false, PLC 2050 defaults to a predetermined condition that safeguards the gin machinery.

The next two lines input to PLC 2050, LC A and LC B (D17 and D18), are used to request that either or both of two lint cleaners ("A" and/or "B") be placed on-line so that cotton is diverted to flow through them. The two lines input to PLC 2050 labeled Impact Cl. and Stick Mach. (D30 and D31, respectively) are used to control selection of the seed cotton cleaners (impact cleaner 140 and stick machine 130). Any combination of seed cotton cleaners (impact cleaners and stick machines) can be selected through D30 and D31. The line input to PLC 2050 labeled valid (D19) is used as a "handshake" line by computer system 240 to signal that the changes requested on the lint cleaner and seed cotton cleaner lines are valid. PLC 2050 is programmed to not output a change in selection of machinery while handshake line D19 is false. If a change to the selection of machinery is requested by computer system 240, the change will not be implemented (i.e., valve settings changed) until handshake line D19 returns to true.

The lines output from PLC 2050 to digital interface 2040 will now be described. Lines GS 1, 2, and 3 In (D33, D34, and D35, respectively) are used to indicate which of one or more gin stands is in position for ginning cotton. Lines D1 through D6 are used to input to computer system 240 the number of lint cleaners actually on-line and being used. This number may differ from the number of lint cleaners requested by computer system 240 for two reasons. First, the machinery may be malfunctioning and set off-line by the ginner. Second, the number of lint cleaners in actual use may differ from the number requested because automated control may have been disabled at ginner's control panel 2060. Line D8 input to digital interface 2040 identifies whether automated or manual control of the valves for routing cotton through the lint cleaners has been selected at ginner's control panel 2060. Line D7 provides an input from a proximity switch typically located on the bale press. This signal cycles once each time the bale press turns to indicate when the lint transitions from being placed in the current bale to being placed in the next bale. Lines D45 through D48 input the position of the four valves used to control the flow of cotton though the seed cotton cleaners (impact cleaners and stick machines).

One of the major problems with measuring physical characteristics of cotton while it is continuously moving in a ginning system is enhancing the density to such a point that a homogeneous surface is achieved in order to make accurate measurements. Inconsistent surface densities create shadows in the imaging process which greatly affects the color and trash readings of the camera. Infrared moisture measurements are also greatly affected by inconsistent surface density. Sensors that respond to changes in resistance and capacitance also respond strongly to surface and/or bulk density. The present invention uses two types of sample collection means to obtain a cotton sample, and to increase the density of the cotton to enable the instrumentation to measure more accurately.

The first type of sample collection means is a compression ram 216, installed at Station 1 (see FIG. 2). Compression ram 216 cyclically displaces a small mass of cotton from its pathway through feed control 220 toward one of the side walls, and presses the mass against the side wall so that the mass presents a face of uniform cotton density. The mass is then analyzed for color, trash content, and moisture content. These piston-type compression rams work extremely well in locations where cotton is moving very slowly such as at feed control 220. A particularly preferred compression-ram type of sample collection means is described in U.S. Pat. No. 5,125,279, the entirety of which is incorporated herein by reference.

Figure 3:
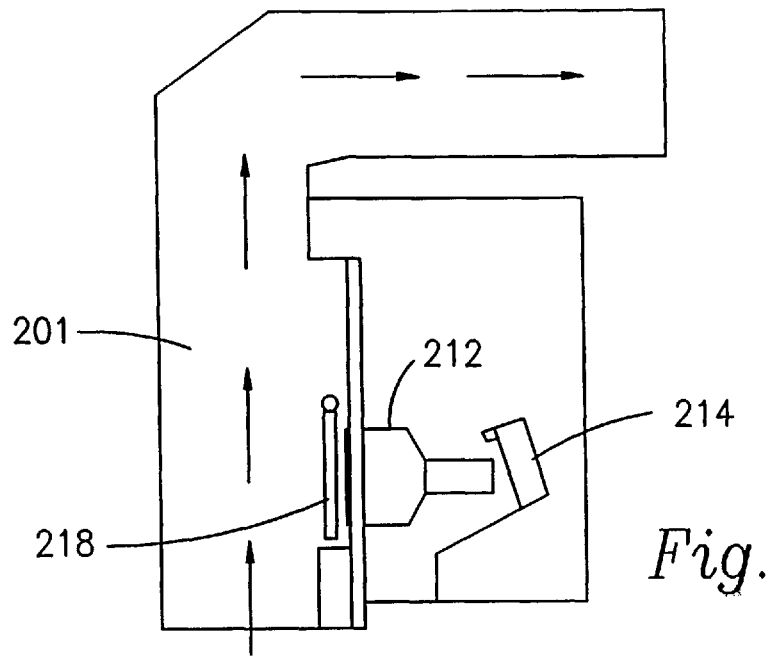
FIG. 3 shows an expanded view of a sample collection installation in FIG. 2.

A second type of sample collection means is a paddle sampler 218, installed at Stations 2 and 3. An expanded view of the installation of paddle sampler 218 at Station 2 is shown in FIG. 3. Paddle sampler 218 systematically grasps a quantity of cotton and compresses it against the sensors where measurements are made, and then releases the cotton back into the air stream. The degree of pressing or compression is such that the halted cotton presents a face of uniform density on that part of He cotton which is pressed against the sensor surface. The uniform density is sufficient to enable the mass to be accurately analyzed for color, trash content, and moisture content. The system is typically carried out in an intermittent or cyclic manner so that a different mass of cotton is pressed against the sensor surface at specific time intervals. After compression, the pressure is removed, and each mass is allowed to resume its pathway through a duct 201 (best seen in FIG. 3). As used herein, uniform cotton density means that the face of the mass which is pressed against the sensor surface is essentially filled with cotton and impurities, but with no voids. This enables an analyzer adjacent to the flattened face to make an analysis. Paddle sampler 218 is particularly suited for locations where cotton is moving rapidly, at speeds as high as 6,000 ft/min. A particularly preferred paddle-sampler type of sample collection means is described in U.S. Pat. No. 5,087,120, the entirety of which is incorporated herein by reference.

As explained more fully below in Section 3 (Computer Program Implementation of the Preferred Embodiment), computer system 240 uses the measurement data obtained from Stations 1, 2, and 3 to optimize the flow of cotton through the ginning system illustrated in FIG. 2. To control the routing of cotton through the various machines, computer system 240 controls the operation of cotton diversion means 250 associated with each machine. Cotton diversion means 250 is used to route cotton through the optimum drying and cleaning sequence between Stations 1 and 2. Cotton diversion means 250 is a so used to route cotton through the optimum cleaning sequence between Stations 2 and 3. Cotton diversion means 250 is used to divert cotton from duct 201 to flow through one or more auxiliary treatment units 202, which are shown in FIG. 2 as containing lint cleaner 160.

Cotton diversion means 250 diverts cotton to flow from duct 201, through auxiliary treatment unit 202, and return to duct 201. Each cotton diversion means 250 is coupled to and controlled by computer system 240. Computer system 240 activates cotton diversion means 250 to divert cotton to flow through auxiliary treatment unit 202, and deactivates cotton diversion means 250 to discontinue flow of cotton through auxiliary treatment unit 202. In the preferred embodiment, cotton diversion means 250 includes the automated directional valves described below.

A partial view of a ginning system in which the automated directional valves of the present invention are installed with one of several auxiliary treatment units is shown in FIG. 5. A conventional low pressure source, such as a fan (not shown), moves entrained cotton through duct 201. A diversion unit in the form of auxiliary treatment unit 202 is disposed adjacent duct 201. As illustrated in FIG. 5, auxiliary treatment unit 202 includes a lint cleaner, shown generally at 160. It is to be understood that auxiliary treatment unit 202 may include other types of cotton treatment machines, for example, a drier, a seed cotton cleaner, or an apparatus for moisture restoration, cotton combing, cotton blending, and the like.

A supply conduit 505, connected to duct 201 at a supply connection location 665, conveys cotton from duct 201 to auxiliary treatment unit 202. A return conduit 507, connected to duct 201 at a return connection location 675, returns treated cotton to duct 201. The connection of conduits 505 and 507 to duct 201, and the associated automated directional valves, are shown in more detail in FIG. 6.

Figure 7:
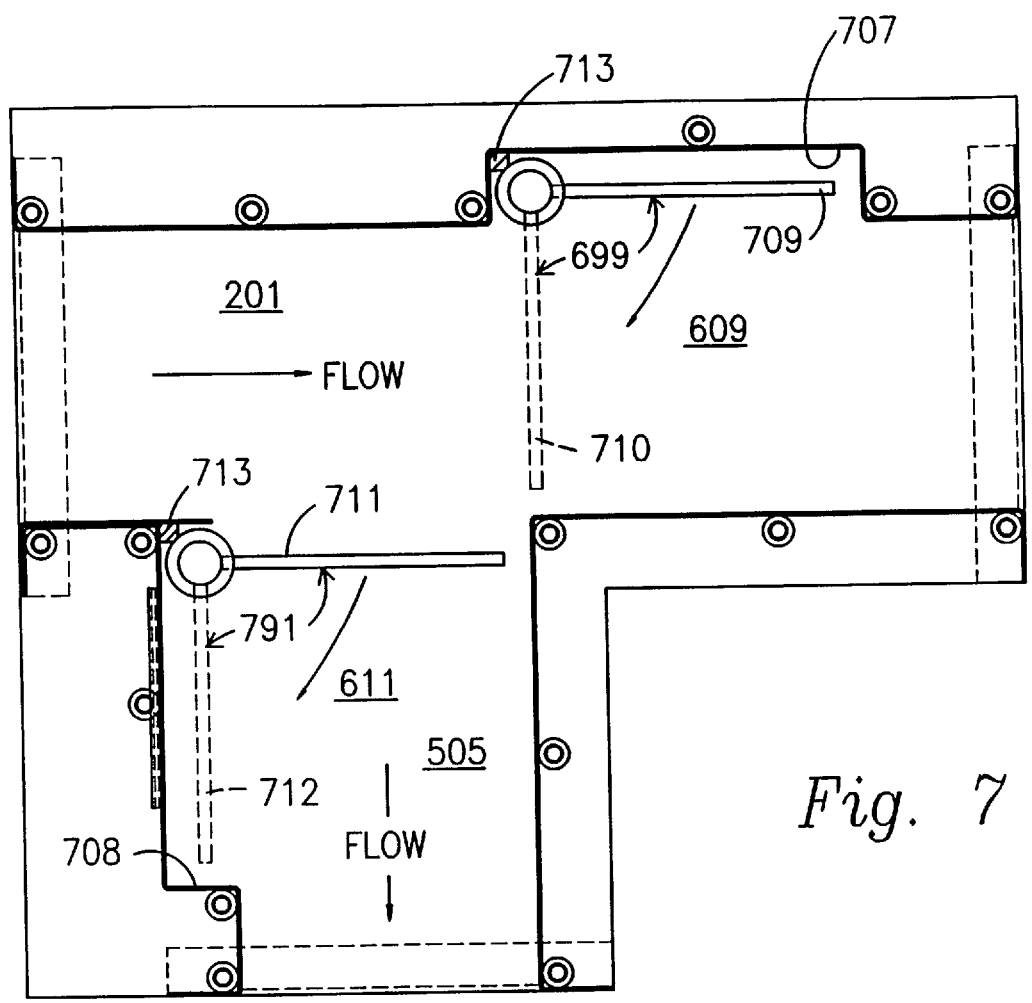
FIG. 7 is a further view of the automated directional valves shown in FIG. 6 that illustrates selected valve positions.

Turning now to FIG. 6, a duct valve for controlling the flow of cotton through duct 201 is shown generally at 609. Duct valve 609 is a leaf valve having a leaf 699, and is operated by an air cylinder 629. Air cylinder 629 includes a stationary end 639, and a movable end 649 connected to leaf 699. As best seen in FIG. 7, duct valve 609 is mounted so that leaf 699 may be positioned in a recess 707 in duct 201. Leaf 699 is recessed into duct 201 to prevent cotton from hanging on leaf 699.

The flow of cotton through supply conduit 505 is controlled by a supply valve 611. Supply valve 611 is also a leaf valve having a leaf 791 (see FIG. 7), and is operated by an air cylinder 621. As best seen in FIG. 7, leaf 791 is mounted in a recess 708 in supply conduit 505 to prevent cotton from hanging on leaf 791.

The flow of cotton through return conduit 507 is controlled by a return valve 613. Return valve 613 is also a leaf valve, and is operated by an air cylinder 623. Return valve 613 includes a leaf portion 683 that moves within supply conduit 505, and a leaf portion 693 that moves within return conduit 507.

Duct valve 609, supply valve 611, and return valve 613 are each operable between a fully opened position that provides for unrestricted flow, and a fully closed position for complete flow stoppage. As used herein, "operable between a fully opened position and a fully closed position" means that the valve has two positions of operation, a fully opened position and a fully closed position. These positions are illustrated in more detail in FIG. 7 for duct valve 609 and supply valve 611. In a fully opened position 709, leaf 699 of duct valve 609 is positioned within recess 707, out of the cotton flow through duct 201. In a fully closed position 710, leaf 699 of duct valve 609 is Transverse or perpendicular to the flow of cotton through duct 201. In a fully opened position 712, leaf 791 of supply valve 611 is positioned within recess 708, out of the cotton flow through supply conduit 505. In a fully closed position 711, leaf 791 of supply valve 611 is positioned transverse or perpendicular to the flow of cotton through supply conduit 505.

FIG. 6 illustrates return valve 613 in a fully opened position with leaf portions 683 and 693 aligned to permit unrestricted flow through supply conduit 505 and return conduit 507. In a fully closed position, leaf portion 683 is positioned transversely across supply conduit 505, and leaf portion 693 is positioned transversely across return conduit 507. In the fully closed position, return valve 613 prevents cotton from flowing through supply conduit 505 and return conduit 507.

In a small-scale system, leaf 699, leaf 791, leaf portion 683, and leaf portion 693 are each approximately six inches high by 15 inches wide. In a full-scale system, the valve leafs are approximately 66 inches or 96 inches wide, rather than 15 inches. The valve leafs shown in FIGS. 6 and 7 are preferably constructed from two pieces of 16-gauge steel, with ¼-inch thick felt (element 713 in FIG. 7) sandwiched between to seal against the sides of the duct. The steel is bolted and welded to a ⅝-inch cold-rolled steel rod that extends beyond one side of the duct to connect to the movable end of the air cylinder (see, for example, movable end 649 of air cylinder 629 in FIG. 6). A preferred air cylinder is a five-inch stroke, ⅝-inch diameter rod, 1.5-inch diameter air cylinder, such as Speedaire model 6X374, activated by a Humphrey Max-Myte model 345-4E2 solenoid.

In a diversion mode of operation, cotton is diverted from duct 201 to flow through auxiliary treatment unit 202. In the diversion mode, duct valve 609 is in fully closed position 710 to completely stop the flow of cotton through duct 201. Supply valve 611 is in fully opened position 712 to allow unrestricted flow of cotton from duct 201 through supply conduit 505. Similarly, return valve 613 is in the fully opened position to provide unrestricted flow of cotton from auxiliary treatment unit 202, through return conduit 507, to duct 201.

In a bypass mode of operation, diversion is deactivated to discontinue flow of cotton through auxiliary treatment unit 202. In the bypass mode, duct valve 609 is in fully opened position 709 to allow unrestricted flow of cotton directly through duct 201. Supply valve 611 is in fully closed position 711 to completely stop the flow of cotton from duct 201 through supply conduit 505. Similarly, return valve 613 is in the fully closed position to completely stop the flow of cotton through return conduit 507.

The sequencing of the valves to transition from the bypass mode of operation to the diversion mode of operation will now be described. Supply valve 611 and return valve 613 are opened to provide communication between duct 201 and auxiliary treatment unit 202. Duct valve 609 is closed to block the flow of cotton through duct 201. Duct valve 609 should be moved from fully opened position 709 to fully closed position 710 sufficiently fast to prevent cotton from hanging between duct 201 and leaf 699. Supply valve 611 and return valve 613 should be opened substantially simultaneously with the closing of duct valve 609 to release the vacuum suddenly created on the upstream side of duct valve 609. This prevents cotton from being pulled around leaf 699 of duct valve 609 to avoid creating a potential blockage.

The sequencing of the valves to transition from the diversion mode of operation to the bypass mode of operation will now be described. Duct valve 609 is opened substantially simultaneously as supply valve 611 is closed. Return valve 613 is then closed after a predetermined time delay. The pre-determined time delay is necessary to allow cotton to clear auxiliary treatment unit 202. The time delay may be selected by one of skill in the relevant art to allow for differences in the machinery selected for the auxiliary treatment unit. A time delay of approximately five to eight seconds is suitable when the auxiliary treatment unit consists of a conventional lint cleaner, such as lint cleaner 160 shown in FIGS. 1 and 2. The time required for cotton to enter and exit a machine such as lint cleaner 160 is approximately three seconds, i.e., three seconds is required to "clear" the cotton from the machine. A time delay of five to eight seconds is thus adequate to clear a machine such as lint cleaner 160. However, cotton that bypasses auxiliary treatment unit 202 after supply valve 611 closes and duct valve 609 opens is mixed for five to eight seconds with cotton that is still flowing through auxiliary treatment unit 202. This results in a "double load" of cotton passing through return connection location 675 for approximately two to five seconds (predetermined time delay minus three seconds to clear auxiliary treatment unit 202). The pneumatic system in a typical gin should be adequate to handle the momentary overload.

Computer system 240 controls the opening and closing of duct valve 609, supply valve 611, and return valve 613. Computer system 240 sequences the valves to transition from the bypass mode of operation to the diversion mode of operation. Computer system 240 also sequences the valves to transition from the diversion mode of operation to the bypass mode of operation. To control the pneumatic air cylinder of each of the valves, output signals from computer system 240 are transmitted through, for example, solid-state relays on a relay card.

Figure 8:
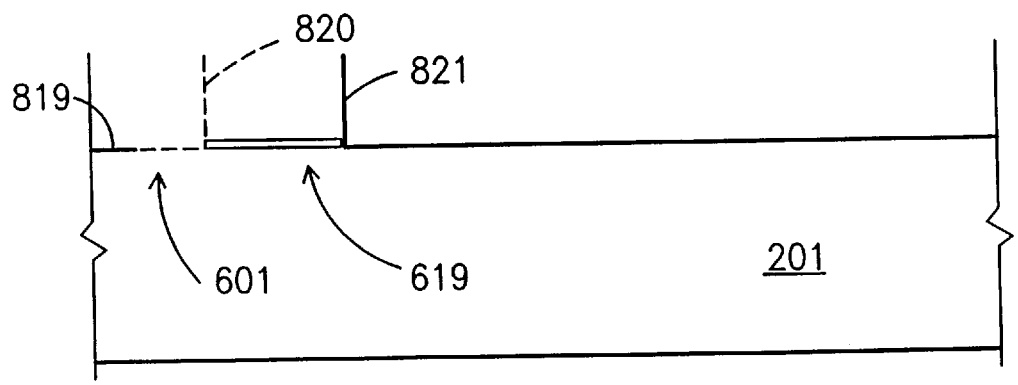
FIG. 8 is an expanded view of the manually-operated slide valve shown in FIG. 6.

To partially compensate for the sudden change in pressure in duct 201 during transition from the diversion mode of operation to the bypass mode of operation, a pressure stabilization valve may be disposed in duct 201. When a vacuum is produced in duct 201, cotton hangs or stagnates in the vacuum. The cotton can be released back into the flow by allowing atmospheric air to enter the duct. A preferred pressure stabilization valve is a manually-operated slide valve, shown generally at 619 in FIG. 6, that allows air to enter duct 201. As best seen in FIG. 8, slide valve 619 allows air to enter duct 201 through an opening 601 in the wall of the duct. A slide 821 is positioned to control the amount of air that enters through opening 601. For example, in a fully closed position 819, no air enters through opening 601. In a partially open position 820, air all enter duct 201 through the open space between position 819 and position 820. Opening 601 may be restricted by a perforated metal covering or a fine mesh screen to prevent extraneous material from entering duct 201.

Slide valve 619 can also be used to prevent cotton from stagnating in supply conduit 505. As shown in FIG. 6, slide valve 619 allows air to enter supply conduit 505 through an opening 605. Slide valve 619 usually remains at one setting for a particular machinery and duct arrangement. However, slide valve 619 can be equipped with vacuum switches for automatic control.

Auxiliary treatment unit 202 may alternatively include a seed cotton cleaner. In that situation, duct valve 609 and supply valve 611 may be several feet apart because the inlet and outlet of seed cotton cleaners are typically several feet apart. With such a configuration, slide valve 619 is particularly important to prevent cotton from stagnating in the duct between the valves.

Figure 9A:
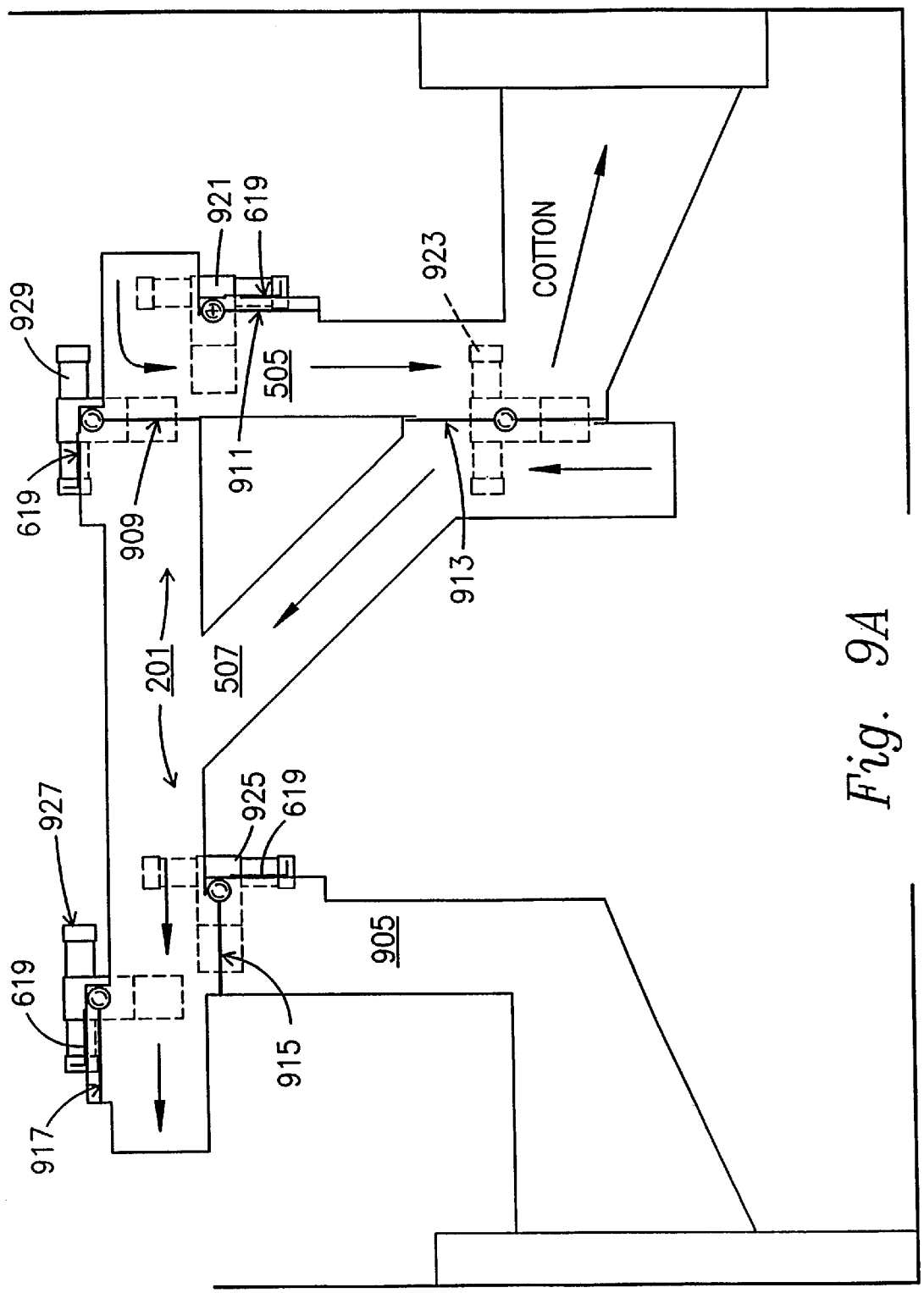

An alternate embodiment of the automated directional valves of the present invention is shown in FIG. 9A. In this embodiment, a first diversion unit is shown as machine 1, and a second diversion unit as machine 2. Machine 1 is connected to duct 201 through supply conduit 505 and return conduit 507. Machine 2 is connected to duct 201 through conduit 905. In a manner similar to that shown and described above for FIG. 6, three valves are used to divert cotton to flow through machine 1. These valves include a duct valve 909, a supply conduit valve 911, and a return conduit valve 913. Duct valve 909 is operated between a fully opened position, and a fully closed position by a rotary actuator 929. Similarly, supply conduit valve 911 and return conduit valve 913 are operated between a fully opened position and a fully closed position by a rotary actuator 921, and 923, respectively. The diversion and bypass modes of operation for machine 1 are analogous to those described above in connection with the embodiment shown in FIGS. 5–8.

Two valves are used to divert cotton to flow through machine 2. A duct valve 917 is operated between a fully opened position and a fully closed position by a rotary actuator 927. Similarly, a conduit valve 915 is operator between a fully opened position and a fully closed position by a rotary actuator 925. In the diversion mode of operation for machine 2, cotton is diverted from duct 201 to flow through machine 2. In the cotton diversion mode, duct valve 917 is in the fully closed position to completely stop the flow of cotton through duct 201. Conduit valve 915 is in the fully opened position to allow unrestricted flow of cotton from duct 201 through conduit 905.

In the bypass mode of operation, diversion in deactivated to discontinue flow of cotton through machine 2. In the bypass mode, duct valve 917 is in the fully opened position to allow unrestricted flow of cotton through duct 201. Conduit valve 915 is in the fully closed position to completely stop the flow of cotton from duct 201 through conduit 905.

To partially compensate for changes in pressure, and to prevent cotton from stagnating, slide valves 619 are provided in duct 201 adjacent duct valve 909 and duct valve 917. Slide valve 619 is located on the upstream side of each duct valve so that, upon entry of the air, cotton is released into the upstream flow. As shown in FIG. 6, slide valves 619 are also used in supply conduit 505 and conduit 905 to prevent cotton from stagnating in these conduits. Computer system 240 may be used to control the valves in the embodiment shown in FIG. 9A in a manner similar to that described above for the embodiment of FIGS. 5–8.

Figure 9B:
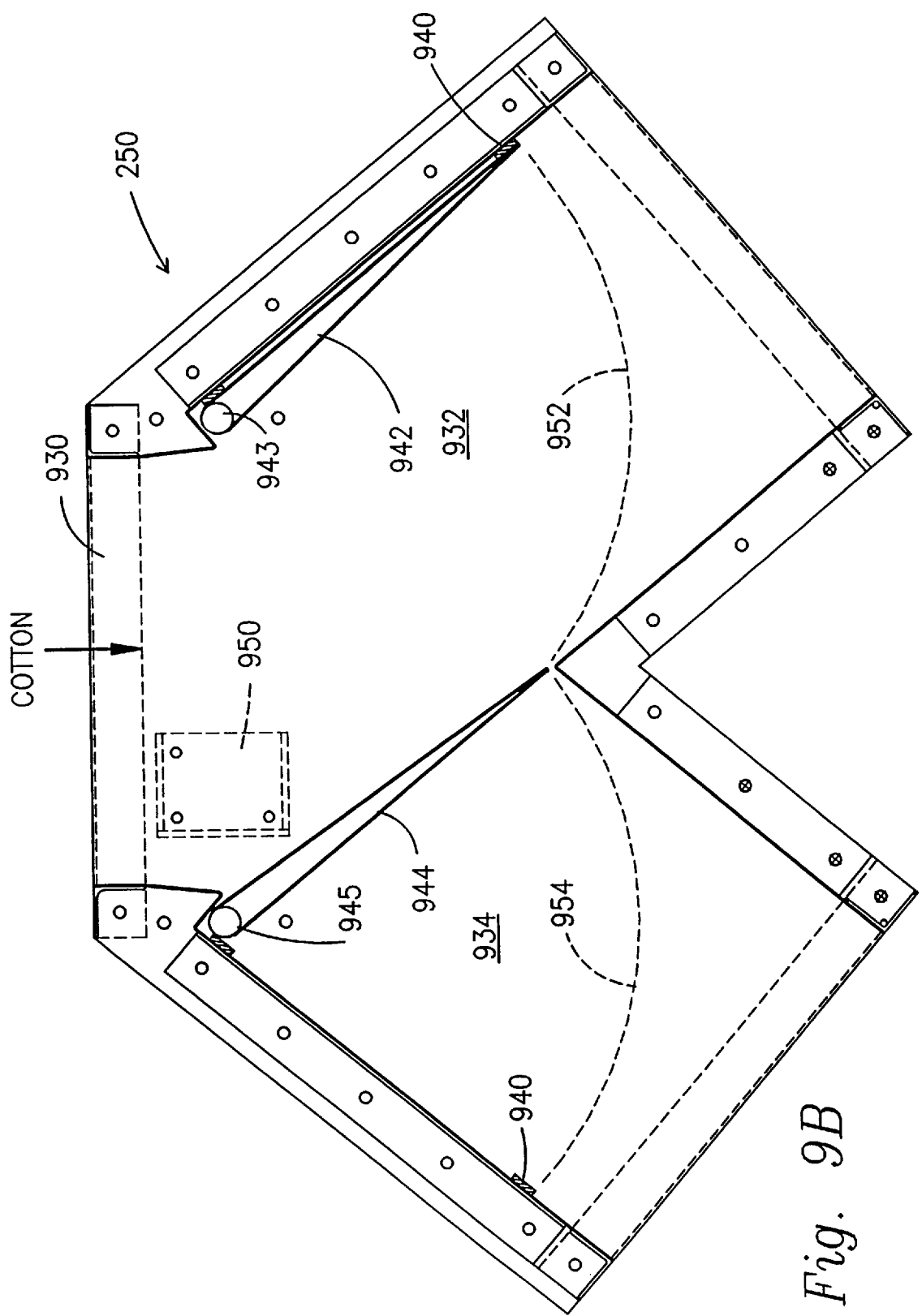
Figure 9D:
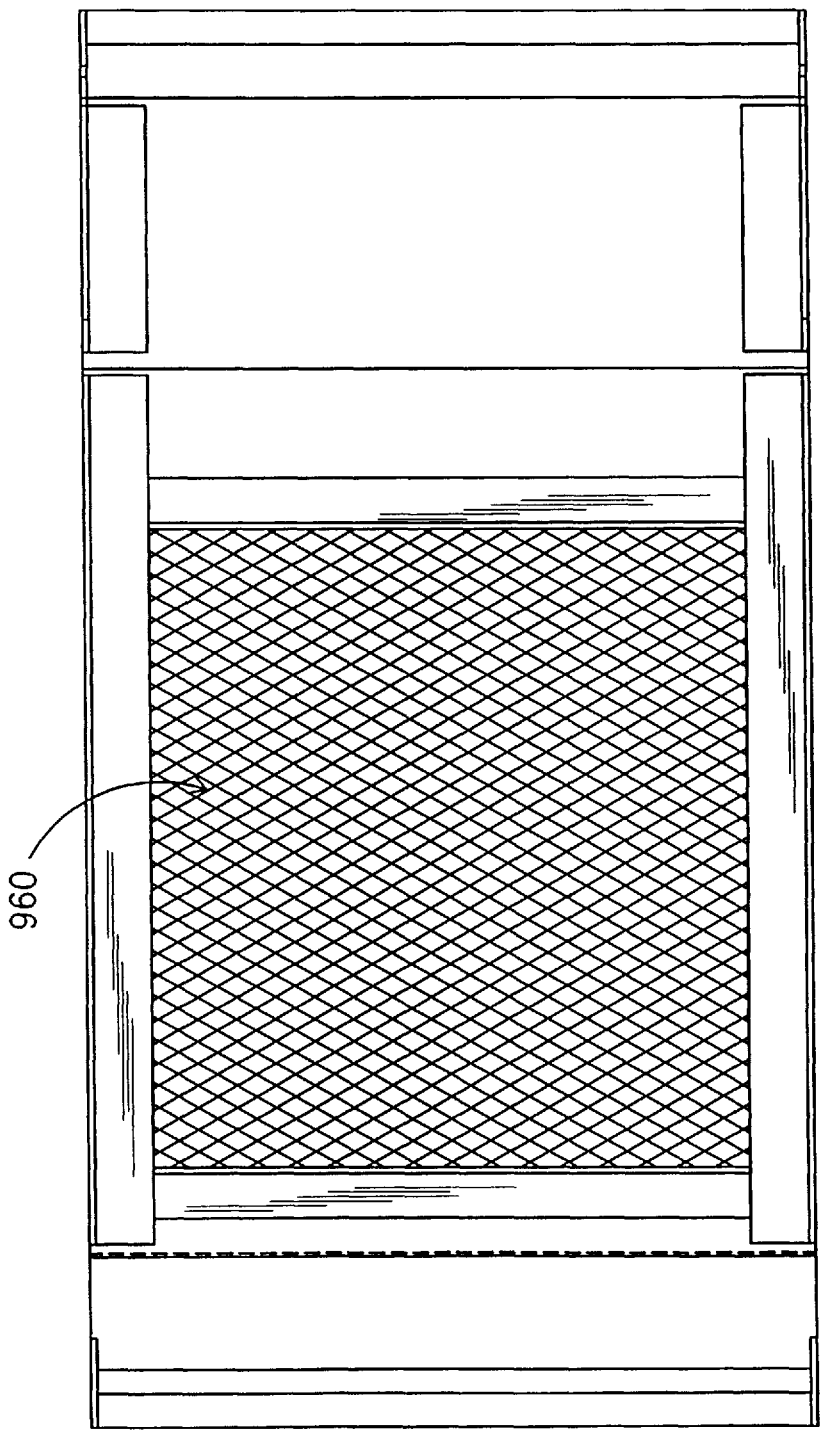

Alternate embodiments of the automated directional valves of the present invention are shown in FIGS. 9B through 9D. The embodiments shown in FIGS. 9B through 9D are particularly preferred as cotton diversion means 250 for the seed cotton cleaners shown in the top row of FIG. 2, whereas the embodiments shown in FIGS. 5–9A are particularly preferred as cotton diversion means 250 for the lint cleaners shown in the bottom row of FIG. 2.

In the embodiment of cotton diversion means 250 shown in FIG. 9B, cotton enters under the force of gravity by falling though an opening 930. In this embodiment, air suction is not used to move the cotton. Once the cotton enters through opening 930, it flows through a diverted or active leg, leg 932 shown in FIG. 9B. A valve leaf 942 is in the fully opened position, allowing cotton to flow through leg 932. To close off the flow of cotton through leg 932, valve leaf 942 is rotated about a shaft 943 along an arc 952 to a fully closed position. Movement of valve leaf 942 can be done through use of, for example, a rotary actuator (not shown) mounted on a mounting 950.

Cotton is prevented from flowing through a bypassed or inactive leg, leg 934 shown in FIG. 9B. A valve leaf 944 is in the fully closed position, preventing cotton from flowing through leg 934. To allow cotton to flow through leg 934, valve leaf 944 is rotated about a shaft 945 along an arc 954 to a fully opened position. Movement of valve leaf 944 can also be done through use of, for example, a rotary actuator mounted on mounting 950. Valve leafs 942 and 944 are moved substantially simultaneously. Valve leafs 942 and 944 may be connected by an adjustable, threaded turnbuckle, or other similar device, so that they move together. Alternatively, valve leafs 942 and 944 may be driven by separate devices.

A sponge rubber seal 940 is used to prevent valve leaf 942 and valve leaf 944 from vigorously impacting into the metal sides of leg 932 and leg 934, respectively, as they move to the fully opened position. Use of sponge rubber seal 940 prevents the creation of undue fatigue, as well as noise.

Computer system 240 controls the opening and closing of valve leafs 942 and 944. To change the leg through which cotton is diverted to flow, computer system 240 substantially simultaneously directs the valve leaf currently in the fully opened position (valve leaf 942 in FIG. 9B) to close, and directs the valve leaf currently in the fully closed position (valve leaf 944 in FIG. 9B) to open.

A further embodiment of cotton diversion means 250 is shown in FIG. 9C. The configuration of this embodiment is similar to that of FIG. 9B, and only the differences will be noted. Cotton diversion means 250 illustrated in FIG. 9C is equipped with an expanded metal element 960 on leg 934 and leg 932. Expanded metal element 960 is shown in more detail in FIG. 9D. Expanded metal element 960 allows air to flow into a leg when the corresponding valve leaf has been moved away from expanded metal element 960 to the fully closed position. In FIG. 9C, valve leaf 944 is in the fully closed position. When suction means, such as a fan, is used to draw suction in leg 934, air will flow through expanded metal element 960 and seal 940 to purge cotton from the inactive (bypassed) leg. Seal 940 allows air to pass when suction is drawn on the corresponding leg, but seals against air entering the leg through expanded metal element 960 unless desired by drawing suction. In FIG. 9C, expanded metal element 960 is closed off by valve leaf 942 to prevent air from entering into leg 932.

To change the leg through which cotton is diverted to flow, auxiliary suction means (not shown), such as an auxiliary fan, is activated prior to changing the position of the valve leafs. Consequently, air is drawn through inactive leg 934 through expanded metal element 960. Air is drawn through active leg 932 via the main fan or suction means moving cotton through the system. Computer system 240 then substantially simultaneously directs the valve leaf currently in the fully opened position (valve leaf 942 in FIG. 9B) to close, and directs the valve leaf currently in the fully closed position (valve leaf 944 in FIG. 9B) to open. The auxiliary fan is powered for a time period sufficient to purge cotton from the previously active leg. This time period is a function of the length of duct in which the cotton can be trapped. Motion sensors can be used to determine when to turn off the auxiliary fan, or a timer with a predetermined time delay can be used. Alternatively, the auxiliary fan can remain continuously powered, such as when continuous changing between the active and inactive legs is occurring.

In one embodiment of the present invention, computer system 240 uses PLC 2050 to control the operation of cotton diversion means 250 associated with each gin machine. The connection between PLC 2050 and cotton diversion means 250, such as valves 609, 611, and 613, or valve leafs 942 and 944, would be readily apparent to one of skill in the relevant arts, and has been omitted for brevity.

Computer Program Implementation of the Preferred Embodiment

The process control system of the present invention is implemented by computer system 240 that includes control logic or computer software that directs its operation. In one embodiment, the present invention is directed to a computer program product comprising a computer readable medium having control logic (computer software) stored therein. The control logic, when executed by processor 404, causes processor 404 to perform the functions of the invention as described herein. In another embodiment, the present invention is directed to a program storage device readable by a machine that tangibly embodies a program of instructions executable by the machine to carry out the control process of the present invention.

Figure 10:
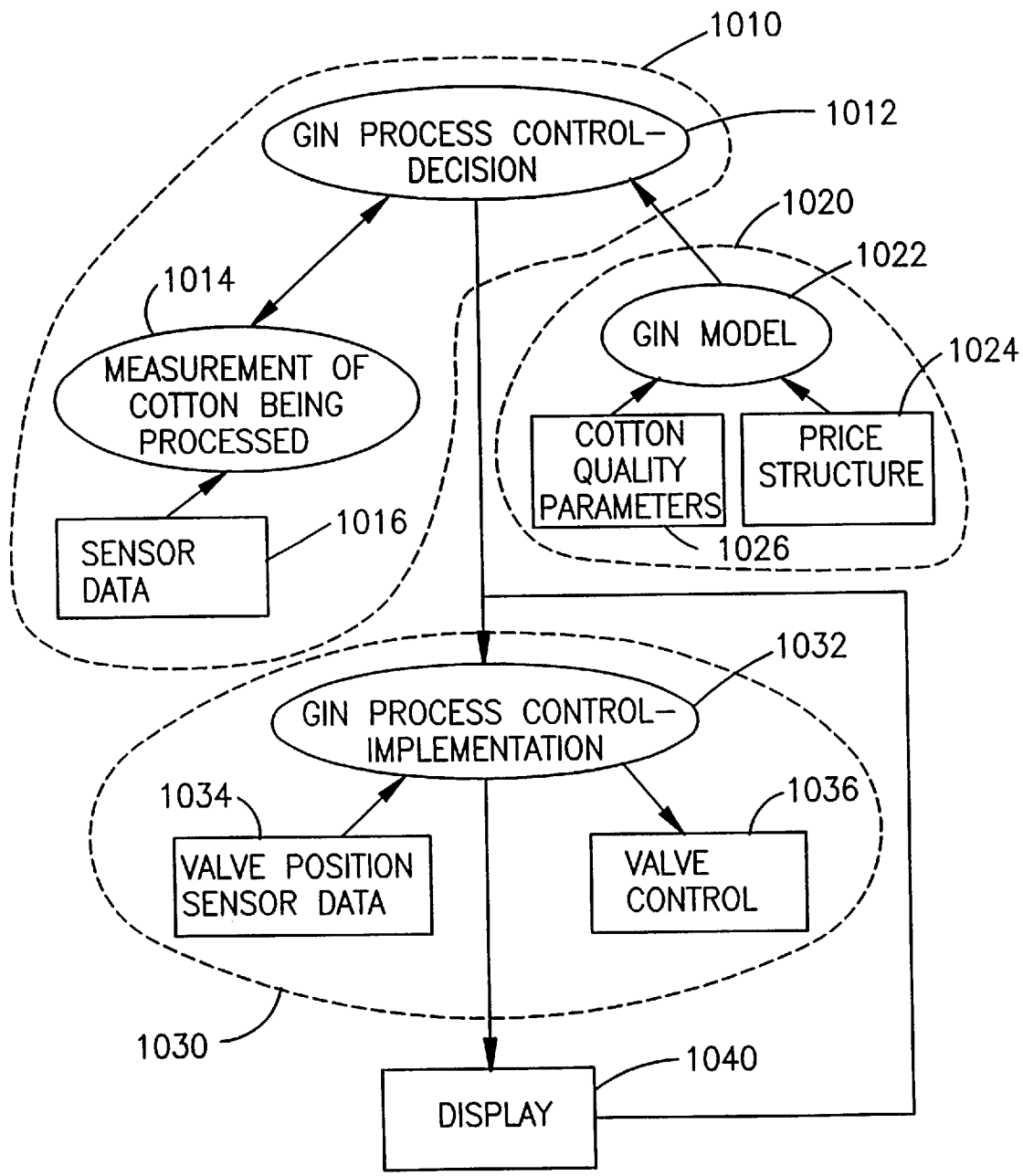
FIG. 10 shows a block diagram illustrating implementation of the process control system of the present invention.

FIG. 10 shows a block diagram illustrating implementation of the process control system of the present invention. In one embodiment, the process control system of the present invention is implemented using three software programs: (1) a process control decision and measurement program 1010; (2) a dynamic programming model 1020; and (3) a process control implementation program 1030. These three programs will be described in Sections 3.a., 3.b., and 3.c. below. To assist personnel operating the gin, process control decision and measurement program 1010 and process control implementation program 1030 provide output to a display 1040. Display 1040 includes the display associated with computer system 240, as well as other computer systems or CRTs communicating with computer system 240 via network 418 (see FIG. 4). The present invention preferably includes a display configured for the ginner's use (see, for example, FIG. 17b described below).

Figure 11:
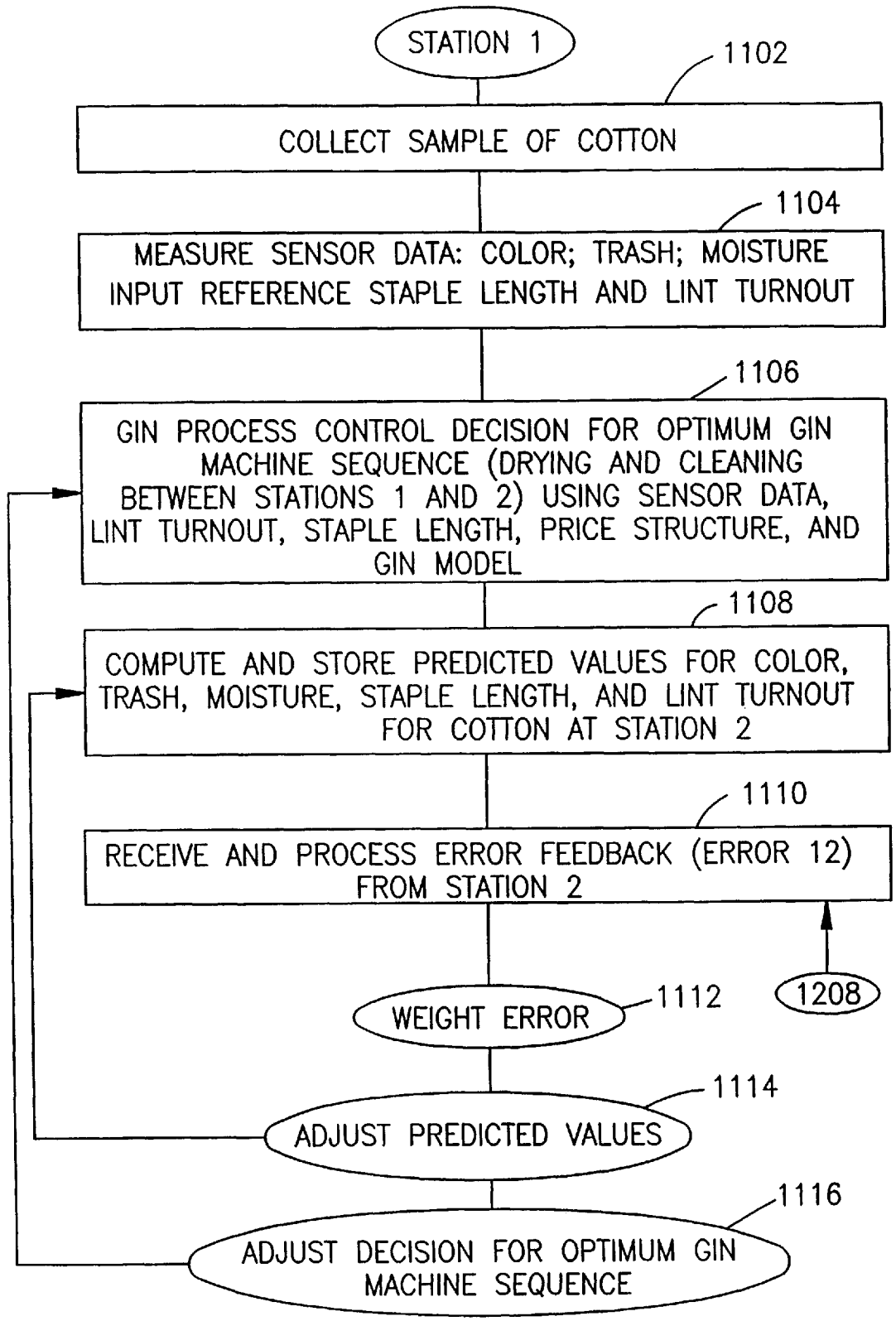
FIG. 11 shows a flow diagram of the process steps carried out for a first measurement station (Station 1)

A flow diagram of the process steps carried out for Station 1 (see FIG. 2) is shown in FIG. 11. In a step 1102, a sample of seed cotton is collected at feed control 220 using, for example, ram 216. In a step 1104, the seed cotton sample is measured using camera 212 and moisture meter 214 to obtain sensor data (shown as 1016 in FIG. 10) on color, trash content, and moisture content. The staple length of the cotton and the maximum lint turnout are not measured. Rather, a reference staple length is input by the operator at the time of processing or as the cotton module or trailer comes into the cotton gin. If staple length and turnout are not entered into computer system 240 by the ginner, then the system of the present invention defaults to typical reference values for staple length and turnout stored within dynamic programming model 1020. Such a reference staple length and turnout can be readily determined by one of skill in the relevant art based upon the variety of cotton being processed, the time of harvest, etc.

Using sensor data 1016 and the reference staple length and lint turnout obtained in step 1104, and a gin decision matrix generated by dynamic programming model 1020, a gin process control decision for the optimum gin machine sequence is made in a step 1106. As explained more fully below, dynamic programming model 1020 generates a gin decision matrix using cotton quality parameters 1026 and price structure 1024 that are input to a gin model 1022. Step 1106 optimizes the gin machine sequence for drying and cleaning between Stations 1 and 2 for the particular cotton input into the ginning system at feed control 220. Predicted values for the color, trash content, moisture content, staple length, and lint turnout for the cotton after it has undergone the selected drying and cleaning sequence between Stations 1 and 2 are computed and stored in a step 1108. The predicted values are computed using the sensor data values measured in step 1104, the drying and cleaning sequence selected in step 1106, and the effect on each of the parameters by the machines actually used in the selected sequence.

Figure 14:
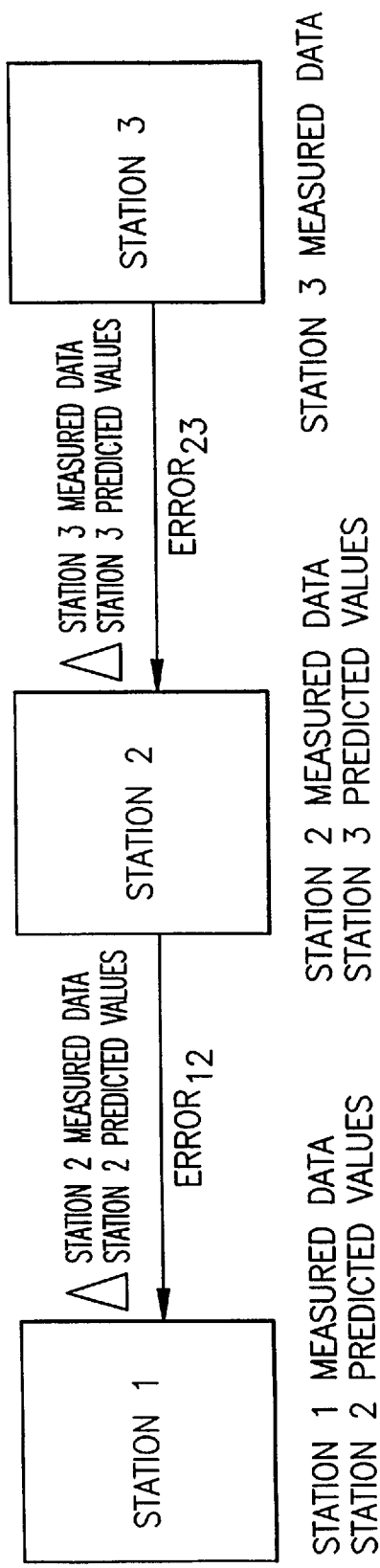
FIG. 14 illustrates the error feedback process of the present invention.

The predicted values computed in step 1108 are used in a step 1110 during which an error feedback $\text{Error}_{12}$ is received (denoted by 1208) and processed. As best seen in FIG. 14, $\text{Error}_{12}$ is the difference (denoted by $\Delta$ in FIG. 14) between the data measured at Station 2 for color, trash content, and moisture content, and the predicted values, computed and stored in step 1108, that each of these parameters will have at Station 2. $\text{Error}_{12}$ is weighted, as denoted in a step 1112. The weight accorded to $\text{Error}_{12}$ may be zero, in which case $\text{Error}_2$ is ignored, and the error feedback process of the present invention is disabled. The predicted values for color, trash content, and moisture content are adjusted using $\text{Error}_{12}$ in a step 1114. $\text{Error}_{12}$ is also used to adjust the decision for the optimum gin machine sequence in a step 1116. The measured values are adjusted by $\text{Error}_{12}$, and the decision process is iterated. The error feedback process of the present invention corrects for differences in the performance characteristics of the machinery. This is needed because different machines have different efficiencies, and the performance of each machine also changes with use and over time. Additionally, the ease of removal of foreign matter and moisture differs for varying types of cotton. The error feedback process of the present invention eliminates the need for precise performance characteristic tables or algorithms for each gin machine.

Figure 12:
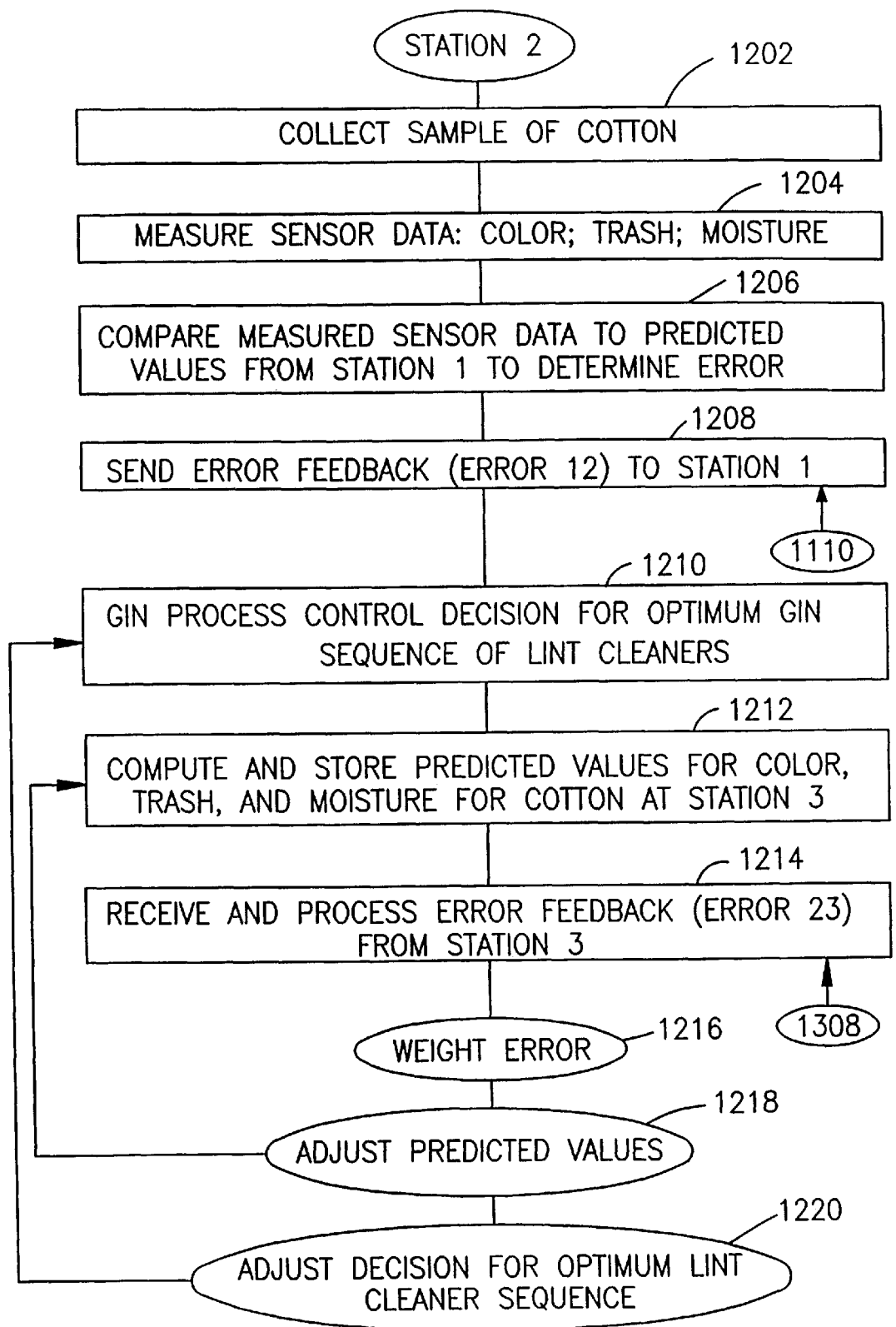
FIG. 12 shows a flow diagram of the process steps carried out for a second measurement station (Station 2)

A flow diagram of the process steps carried out for Station 2 (see FIG. 2) is shown in FIG. 12. In a step 1202, a sample of seed cotton is collected using paddle sampler 218 after the cotton flows through gin stand 150. In a step 1204, the seed cotton sample is measured using camera 212 and moisture meter 214 to obtain sensor data on color, trash content, and moisture content. In a step 1206, the measured sensor data is compared to the predicted values computed in step 1108 to determine $\text{Error}_{12}$. $\text{Error}_{12}$ is fed back to Station 1 (step 1110) in a step 1208.

Using the sensor data obtained in step 1204, and the gin decision matrix generated by dynamic programming model 1020, a gin process control decision for the optimum gin sequence of lint cleaners is made in a step 1210. Step 1210 optimizes the gin sequence of lint cleaners for cleaning between Stations 2 and 3 for the particular cotton after processing between Stations 1 and 2. Predicted values for the color, trash content, and moisture content for the cotton after it has undergone the selected lint cleaner sequence between Stations 2 and 3 are computed and stored in a step 1212. The predicted values are computed using the data values measured in step 1204, the cleaning sequence selected in step 1210, and the effect on each of the parameters by the lint cleaners actually used in the selected sequence.

The predicted values computed in step 1212 are used in a step 1214 during which an error feedback $\text{Error}_{23}$ is received (denoted by 1308) and processed. As best seen in FIG. 14, $\text{Error}_{23}$ is the difference (denoted by $\Delta$ in FIG. 14) between the data measured at Station 3 for color, trash content, and moisture content, and the predicted values, computed and stored in step 1212, that each of these parameters will have at Station 3. $\text{Error}_{23}$ is weighted, as denoted in a step 1216. The weight accorded to $\text{Error}_{23}$ may be zero, in which case the error feedback process of the present invention is disabled. The predicted values for color, trash content, and moisture content are adjusted using $\text{Error}_{23}$ in a step 1218. $\text{Error}_{23}$ is also used to adjust the decision for the optimum gin sequence of lint cleaners in a step 1220. The measured values are adjusted by $\text{Error}_{23}$, and the decision process is iterated. The measured values at Station 3 are also used to verify predicted values for the entire system.

Figure 13:
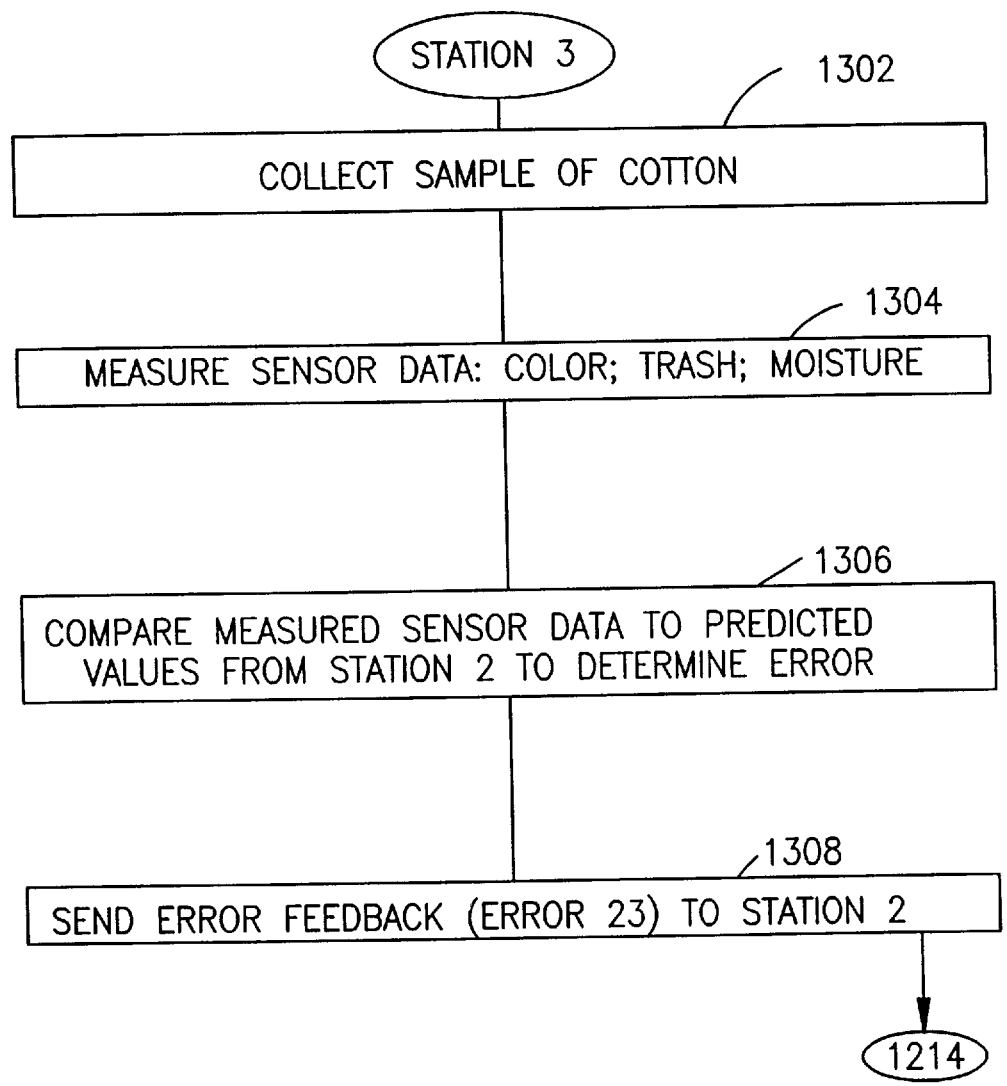
FIG. 13 shows a flow diagram of the process steps carried out for a third measurement station (Station 3)

A flow diagram of the process steps carried out for Station 3 (see FIG. 2) is shown in FIG. 13. In a step 1302, a sample of cotton is collected using paddle sampler 218 after the cotton has completed processing through the selected sequence of lint cleaners 160. The seed cotton has now been processed into lint. In a step 1304, the lint sample is measured using camera 212 and moisture meter 214 to obtain sensor data on color, trash content, and moisture content. In a step 1306, the measured sensor data is compared to the predicted values computed in step 1212 to determine $Error_{23}$. $Error_{23}$ is fed back to Station 2 (step 1214) in a step 1308.

Each of the three software programs illustrated in FIG. 10 that carry out the process of the present invention will now be described. It is to be understood that the use of three software programs as shown in FIG. 10 is presented by way of example only. The functions of the three software programs could be carried out, for example, in one software program. In a particularly preferred embodiment, the three software programs illustrated in FIG. 10 are combined into a composite software program written in the C programming language. Also, the functionality described below could alternatively be achieved using hardware modules.

a. Process Control Decision and Measurement Program 1010

In a preferred embodiment, process control decision and measurement program 1010 is implemented using the C programming language, although other languages can be used. Program 1010 performs the function of selecting the optimum gin process control decision, as indicated by 1012. To select the optimum gin process control decision, program 1010 controls the measurement of cotton being processed in the gin, as shown at 1014, to obtain sensor data 1016. Sensor data 1016 includes color and moisture and trash content measurements made on the cotton as it progresses through the gin.

Filtering or smoothing of the sensor data measured by the system of the present invention is preferable because there is electrical and other noise inherent in the measurement process, and because an incorrect process control decision can have adverse economic impact on the farmer whose cotton is being processed in the gin. Such filtering or smoothing can be carried out by taking a series of electrical signal measurements over a specific time interval (e.g., 64 measurements during 1/60 second), and using the arithmetic mean of the readings. In addition, analog filters can be used to reduce the high frequency noise, and digital filters can be used to reduce the lower frequency noise as described in R. Bibbero, *Microprocessors in Instruments and Control*, John Wiley & Sons, Inc. (1977). It is also preferable to require that several, or a plurality of several, consecutive gin process control decisions (1012) be the same before the decision is implemented (1032). Another preferred method of implementing hysteresis control, and controlling unwanted variability of the output, is to use a counter. The counter incremented after every control decision that calls for a first state. The counter is decremented when the control decision calls for a different second state. When the counter increases past a predetermined value, the first control decision is implemented. When the counter decreases below a lower predetermined value, the second control decision is implemented. The counter is not allowed to count above or below additional predetermined limits.

Process control decision and measurement program 1010 implements the error feedback process of the present invention. As noted above, the present invention may be used in gins equipped with various configurations and types of machines made by a variety of manufacturers. These machines will also be in varying states of repair. Thus, the performance of each of the machines in a particular gin may not be perfectly represented by the tabular or algorithm-based transition functions of the present invention. As such, the error feedback process of the present invention compensates for the error resulting from the difference between the actual performance of the machines in a gin and the mathematical functions used by the present invention.

To implement the error feedback process, one embodiment of program 1010 measures a set of data (color, moisture content, and trash content) at Station 1, and assigns a time to that set of data. The time it takes, in seconds, for the cotton to get from Station 1 to Station 2 (and from Station 2 to Station 3) as a function of gin machinery sequence is contained in a gin configuration file. The contents of one embodiment of a gin configuration file are shown in FIG. 15. Program 1010 uses the clock contained in computer system 240, along with the time assigned to the set of Station 1 data and the times in the gin configuration file, to track when the cotton measured at Station 1 should be at Station 2. A number of measurements are taken at Station 2 in the vicinity of the computed arrival time. The average of these Station 2 measurements is used to represent the characteristics of the cotton initially measured at Station 1 after processing between Stations 1 and 2. Program 1010 compares the average of the Station 2 measurements to the values predicted from the Station 1 data to generate $Error_{12}$. A similar process may bee used between Stations 2 and 3 to generate $Error_{23}$.

The error may be weighted using a weighting factor from 0 to 100%. With a weighting factor of 0, the error feedback process of the present invention is "off" or disabled. With a weighting factor of 100%, the Station 2 measurement is averaged one for one with the Station 1 measurement to adjust the predicted values for Station 2 and to adjust the optimum gin machine sequence between Stations 1 and 2. Likewise, with a weighting factor of 100%, the Station 3 measurement is averaged one for one with the Station 2 measurement to adjust the predicted values for Station 3 and to adjust the optimum gin machine sequence between Stations 2 and 3. With a weighting factor of 50%, the measurement at Station 1 would be weighted twice that of the measurement at Station 2. Conversely, with a weighting factor of 50%, the measurement at Station 2 is given half the weight of the measurement at Station 1 in adjusting the predicted values for Station 2 and the optimum gin machine sequence between Stations 1 and 2. Similarly, with a weighting factor of 50%, the measurement at Station 3 is given half the weight of the measurement at Station 2 in adjusting the predicted values for Station 3 and the optimum gin machine sequence between Stations 2 and 3. The weighting factors may be contained in a gin configuration file, such as shown in FIG. 15.

Measurements at each station are taken at time intervals, controlled, for example, by time delay relays at the measurement stations. In a preferred embodiment, measurements at Stations 1 and 2 are taken every 3 seconds, and once per second at Station 3. All measured data is recorded in an ASCII file. In a separate file, histograms, means, standard deviations, and minimum and maximum values are calculated and stored for each variable. Although staple length and lint turnout are not measured, the change in the value of these variables is calculated since these variables are affected by machinery in the gin machine sequence.

The measurements at Stations 1, 2, and 3 can be used to instantaneously change the machinery sequence, or the changes can be made after a selected time period, or after a selected number of consecutive decisions that require the identical machine change. For example, the machinery sequence can be changed after a pre-determined time interval (e.g., five minutes) has elapsed after the change is identified. Alternatively, the machinery sequence can be changed after a specified number of measurements are taken that all indicate that the machinery sequence should be changed to the same new machinery sequence. Changing the machinery sequence after a selected time period or after a selected number of consecutive decisions provides hysteresis control for the system. In a preferred embodiment, four consecutive decisions to change the machinery sequence to the same new machinery sequence are required before the sequence is changed, i.e., before the decision corresponding to the new machinery sequence is implemented by process control implementation program 1030. The number of decisions that are required before the sequence is actually changed is a parameter that can be made available for change by the operator, or can be pre-programmed as a fixed value. In this manner, the system and method of the present invention can be customized to meet the needs of a particular gin. The machine sequence actually being used can be continuously displayed on display 1040, as well as the recommended sequence.

Another preferred method of implementing hysteresis control, and controlling unwanted variability of the output, is to use a counter. The counter incremented after every control decision that calls for a first state. The counter is decremented when the control decision calls for a different second state. When the counter increases past a predetermined value, the first control decision is implemented. When the counter decreases below a lower predetermined value, the second control decision is implemented. The counter is not allowed to count above or below additional predetermined limits.

Process control decision and measurement program 1010 can also implement an override feature that allows the measurements taken at Station 3 to "override" the decision made at Station 2. Measuring means 210 at Station 3 generally provides the most accurate measurements because the cotton is at the end of the processing sequence and it has been combed and blended several times. In a preferred embodiment, program 1010 uses the level of reflectance, yellowness, moisture, and trash content at Station 3 to determine what the gin machinery sequence decision at Station 2 should have been. If the gin machinery sequence decision actually made at Station 2 was different, then the override feature can be implemented so that the gin machinery sequence determined from the measurements at Station 3 overrides the gin machinery sequence decision made at Station 2. The override feature is preferably implemented as a menu option. The override feature can be particularly useful if measuring means 210 at Station 2 is malfunctioning.

Process control decision and measurement program 1010 can also implement an automated calibration procedure for calibrating the various instruments of measuring means 210. A particularly preferred autocalibration procedure is described in U.S. Pat. No. 5,639,955, filed Feb. 8, 1996, the entirety of which is incorporated herein by reference.

In one embodiment, program 1010 uses a gin configuration file, such as shown in FIG. 15, to store such items as valve positions, process times for the various gin machines, weighting factors for the error feedback process, time before machine selection can change, and how often to sample or measure data at each of Stations 1, 2, and 3. A screen display for editing the gin configuration file is shown in FIG. 15. The screen display of FIG. 15 is divided into three areas. The area on the left consists of a matrix in which each row corresponds to 13 machines: drier 1 at levels 1, 2, and 3 (1D1, 1D2, and 1D3, respectively); cylinder cleaner 1 (CC1), stick machine 1 (SM1); drier 2 at levels 1, 2, and 3 (2D1, 2D2, and 2D3, respectively); cylinder cleaner 2 (CC2); impact cleaner 1 (IC1); and three lint cleaners (LC1, LC2, and LC3). The three levels for the drier refer to the number of shelves or fraction of the drier that is being used. Drier level 1 refers to 6 shelves or ¼ of the drier; drier level 2 refers to 12 shelves or ½ of the drier; and drier level 3 refers to 24 shelves or all of the drier. Each column in the area on the left corresponds to a particular machine sequence character, '' (blank) and 'A' through 'Z'. A 'Y' under a particular sequence character and in a particular row results in that machine being used whenever that particular sequence character was read from the decision matrix. A '' (blank) results in that machine not being used. For example, machine sequence "R" includes drier 1 at level 1 (1D1), cylinder cleaner 1 (CC1), drier 2 at level 2 (2D2), impact cleaner 1 (IC1), and two stages of lint cleaning (LC1 and LC2). A stick machine (SM1) is not used in machine sequence "R".

The middle area of the screen display of FIG. 15 is organized by rows corresponding to the 13 machines, and columns corresponding to various parameters of each machine. The entry column contains the time in seconds that it takes the cotton to travel from Station 1 (reference point for time measurement) to the valve used to route cotton either through (diversion mode) or around (bypass mode) the particular machine. The exit column contains the additional time in seconds that it takes the cotton to go through the machine (diversion mode) and reach the valve where the cotton reenters the main flow of cotton. The bypass column contains the time in seconds that it takes the cotton to bypass the machine, i.e., to travel between the valve at the entrance to the machine and the valve at the exit of the machine. The filter column contains the time in seconds that a particular machine must be continuously selected (diversion mode) or not selected (bypass mode) before the valve can be switched to the other mode of operation. This filters out momentary changes in the position of the valves that would otherwise occur. The foregoing applies for valves, such as those shown in FIGS. 5–9A, for routing cotton through or around lint cleaners, as well as for valves, such as those shown in FIGS. 9B–9D, for routing cotton through or around seed cotton cleaners.

The middle area of the screen display of FIG. 15 also contains a column labeled Weight %. The weight % value is used when cotton diverted through the particular machine reenters the main duct and combines with cotton that had bypassed that machine. The weight % value is used to weight the predicted values of moisture content, trash content, and color based on this mixing of diverted and bypassed cotton. With a weight % value of 1.00, the predicted values are based upon the cotton that was diverted through that machine, and with a weight % of 0.00, the predicted values are based upon the cotton that bypassed that machine. As another example, a weight % value of 0.75 results in a predicted value that is equal to the sum of 0.75 times that of the cotton that was diverted through the machine and 0.25 (1–0.75) times that of the cotton that bypassed the machine. A weight % value of 0.5 is preferably used.

The third area of the screen display of FIG. 15 (located at the extreme right) is organized into a section for each of measurement Stations 1, 2, and 3. The rate is the time in seconds between requests by computer system 240 for the measurement of data. Computer system 240 requests a new reading from measuring means 210 at a time interval equal to the rate shown. The rate at the three measurement stations does not have to be the same, so that each station can have a rate that is different from the rate at the other stations. Filter is the time in seconds over which the readings from measuring means 210 are averaged. Entry is the time in seconds that it takes the cotton to reach Station 2 or Station 3 from Station 1, assuming the cotton has bypassed all machines. Finally, weight in this area of the screen display is used to determine the amount of the error (difference between actual and predicted values) that is fed back to the previous measurement station. The error feedback is computed by multiplying the difference between the actual and predicted values by the weight value, taking the sum, and dividing by the number of sample readings. A weight value of 0.00 disables the error feedback function.

Figure 16:
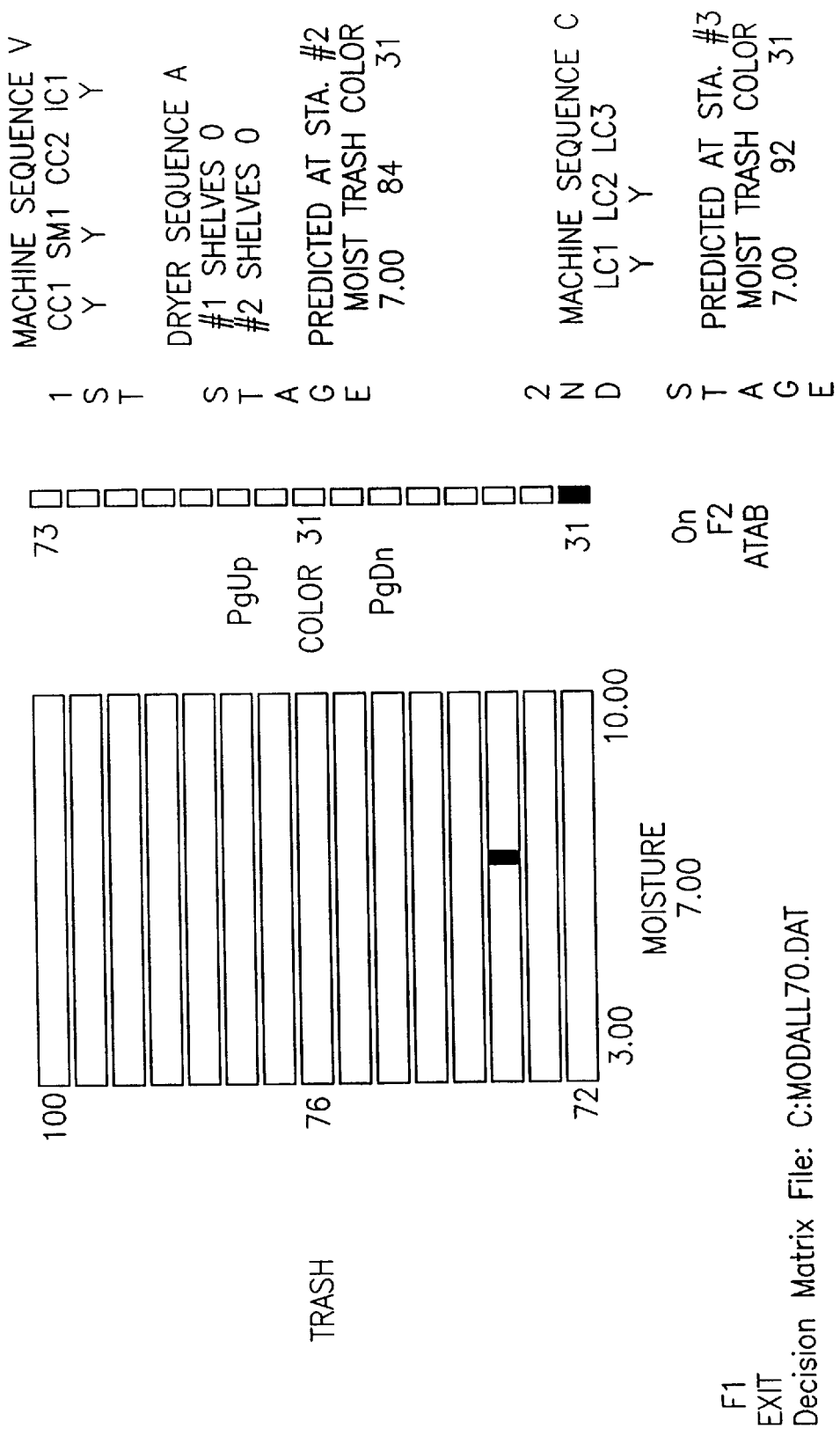
FIG. 16 shows a screen display for editing a decision matrix file.

A screen display for editing the gin decision matrix file is shown in FIG. 16. FIG. 16 shows one element of a decision matrix for one price structure and the transition function tables provided in Tables 1–15. The gin decision matrix is a three dimensional matrix with the X axis corresponding to moisture content, the Y axis corresponding to trash content, and the Z axis corresponding to color. The moisture content ranges from 3.00 to 10.00 in increments of 0.25. The trash content is represented by a statistical index that ranges from 72 to 100 in increments of 2. Finally, the color is represented by color code values from 31 to 73. The cell position at a particular value of moisture, trash, and color will contain a machine sequence character. The machinery configuration that corresponds to the machine sequence character is contained in the gin configuration file discussed above. The complete three dimensional gin decision matrix is composed of many elements, of which FIG. 16 is a representative example, that correspond to all possible combinations of moisture content, trash content, and color.

The first stage (Station 1 to Station 2) machine sequence character is either a ' ' (blank) or character from 'A' to 'Z'. The moisture, trash, and color readings from Station 1, adjusted by error feedback if not disabled, are used to enter the gin decision matrix. The first stage machine sequence character located at that cell position is used to determine from the gin configuration file which of the machines between Stations 1 and 2 will be used (diversion mode) and which will be bypassed. The drier sequence character is used in a similar manner to determine the number of shelves to be used in each drier.

The second stage (Station 2 to Station 3) machine sequence character determines which of three lint cleaners are to be used in the second stage. The moisture, trash, and color readings from Station 2, adjusted by error feedback if not disabled, are used to enter the gin decision matrix to locate the cell position for the second stage machine sequence character.

In the example shown in FIG. 16, machine sequence V includes a cylinder cleaner (CC1), a stick machine (SM1), and an impact cleaner (IC1) in a first portion of the optimum machine sequence. A "Y" indicates that the particular machine is used in the sequence, whereas a "blank" indicates that the machine is not used. Based upon processing through such a first stage, the predicted values of moisture, trash, and color at Station 2 are shown. A second portion of the optimum machine sequence is machine sequence C that includes two stages of lint cleaning (LC1 and LC2). Based upon processing though such a second stage, the predicted values of moisture, trash, and color at Station 3 are shown.

One embodiment of a screen display for the process control system of the present invention is shown in FIG. 17a. This display includes the raw sensor data measured at Stations 1, 2, and 3, the predicted values for Stations 2 and 3, and the error feedback for Stations 1 and 2. For example, at Station 2, a reflectance (Rd) of 56.3 and a +b (yellowness) of 8.2 was measured. These raw values of Rd and +b correspond to a color code of 61. A conversion or lookup table can be used to convert between Rd, +b and color codes. Such a conversion table is contained in file UPLND.COL in the attached microfiche appendix. The raw measured data for trash at Station 2 is area 54 (0.54% of the pixels covered by trash) and count 31 (related to the number of pixels covered by trash). The area and count are converted to a leaf or trash code that ranges from 2 to 8; in this example, code 5.

The screen display shown in FIG. 17a contains a line labeled "Filtered Reading" at each measurement station. The moisture reading represents the actual moisture content (percentage) measured at each station, e.g., 6.38% at Station 2. The color code listed for the filtered reading at each station represents the better of the predicted color value based on the measurements made at Station 1, and the actual color measured at Station 3. The most accurate reading of color is made at Station 3 because the cotton has been cleaned and the seeds removed so that a more uniform product is available for measurement. The filtered trash reading is obtained by converting the area and count to a statistical trash index, such as is done by the procedures in the CONTDECF.C file of process control decision and measurement program 1010 described below.

The screen display in FIG. 17a also includes the error feedback values for Stations 1 and 2. In the example shown in FIG. 17a, the error feedback provided to Station 2 ($Error_{23}$) is +0.14 for moisture, +0.00 for color, and +1.4 for trash. These values are computed using the difference between the predicted and actual values and the weight contained in the gin configuration file for Station 3.

The gin machine sequence in use is also displayed in FIG. 17a, including the first stage machines between Stations 1 and 2, and the second stage lint cleaning machines between Stations 2 and 3. The decision matrix file and the gin configuration file being used are also indicated.

A particularly preferred embodiment of process control decision and measurement program 1010 is provided in the attached microfiche appendix. This preferred embodiment can be used in a gin having a configuration substantially as shown in FIG. 2, and can be used with the hardware interface shown In FIG. 20. The source code refers to paddle sampler 218 as a "flapper". This preferred embodiment of process control decision and measurement program 1010 is written to use the embodiment of dynamic programming model 1020 attached hereto in the microfiche appendix. As explained more fully below in Section 3.b., in such an embodiment of dynamic programming model 1020, algorithmic rather than tabular transition functions are used. The optimum machine sequences are generated by the algorithms, rather than being stored in a table. As such, a gin configuration file is not used in this preferred embodiment of process control decision and measurement program 1010.

The attached preferred embodiment of program 1010 is written in the C programming language, and contains a total of 20 files. There are seven ".C" files and 12 external included ".H" files. The function of each of these files will be briefly summarized below. A computer programmer skilled in the relevant art could readily interpret and implement the present invention based on the disclosed source code.

.i. LCADV1.C

This file includes a MAIN_SECTION that records the current computer screen display settings, runs a setup procedure, and runs an open menu procedure. When the program returns from the open menu procedure, this section returns the screen to the made it was in when the program was called, and exits the program. In the setup procedure, output control lines are set to the failsafe condition for the gin, either high or low for a particular line. Files and variables are also initialized.

The open menu procedure is the first portion of the code that provides an interface to the user. A menu is displayed so that a user can select one or more functions to be performed. The functions include implementing process control and measurement, performing selected diagnostics, or performing calibrations of the equipment and sensors within the system. If the user selects "0", the system autocalibrates the sensors at Station 2, and returns to the menu. A selection of "9" autocalibrates the sensors at Station 3. If the user selects "1", the system sets the sample collection means at each measurement station for proper operation, and begins to run the data collection and control portion of the program (getdata2 procedure described below). If the user selects "2", the digital input lines are read, and the values displayed on the screen. If the user selects "3", the program outputs a varying series of bits to the output data lines as a diagnostic check. A selection of "5", "36", or "7" results in color calibration of the camera at Stations 1, 2, and 3, respectively. A selection "a", "b", or "c" results in trash calibration of the camera at Stations 1, 2, and 3, respectively. If the user selects "e", the values from A/D converter 2010 are displayed so that the analog inputs can be checked. If the user selects "f", a measurement of color and trash is immediately obtained from one of the measurement stations, and displayed on the screen. If the user selects "8", the use of data from Station 3 is switched on or off, and the setting is displayed on the screen. A selection of "x" or "X" will exit the program to the operating system (DOS).

Additional functions are possible with the embodiment contained in the attached microfiche appendix, even though these functions are not presented to the user in the menu. For example, if the user enters "d", the seed cotton cleaner selection is changed, even though this is not listed as a menu choice. If "d" is selected, computer system 240 passes control bits to PLC 2050 to change the selection of seed cotton cleaners. If the user enters "g", computer system 240 requests PLC 2050 to switch to one lint cleaner. A selection of "h" generates a request to PLC 2050 to switch to two lint cleaners. A selection of "i" cycles paddle samplers 218 between open and closed. A selection of "j" cycles the position of calibration tiles used to calibrate the color and trash sensors at Stations 2 and 3. If the user enters "k", a tag message is checked. The tag message refers to the bar code information contained on the tag for each bale being processed. A selection of "l" cycles the sample collection means at Stations 1, 2, and 3 as they are done during a data collection phase. Finally, a selection of "m" cycles an additional sample collection means which may be used for infrared moisture measurements behind gin stand 150.

The getdata2 procedure is the primary procedure for data collection and process control. It cycles continuously until a function key is pressed to exit the procedure. This procedure starts by clearing the screen and initializing variables. This procedure sets up the frame grabber used in the trash measurement, checks function keys, and also measures analog inputs not related to color or trash. It checks the last moisture content readings to determine if they are within a reasonable range. If the moisture content readings are within a reasonable range, they are left unchanged. If the moisture content readings are not within a reasonable range, the procedure sets them to extreme values to flag them as incorrect readings for other parts of the code.

The getdata2 procedure then starts data collection at Station 1. The sample collection means at Station 1 is triggered to collect a sample, the most recent readings from Station 3 are added to the running total so that average values can be calculated, and a "wait closure" for Station 1 is executed. The wait_closure procedure waits for a certain period of time (time out period), or until closure of the sample collection means is verified through the use of position or proximity sensors, whichever comes first. At the beginning of the wait_closure procedure, the location of the bit that signals whether the sample collection means ("flapper") is closed is read, along with the number of seconds for the wait or time out period. If either the sample collection means is verified to be closed, or the time out period expires, the wait_closure procedure returns to the calling program. A flag is passed back indicating whether verification of closure of the sample collection means was obtained.

Once the sample collection means has closed, or the wait_closure procedure has "timed out", the getdata procedure collects the data for Station 1. Similar procedures are repeated for Stations 2 and 3. The getdata procedure controls color and trash data collection. The code executes based upon three camera counts of 0, 1, and 2. The code first sets up the frame grabber channel by switching the multiplexer between the three channels. Trash and color measurements are then made. The trash and color measurements are then analyzed to determine if the readings are within a reasonable range. If the readings are with-in a reasonable range, they are left unchanged. If the readings are not within a reasonable range, the readings are set to extreme values to flag other parts of the code that the readings are incorrect.

The getdata2 procedure also calculates the number of lint cleaners and the sequence of seed cotton cleaning recommended by dynamic programming model 1020. These calculations are made based upon measured values of Rd, +b, and percent area of trash. When measured values of moisture content are within an acceptable range indicating that they are reliable, actual measured values of moisture content are used in these calculations. Otherwise, a value of 5% moisture content is used in the calculations. This procedure also controls the number of decisions or readings that are required before a change in the number of lint cleaners is made. Finally, the getdata2 procedure checks the time of day, and opens a new file for data logging if the date has changed. This procedure also keeps track of when autocalibration is required at each measurement station. If the autocalibration feature is active and it is time for a new autocalibration, the autocal procedure is called.

In the attached embodiment, the autocal procedure is written to run automatic calibrations at Stations 2 or 3. Preferably, automatic calibration is performed at Station 1 as well. It would be readily apparent to one of skill in the relevant arts how to modify the attached code to perform automatic calibration at Station 1. The attached autocal procedure code is divided into two sections, one section for each station. The procedure begins by opening and closing the paddle samplers to which the calibration tiles for the sensors are attached. This removes dust that tends to settle on the calibration tiles. The calibration tiles are pulled across a section of lambs wool to clean them before calibration begins. When the calibration routine is completed, the calibration tile paddle samplers are again opened and closed several times to dislodge any cotton that may have been caught on the paddle samplers. The autocalibration procedure is described in more detail in U.S. Pat. No. 5,639,955, filed Feb. 8, 1996, the entirety of which is incorporated herein by reference.

The LCADV1.C includes several procedures for keeping track of bale numbers, and for calculating the means and modes of the measured parameters for each individual bale.

ii. COLORF.C

This file contains a collection of procedures that relate to color calibration based on a five tile procedure, to color measurement, and to measurement of other variables, such as analog moisture values and analog temperature data, using A/D converter 2010. All readings of A/D converter 2010 are made in this collection of procedures. This file also contains the compute_color procedure for converting to color code from the measured Rd and +b readings.

The mcmgr procedure in this file is the moisture content measurement manager software. It controls data collection from the resistance moisture sensors installed at Stations 1, 2, and 3.

iii. TRASHF.C

This file contains procedures for measurement of trash content. The do_a_frame procedure takes a reading from an individual frame of the channel being pointed to by the video multiplexer that is part of video input 2030. It determines whether an individual pixel should be considered as trash. It counts the number of pixels that are trash in the complete image, and converts this reading to the percent of the total number of pixels that are in the complete image. The file calls a number of library functions that deal with the frame grabber that is also part of video input 2030.

This file also contains a number of procedures for calibration. The trsh_cal procedure is for calibration of the trash reading based upon a properly presented trash tile. Adjustments to the Y, Z, and percent area readings based on the calibration tiles are calculated in the calc_ctile_adj procedure. The calc_ctmean procedure takes the mean of several readings of Rd, +b, or percent area and stores them in a matrix. This is used to check the correct readings of the autocalibration tiles.

iv. CONTDECF.C

This file contains the procedures for calculation or selection of the optimum process control decision using the gin decision matrix generated by dynamic programming model 1020. The ASCII file containing the gin decision matrix generated by dynamic programming model 1020 is opened, and the contents are read into a decision matrix within this C language program. The moisture content readings, as well as those for trash and color, are converted to indices which are then used to point into the decision matrix. The parea_to_clgr procedure converts the percent area measured by the trash meter to an estimated leaf value, used in the pricing of cotton. The scc_lookup procedure uses the values of Rd, +b, moisture and percent area to look up the optimum seed cotton cleaning sequence (between Stations 1 and 2) based on the decision matrix obtained from dynamic programming model 1020. The lc_lookup procedure uses the values of Rd, +b, moisture content and percent area to look up the optimum lint cleaning sequence (between Stations 2 and 3) based on the decision matrix obtained from dynamic programming model 1020. The lc_check and rule_of_thumb procedures are similar procedures used to adjust the decision relating to the number of lint cleaners being used to ensure that revenue is maximized. These two procedures use price structure 1024, as well as color and trash data from Station 3, to refine the decision for the number of lint cleaners based upon the level of cleaning actually achieved so that revenue is maximized. These two procedures ensure that in the region of a break point in price structure 1024, sufficient cotton cleaners are being used so that revenue will still be maximized.

v. DGTLIOF.C

This file contains procedures used in digital input and output (I/O). The main section of this code provides bitwise communication with PLC 2050, control of the sample collection means, and reading of the position sensors throughout the system. Additionally, procedures are provided for reading files on network 418 for communication with other computers that are measuring parameters associated with the gin system (kp_f_read and kp_f_write procedures). For example, some gins are equipped with a gin computer into which the ginner will enter data that is contained on tags attached to the modules or trailers of seed cotton entering the gin. This tag data may include, for example, the name of the farmer, the variety of cotton, the farm number, the field number, and the harvest date. The tag data can be transmitted via network 418 from the gin computer to computer system 240. The kp_f read and write procedures can be used to display and record the tag data. The kp_f_write procedure stores enough data to completely describe the current functioning of the system including: the tag data, the temperature of each of the dryers, the position of each of the seed cotton and lint cleaners, whether each gin stand is "in" or "out," the moisture content of the cotton at several places in the gin, the color and trash level of the cotton being ginned, the ginning rate, the bale number, and the mean value for the moisture, color, and trash of the last 10 bales. This information can be monitored from any computer on network 418 and displayed in near real time. In addition, it is possible to monitor the functioning of the gin from any computer through transfer of this data over telephone lines. In addition to displaying the tag data for the ginner, the tag data can also be used in determining the optimum process control decision. For example, default values for staple length and micronaire can be stored in a lookup table as a function of variety. The default value to be used by dynamic programming model 1020 for these two parameters can be obtained from such a lookup table after obtaining the variety from the tag data.

The flapper procedure is used tic control the flappers or sample collection means such as paddle sampler 218 or compression ram 216. Individual flappers can be opened or closed one at a time, or all flappers can be opened and closed at the same time. The calflap procedure controls movement of the flappers associated with the calibration tiles.

The chk_tagmsg procedure checks for a new bale tag message. The bale tag message is created by a computer at the bale press that reads the bar code tag that is attached to each bale of cotton. The bale tag message includes the bale number as well as the bale weight. The computer at the bale press sends the bale tag message to computer system 240 via network 418. If a new bale tag message is available on network 418, this message is read and stored by computer system 240 in a file, and the network file is erased. The chk_bc procedure monitors the state of a switch, usually a proximity switch attached to the bale press, to determine when bales are changed. This procedure reads the time at which the bale press turns, which is the exact moment that cotton is switched from the current bale into the next bale. The procedure provides for software debouncing to accommodate the bouncing encountered with mechanical switches.

The chk_lcu procedure reads the current number of lint cleaners for each of the gin stands, and the number of seed cotton cleaners being used, as transmitted to computer system 240 by PLC 2050.

The CompOK procedure provides a safety feature so that other computers or components in the system can detect if computer system 240 is not functioning properly. The code alternately switches one bit between high and low that resets a monostable multivibrator. If the code is operating properly, the monostable multivibrator will be continuously reset to the computer OK state. However, if the software stops proper operation of the computer, the monostable multivibrator is not reset, and this bit changes to an error condition that can be sensed by other computers or components in the system to detect that computer system 240 may not be functioning properly.

The wait_samp_open, wait_cal_closed, and wait_cal_open procedures all operate in a manner similar to the wait_closure procedure discussed above. At the beginning of the procedure, the byte and the bit signaling the opening (or closing) of the sample collection means ("flapper"; paddle sampler 218 or compression ram 216)), and a maximum number of seconds (time out period) the software is allowed to wait for the flapper to open, are read. This procedure reads the current state of the flapper as sensed by the proximity or position sensors, checks for keyboard function key entries, signals the monostable multivibrator not to time out, and checks the time. The process is repeated until a reading of open (or closed) is received from the proximity switch, or the time out period expires.

vi. DISPLAYF.C

This file displays information for the ginner on the display of control system 240 relating to the operation of the machinery, the process control decisions, how the control decisions are reached, and the bale averages for the past ten bales. The showCT procedure displays, for example, the data (color, trash, and moisture contents), current decisions, and current operating conditions (gin machine sequence currently being used). The showBA procedure displays data on the last ten bales processed through the gin. The show-CalBa procedure displays calibration and other data in the same area where the bale average data is normally displayed.

vii. LOGDATAF.C

This file contains procedures for logging data to hard disk drive 412 of computer system 240 and network 418. The procedures ensure that files are opened under unique names based on the date, and the files that have already been opened on that date. If a file is available on network 418 and hard disk drive 412, then the data is written to both locations.

viii. ".H" Files

The attached microfiche appendix contains twelve ".H" files which are external files that are included into the seven ".C" files discussed above. These files are used to include other files that are part of a Microsoft C package, files that are part of a color and trash measurement system obtained from MCI, and files that are part of a frame grabber system obtained from Catenary Systems.

HVICONST.H contains code that defines values and structures for the MCI color and trash measurement system. CAINC.H contains many of the external "includes." The three files "vicdefs.h, vicfcts.h, and vicerror.h" are part of the Victor Software Library for the frame grabber card. The three files "hviconst.h, hvimain.h, and driver.h" are part of the MCI package for the color and trash measurement cameras. The remainder of the files that are included in CAINC.H are part of the basic Microsoft C package. These are all files that contain drivers and software for the hardware in the system, as well as the operating system.

CADEF.H contains many of the "defines" used throughout process control decision and measurement program 1010. The defines in this file are addresses and unchanging variable values. CAEXT.H contains declarations for all the global variables that are used in program 1010.

The CAPROTO.H file contains the seven "include" files that have the declaration of the types for each of the seven ".C" files. They are located in separate files that correspond to the source code files that contain the C source code. The ColorPrt.h file contains the declarations for the procedures contained in the COLORF.C file. The declarations pertain primarily to color measurement and color calibration, but also include declarations of all the analog data collection that is used in the system. The TrashPrt.h file contains declarations for the procedures related to the frame grabber and trash measurements used in the TRASHF.C file. The ContDPrt.h file contains declarations for procedures used in the CONTDECF.C file. The DgtlIPrt.h file contains declarations for all of the procedures used in the DGTLIOF.C file for digital input and output (e.g., opening and closing flappers for sample collection as well as the bitwise data transfer between PLC 2050 and computer system 240). The DisplPrt.h file contains declarations for the procedures used in DISPLAYF.C to display data on the computer display in the gin. The LcadvPrt.h file contains declarations for the procedures used in LCADV1.C. The declarations for these procedures are related to control of data collection, calculation of means and modes of the collected data, and execution of autocalibration procedures. The LogDaPrt.h file contains declarations for the procedures contained in LOGDATAF.C.

An alternate embodiment of a screen display for the process control system of the present invention is shown in FIG. 17b. The screen display shown in FIG. 17b is representative of a display that would be provided for the ginner in a gin equipped with the preferred embodiment of process control decision and measurement program 1010 described immediately above. In the example shown in FIG. 17b, the gin is actually equipped with three parallel gin machinery sequences, identified as Gin 1, Gin 2, and Gin 3. FIG. 17b shows in the upper left hand corner, beneath the date/time display, that 1 cleaner (lint cleaner) is in operation for each of Gin 1, Gin 2, and Gin 3. FIG. 17b shows 1 Cleaner Recommended, i.e., the optimum gin machine sequence requires the use of one lint cleaner. Working On Station 1 indicates that color, trash content, and moisture content readings are being taken at Station 1.

The table in the upper right hand portion of FIG. 17b provides the current values of Color, %Area, and Moisture at Stations 1, 2, and 3. Rather than displaying the measured Rd and +b values, these values are transformed and displayed as color code and quadrant. The %Area and Leaf table that appears in the lower left hand corner of the FIG. 17b display provides a simplified transformation between the %Area trash measurement values and a manual leaf grade classification standard. This is provided as a quick reference guide so that the ginner can quickly correlate the %Area readings being displayed to a standard leaf grade classification.

The table in the lower right hand corner of FIG. 17b provides a history of the last 8 bales for the ginner. The show BA procedure discussed above is written to display the last 10 bales. This procedure could be readily modified by one of skill in the art to display a history of the last "N" bales as selected by the ginner. In a typical gin, a bale is processed through a sequence such as the one shown in FIG. 2 approximately every two minutes. Thus, the lower right hand table in FIG. 17b provides the ginner with data from approximately the previous 16 minutes of operation. The first column identifies the bale number. The second and third columns display the average values of color and leaf grade for each bale at Station 2 (Before LC—Lint Cleaner) and Station 3 (After LC—Lint Cleaner), respectively. The average moisture value for each bale at Stations 1, 2, and 3 is also displayed.

The screen display shown in FIG. 17b could be readily modified by one of skill in the art to display additional information for a ginner. Such additional information could include, for example, bale weight, gin rate, and bale moisture content.

b. Dynamic Programming Model 1020

In the embodiment shown in FIG. 10, dynamic programming model 1020 is a program separate from process control decision and measurement program 1010. In one such embodiment, dynamic programming model 1020 is implemented using the FORTRAN programming language and is run off-line to generate the gin decision matrix prior to running process control decision and measurement program 1010. In a preferred embodiment, dynamic programming model 1020 is written in the C programming language and is incorporated into process control decision and measurement program 1010 so that dynamic programming model 1020 is running in real-time rather than off-line.

Dynamic programming model 1020 includes a gin model 1022 that uses price structure 1024 of the cotton as an input. Dynamic programming model 1020 uses price structure 1024, cotton quality parameters 1026, and the performance characteristics for each gin machine to determine the optimum machinery sequence to maximize returns to the producers. Dynamic programming model 1020 uses input information relative to the moisture content, color (reflectance=Rd and yellowness=+b), trash content, maximum possible turnout, price structure of the cotton market, and energy cost to determine the optimum drying and cleaning sequence.

When lint is sold, the price is determined by its final length, leaf grade, and color grade. Color grade is a step function of values such as 21, 31, 41, 51, etc. The present invention tracks two components of color, Rd and +b, which are continuous functions. A conversion or lookup table is used to convert between Rd, +b and color grades. Such a conversion table is contained in file UPLND.COL in the attached microfiche appendix.

Monetary returns are a function of the quality of lint cotton after ginning, and are determined by color grade, leaf grade, staple length and micronaire. The staple length and micronaire fiber qualities are established before the cotton is removed from the plant. The micronaire is influenced only minimally by gin machinery, but the length is affected by the degree of drying and cleaning. The color of the cotton is strongly influenced by the weathering effects in the field. Gin machines, especially lint cleaners, tend to comb and blend the cotton and have been shown to improve the color grade.

Cleaning machinery improves the color grade and leaf grade of lint cotton by removing foreign matter and by blending the cotton. As the machines clean and blend, they change the fiber length. They also remove some lint that could be included as marketable lint, thereby reducing the lint turnout. Lint turnout, normally expressed in percent, is the ratio of the weight of lint to the weight of the seed cotton before removal of the cottonseed moisture, and foreign matter. Lint turnout is a function of the genetic characteristics of the cotton and of the amount of foreign material in the cotton. Thus, the return to a producer for a given quantity of seedcotton with a specific staple length and micronaire is a function of the lint turnout, color grade, and leaf grade.

Dynamic programming is used to model the ginning process to determine which combination of ginning operations maximize the return from the cotton. Dynamic programming can be applied to many problems that can be structured as a multistage system, and ginning can be considered a multistage system in which each operation represents a stage. A schematic of the ginning process is shown in FIG. 1. The gin stand 150 and bale press 170 stages are always required, and the other processes are optional.

In dynamic programming, the state of the cotton as it moves through the gin must be described. This description is accomplished with six state variables: foreign matter (leaf); Rd and +b, together representing color; moisture content (percent); staple length (inches); and turnout (percent). These variables are designated herein as LF, RD, PB, M, LN, and T, respectively. The decision at each operation depends on the state of the cotton entering that operation. Once the solution to the total problem has been obtained, the decisions can be related to the state of cotton when it enters the gin. Thus, the optimum decision at each operation can be determined from the initial state of the cotton.

The objective of dynamic programming model 1020 is to maximize the net return; i.e., the revenue from the lint cotton minus the costs of the ginning operations. The variable "$F_i$ ( $RD_i$, $PB_i$, $LF_i$, $LN_i$, $M_i$, $T_i$ )" is used to represent the net return from 100 pounds of seed cotton, assuming that cotton enters the gin just before operation i, that it is in state "$RD_i$, $PB_i$, $LF_i$, $LN_i$, $M_i$, $T_i$," and that optimal decisions are made at operation i and at all operations that follow it in the gin. Any revenues or costs that do not vary with the decisions (e.g., revenue from seed cotton and cost of operating the gin stand) are not included, since they will not affect the optimum decisions.

The operations of the gin alter the state of the cotton. The state at the output of any operation i, is a function of the input state and the decision (D) at that operation: i.e., $RD_i' = t_i(RD_i, PB_i, LF_i, LN_i, M_i, T_i, D_i)$,
$PB_i' = t_i(RD_i, PB_i, LF_i, LN_i, M_i, T_i, D_i)$,
$LF_i' = t_i(RD_i, PB_i, LF_i, LN_i, M_i, T_i, D_i)$,
$LN_i' = t_i(RD_i, PB_i, LF_i, LN_i, M_i, T_i, D_i)$,
$M_i' = t_i(RD_i, PB_i, LF_i, LN_i, M_i, T_i, D_i)$,
and
$T_i' = t_i(RD_i, P_i, LF_i, LN_i, M_i, T_i, D_i)$, where $RD_i'$, $PB_i'$, $LF_i'$, $LN_i'$, $M_i'$, and $T_i'$ represent the output state variables. The transition functions for each operation may be represented by performance tables or equations, as discussed in more detail below. The output state of one operation is the input state of the following operation.

Dynamic programming is based on the "principle of optimality, as discussed in Bellman, R. *Dynamic Programming*, Princeton University Press, Princeton, N.J. (1957). The reference states that "[a]n optimal policy has the property that whatever the initial state and initial decision are, the remaining decisions must constitute an optimal policy with regard to the state resulting from the first decision." This "principle of optimality" leads to the following recursive equations:

$$F_1(S_1) = \underset{D_1}{\text{Max}} [F_1(S_1, D_1)]$$

and $$F_i(S_i) = \underset{D_i}{\text{Max}} [R_i(S_i, D_i) + F_{i-1}(S'_i)]$$

where

F=Function,

S=State variables,

R=Returns,

D=Decision, and t=Transition function.

$(R_i(S_i,D_i)$ is the return for stage i. For the ginning problem, these returns represent the negative of the operating cost for each operation. State variable $S_i$ is a six-dimensional vector, "$RD_i, PB_i, LF_i, LN_i, M_i, T_i$."

In the gin, the last operation is the press (See FIG. 1). Thus, that operation is the first one to be considered in the dynamic programming formulation. There is no decision, and $F_P$ ($RD_P, PB_P, LF_P, LN_P, M_P, T_P$) is obtained as follows:

$F_P(RD_P, PB_P, LF_P, LN_P, M_P, T_P) = (T_P/100) \times (PRICE(RD_P, PB_P, LF_P, LN_P, M_P)) \times 100$, where PRICE ($RD_P, PB_P, LF_P, LN_P$)=price per pound of lint of grade $C_P, LF_P, LN_P$, $C_P$=Final color; based on $PB_P$ and $RD_P$, $M_P$=Moisture content of the cotton at the press, $PB_P$=Plus b at the press, $LF_P$=Leaf at the press, $T_P$=Turnout at the press, $LN_P$=Length, and $RD_P$=Reflectance at the press Moving backward through the system shown in FIG. 1, the next operation is the lint cleaners. The decision at this operation is to use zero, one, or two lint cleaners. The number is determined from $F_L(RD_L, PB_L, LF_L, LN_L, M_L, T_L) =$ $$\begin{cases} F_P(RD_L, PB_L, LF_L, LN_L, M_L, T_L), \text{ for } D_L = 0 \\ \text{or} \\ -E_L(RD_L, PB_L, LF_L, LN_L, M_L) \times D_L \times COSTE - \\ F_P(RD'_L, PB'_L, LF'_L, LN'_L, M'_L, T'_L) \\ \text{for } D_L = 1 \text{ or } 2 \end{cases}$$

with the following transition functions:

$RD_L' = t_L (RD_L, PB_L, LF_L, LN_L, M_L, T_L)$, $PB_L' = t_L (RD_L, PB_L, LF_L, LN_L, M_L, T_L)$, $LF_L' = t_L (RD_L, PB_L, LF_L, LN_L, M_L, T_L)$, $LN_L' = t_L (RD_L, PB_L, LF_L, LN_L, M_L, T_L)$, $M_L' = M_L$, and $T_L' = t_L'(RD_L, PB_L, LF_L, LN_L, M_L, T_L, D_L)$ where F=Function, RD=Reflectance, PB=Plus B, LF=Leaf, LN=Length, M=Moisture, T=Turnout, E=Energy, D=Decision, t=Transition function, L=Lint cleaner, and COSTE=Cost per unit of electricity.

$E_L$ ($RD_L, PB_L, LF_L, LN_L, M_L$), the amount of electricity required to operate one lint cleaner, varies with the color, trash, length and moisture content of the cotton at the input of the lint cleaners. The electrical energy consumption (W-h/kg) for the various types of gin machinery as a function of color grade, leaf grade, and moisture content is shown in Table 1. COSTE is the cost per unit of the electricity.

At the gin stand, no decision is to be made since the gin stand must be included. However, the gin stand changes the state of the cotton so it must be included in the analysis. Thus, $F_G$ ($RD_G, PB_G, LF_G, LN_G, M_G, T_G$)=$F_L$ ($RD_G', PB_G', LF_G', LN_G', M_G', T_G'$), $RD_G' = t_G (RD_G, PB_G, LF_G, LN_G, M_G, T_G)$ $PB_G' = t_G (RD_G, PB_G, LF_G, LN_G, M_G, T_G)$ where $LF_G' = t_G (RD_G, PB_G, LF_G, LN_G, M_G, T_G)$ $LN_G' = t_G (RD_G, PB_G, LF_G, LN_G, M_G, T_G)$ $M_G' = M_G$ and $T_G' = t_G' (RD_G, PB_G, LF_G, LN_G, M_G, T_G)$.

In a manner similar to that used at the lint cleaners, the problem solving continues for one operation at a time. Gin model 1022 is used to solve the problem. In the program, the state variables for each operation are permitted to vary over the ranges and increments shown below:

|       | Range      | Increments |
| ----- | ---------- | ---------- |
| RD    | 50–81      | 0.5        |
| PB    | 5.0–14.0   | 0.5        |
| $M_i$ | 3.0–9.5    | 0.25       |
| LF    | 2.0–8.0    | 0.1        |
| $T_i$ | 30–40      | 0.25       |
| LN    | 1.00–1.20  | 0.01       |

As the problem is solved, the optimal decision for each possible input state is stored as a six-dimensional array or matrix in an ASCII file (gin decision matrix). Thus, once the solution for the whole problem is completed, the program can start at the first operation (first drier shown in FIG. 1) with a particular input state, and then use the transition functions to move sequentially through the operations and identify the optimal decision for each one. Hence, the optimal ginning sequence can be determined from the state of cotton when it enters the gin.

Table 2 illustrates the possible decisions, transition functions, and optimal return functions for each ginning operation. In one embodiment of the present invention, the transition functions of Table 2 are implemented using a series of tabular values, such as those contained in Tables 3 through 15. Tables 3–15 were developed using three state variables, composite grade (G), moisture (M), and turnout (T). Historically, the U.S. Department of Agriculture (USDA) graded or classified cotton based on human assessment of the color and trash content (leaf grade) of the cotton, as well as on the fiber length and micronaire. Prior to 1993, color grade and leaf grade were combined into a composite grade, and the market price of cotton was based on this composite grade. The tabular transition functions of Tables 3 through 15 provide performance tables for the various types of gin machinery based on the state variables of composite grade, moisture content, and turnout. For example, Table 3 quantifies the effect of one lint cleaner by providing the final composite grade as a function of the initial composite grade and moisture content. Similarly, Table 9 quantifies the effect of one lint cleaner by providing the turnout as a function of the initial composite grade and moisture content.

Tables 3–15 can be used to generate a gin decision matrix containing machine decisions as a function of moisture and initial composite grade. A typical decision matrix for a market price based on Strict Low Middling at $0.70 per pound and a maximum color grade of Middling is shown in Table 16. The machinery specified by the sequence codes in Table 16 is identified in Table 17. The gin decision matrix is written by dynamic programming model 1020 into an ASCII file that is read by process control decision and measurement program 1010. The machinery sequence file, such as that shown in Table 17, can be part of process control decision and measurement program 1010.

Table 18 shows a comparison of typical returns for the USDA recommended sequence and the model sequence generated by dynamic programming model 1020 and Tables 3–15. The dollar values are based upon an input of 100 lb of seed cotton. Typically in the United States, 1500 lb of spindle harvested seed cotton is needed to produce a 500 lb bale of lint. Thus, the increased dollar value with use of the present invention can be on the order of $7–$23 per bale.

In a particularly preferred embodiment of dynamic programming model 1020, the six state variables of leaf, Rd, +b, moisture content, staple length, and turnout are used, and the transition functions of Table 2 are implemented through algorithms contained in subroutines of dynamic programming model 1020. A particularly preferred embodiment of dynamic programming model 1020 is contained in the attached microfiche appendix. This source code uses a set of state variables as follows:

| LF | leaf (trash) |
|----|--------------|
| M  | moisture     |
| RD | reflectance  |
| TO | turnout      |
| LN | length       |
| PB | +b           |

These state variables appear throughout the source code with various suffixes that represent the processing stage at that point in the program. A suffix of "T" indicates the "INT" or initial condition of the variable; a suffix of "L" indicates the actual condition of the variable after processing through the respective machine; and a suffix of "M" indicates the maximum condition of the variable after processing through the respective machine. Before processing by a machine, each variable has an initial value. The variables are then processed through a machine using the transition functions to produce the "L" suffix variables. If the "L" suffix variable is better with the machine than without the machine, this variable then becomes an "M" suffix variable. The initial value for the next machine is set to be the value that came out of the previous machine. Subroutines OPT and OPTM carry out the transition and optimal return functions identified in Table 2 by cycling through the subroutines for the various machines. Subroutine OPT does a complete enumeration of all possible solutions. Subroutine OPTM retains the optimum or maximum values found from subroutine OPT.

In one embodiment, dynamic programming model 1020 operates in an "interactive" mode by evaluating the transition functions for only one specific value of each state variable, as input, for example, by the user. The computations are made based on one value for each state variable, and the optimum gin decision for that value of the state variables is generated. In this manner, the optimum gin decisions are being generated one at a time, in real-time. This embodiment of dynamic programming model 1020 is contained in file COTTON.C in the attached microfiche appendix. Alternatively, this embodiment of dynamic programming model 1020 can be implemented in the FORTRAN programming language.

In an alternate embodiment, dynamic programming model 1020 operates in a "batch" mode by generating decisions using the entire value range for each state variable. This embodiment of the program evaluates all possible combinations of state variables within the value and increment ranges given above, and generates all possible decisions which are stored in a gin decision matrix. The primary difference between this embodiment of dynamic programming model 1020 and that contained in file COTTON.C is in the MAIN routine which iterates to cover the entire range of values for the state variables. The MAIN routine for the batch embodiment is contained in file COTTONL.C in the attached microfiche appendix.

The data used by COTTON.C and COTTONL.C is contained in the attached files DRIER.DAT, GREENE.CCC, and UPLND.COL. The optimum decisions for the range of input cotton properties are output to two files: LCDEC95A.OUT; and SCCD95A.OUT. The data file LCDEC95A.OUT has the optimum decisions for the lint cleaner portion of the gin (between Stations 2 and 3) and data file SCCD95A.OUT has the optimum decisions for the seed cotton cleaning portions of the gin (between Stations 1 and 2).

Gin control, including data collection and display, is implemented through the set of "C" language instructions contained in the seven ".C" files and 13 external included ".HI" files discussed above in Section 3.a, using the decisions in LCDEC95A.OUT and SCCD95A.OUT. Data on the current operation of the gin is written to the files: BDATF-.DAT; BA.DAT; and OTHER.DAT. These files are also read by the control program upon initialization to determine initial settings.

Each machine in FIG. 2 has a corresponding subroutine in dynamic programming model 1020. If the particular machine is not used in a sequence, then the set of state variables is unaffected by that machine. If the particular machine is used in a sequence, then the subroutine contains an algorithm that indicates how the set of state variables is affected by that machine. A particular machine may not affect each of the state variables so that only the affected variables are adjusted in the machine subroutine. For example, the various cleaners do not affect the moisture content of the cotton. Consequently, the moisture after each of the cleaners (SML) will be the same as the moisture going into that particular cleaner (SM). As another example, driers have a great impact on the moisture content of the cotton, but do not affect the color. Consequently, the Rd and +b after a particular drier (SRDL and SPBL) will be the same as the Rd and +b going into that particular drier (SRD and SPB). Although length and turnout are not measured parameters, the change to the reference or default value of these state variables is computed since they are affected by the gin machinery.

The particular algorithms used to quantify the effect on the cotton properties identified by the set of state variables are not absolute, and can be varied by one of skill in the relevant arts to account for differences in machinery configuration, machinery wear and tear, and the cotton varieties typically processed. The following algorithms are exemplary, and it is to be understood that the present invention is not limited to use of the algorithms that follow.

In one embodiment, the cotton properties identified by the set of state variables are affected by a cylinder cleaner (subroutine CC) as follows:

SLFL=−0.1305−0.0619*SM+1.0599*SLF
SML=SM
SRDL=3.4151−0.0008*SM+0.9606*SRD
STOL=−0.6071−0.0057*SM+1.0127*STO
SLNL=0.2557−0.0012*SM+0.7764*SLN
SPBL=2.8104−0.0137*SM+0.6457*SPB

In one embodiment, the cotton properties identified by the set of state variables are affected by a gin stand (subroutine GINSTD) as follows:

SLFL=SLF
SML=SM
SRDL=19.52−0.12*SM+0.75*SRD
STOL=9.22+0.14*SM+0.72*STO
SLNL=0.31+0.002*SM+0.72*SLN
SPBL=1.50+0.02*SM+0.81*SPB

In one embodiment, the cotton properties identified by the set of state variables are affected by an impact cleaner (subroutine IC) as follows:

SLFL=−0.1305−0.0619*SM+1.0599*SLF
SML=SM
SRDL=3.4151−0.0008*SM+0.9606*SRD
STOL=−0.6071−0.0057*SM+1.0127*STO
SLNL=0.2557−0.0012*SM+0.7764*SLN
SPBL=2.8104−0.0137*SM+0.6457*SPB

In one embodiment, the cotton properties identified by the set of state variables are affected by one lint cleaner (subroutine LC) as follows:

SLFL=−0.6665+0.0937*SM+0.8296*SLF
SML=SM
SRDL=25.9279−0.0834*SM+0.6757*SRD
STOL=−8.0604−0.1694*SM+1.2043*STO
SLNL=0.1742+0.0003*SM+0.8288*SLN
SPBL=3.3751−0.0222*SM+0.5970*SPB

In one embodiment, the cotton properties identified by the set of state variables are affected by two lint cleaners (subroutine LC) as follows:

SLFL=−1.0150+0.1483*SM+0.7278*SLF
SML=SM
SRDL=38.1983−0.2905*SM+0.5302*SRD
STOL=−12.6405−0.1969*SM+1.3191*STO
SLNL=−0.0520+0.0003*SM+1.0266*SLN
SPBL=2.3649−0.0183*SM+0.7439*SPB

In one embodiment, the cotton properties identified by the set of state variables are affected by a stick machine (subroutine STMCH) as follows:

SLFL=0.1625−0.0710*SM+1.0326*SLF
SML=SM
SRDL=2.3777−0.0299*SM+0.9736*SRD
STOL=1.8168−0.0011*SM+0.9419*STO
SLNL=0.1996−0.0003*SM+0.8226*SLN
SPBL=1.8629−0.0025*SM+0.7587*SPB

In one embodiment, the cotton properties identified by the set of state variables are affected by a drier (subroutine DRIER) as follows:

SLFL=SLF
SRDL=SRD
STOL=STO*(1.0−(SM−SML)/100.0)
SLNL=SLN
SPBL=SPB
SML=4.2767+0.6397*SM−0.1713*TEMP where TEMP represents the temperature of the drier.

A table of values can also be used to determine the affect on moisture of the drier (see Table 19). Table 19 includes the moisture content after drying at temperatures of 65.5, 93.2, 120.9, and 131° C. as a function of initial moisture content before drying. This data is accessed by dynamic programming model 1020 through the DRIER.DAT file in the microfiche appendix. If the moisture of the cotton that is input to the drier (SM) is in the range of 4–14%, then subroutine TABLI2 determines the moisture content of the cotton after drying (SML). If the moisture is out of range, then the closest in-range value (either 4% or 14%) is used as a default. To control the moisture content, the present invention can be configured to vary the temperature of the driers, for example in increments of 50° F. The present invention can also be configured to bypass all of a drier, or to use a portion of a drier, for example ¼ (6 shelves) or ½ (12 shelves).

Dynamic programming model 1020 uses a standard subroutine, GINCOM, for variable dimensions and declarations to ensure that all information is in the same format. A subroutine CHGSYS is provided so that a user can input the status of the gin machines. For example, if a particular machine is not available in the gin, the user can input this information so that this machine is not included in the optimization sequence. In this manner, the present invention can be customized for use in various gins with varying configurations of ginning machines.

The monetary return or value of the cotton is calculated by the function CLINT. One example of price structure 1024 is included in the GREENE.CCC file in the attached microfiche appendix. The GREENE.CCC file contains premiums and discounts that are used to adjust a base price of cotton. The premiums and discounts in the GREENE.CCC file are for a given color grade, leaf grade, and staple length as set by the Commodity Credit Corporation (CCC). The base price of the cotton is coded into dynamic programming model 1020 as the cost per pound, and the values in the GREENE.CCC file are divided by 100 and added to the base price. Negative entries in the GREENE.CCC file represent discounts that reduce the base price. Price structure 1024 may be from any source, as long as it is in a format compatible with dynamic programming model 1020.

FIG. 18 shows an output of optimum ginning decisions from dynamic programming model 1020. "Input States" refers to the state of each of the state variables at the input to the machine listed in that row of the table. The OUTPUT line identifies the value of the main variables after processing in accordance with the decisions for each machine as identified in the "DEC" decision column (a "0" indicates the machine is not used; a "1" indicates the machine is used; for the driers, "0"=no drier; "1"=150° F.; "2"=200° F.; "3"=250° F.; and "4"=300° F.).

Table 18a shows a comparison of typical returns for the USDA recommended sequence and the model sequence generated by dynamic programming model 1020 using the algorithms described herein. The dollar values are based upon an initial input of 100 lb of cotton, having a price of $0.7960 per pound. The increase in dollar value using the system and method of the present invention can be on the order of $13–$34 per bale.

As discussed in Anthony, W. S. and S. T. Rayburn, *Cleanability of Smooth- and Hairy-Leaf Cottons—Quality Effects*, Transactions of the ASAE, Vol. 32, No. 4, pp. 1127–1130 (1989), the leaf hairiness of cotton affects its cleanability. The cleaning efficiency of cleaning machinery is lower for hairy-leaf varieties of cotton than for smooth-leaf varieties of cotton. This characteristic impacts two of the state variables that are used by dynamic programming model 1020, i.e., trash and turnout. The other four state variables are unaffected by this characteristic, and are the same for smooth and hairy leaf varieties of cotton. Because of this cleanability characteristic, the transition functions or performance algorithms for smooth- and hairy-leaf varieties have statistically different coefficients for trash and turnout. Using algorithms that take into account this cleanability characteristic reduces the need for error feedback. The predicted values of the state variables more closely approximate the actual values of the state variables when separate algorithms having different coefficients are used for smooth- and hairy-leaf varieties of cotton.

In a further embodiment of the present invention, two sets of algorithms are used, one for smooth-leaf varieties of cotton, and one for hairy-leaf varieties of cotton. In such an embodiment, the variety of cotton (part of the module tag data) is input to computer system 240 either directly, or via network 418 from the gin computer (see Section 3.a.v. above). Process control decision and measurement program 1010 uses a lookup table to identify by variety of cotton, a reference staple length and whether that variety is smooth-leaf or hairy-leaf. The values in such a lookup table would be readily apparent to one of skill in the relevant art. Dynamic programming model 1020 then uses the reference staple length and the appropriate smoothleaf or hairy-leaf algorithms to generate the optimum gin decisions. A default of hairy-leaf, and a staple length of 1.12 inches, are preferably used if no variety is input.

In a preferred embodiment, the smooth-leaf algorithms are obtained by modifying the algorithms, i.e., the coefficients of the state variables, given above as follows. Any equation not changed remains as given above.

Cylinder Cleaner

SLFL=0.0538−0.0913*SM+1.0617*SLF

STOL=−0.6839+0.0098*SM+1.0119*STO

Impact Cleaner

SLFL=0.3634+0.0128*SM+0.8572*SLF

STOL=0.8109−0.0606*SM+0.9784*STO

One Lint Cleaner

SLFL=−0.1213+0.0395*SM+0.7488*SLF

STOL=−15.5084−0.1566*SM+1.4290*STO

Two Lint Cleaners

SLFL=−0.6638 +0.1320*SM+0.6425*SLF

STOL=−20.4123−0.1928*SM+1.5585*STO

Stick Machine

SLFL=0.3564−0.0643*SM+0.9573*SLF

STOL=−0.4192+0.0490*SM+0.9997*STO

In a preferred embodiment, the hairy-leaf algorithms are obtained by modifying the algorithms, i.e., the coefficients of the state variables, given above as follows. Any equation not changed remains as given above.

Cylinder Cleaner

SLFL=−0.4301−0.0259*SM+1.0709*SLF

STOL=0.0035−0.0257*SM+0.9993*STO

Impact Cleaner

SLFL=−0.0675+0.0249*SM+0.9544*SLF

STOL=0.7170−0.0441*SM+0.9778*STO

One Lint Cleaner SLFL=−1.0871+0.2083*SM+0.8256*SLF STOL=−18.4213−0.2101*SM+1.4888*STO Two Lint Cleaners

SLFL=−1.2258+0.2098*SM+0.7387*SLF

STOL=−36.5362−0.2445*SM+1.9773*STO

Stick Machine

SLFL=0.0965−0.0476*SM+1.0501*SLF STOL=3.8250−0.0628*SM+0.8955*STO

In yet a further embodiment of the present invention, the error feedback data ($Error_{12}$, $Error_{23}$ and associated predicted values) are used to modify the coefficients of the state variables in the algorithms. This reduces the amount of error, and $Error_{12}$ and $Error_{23}$ would eventually approach zero with predicted values equal to actual values. One way to modify the coefficients in the algorithms using the error feedback data is through the use of a neural net. By neural net is meant a computer program that recognizes patterns and is designed to take a pattern of data and generalize from it. A neural net typically takes pairs of input and output data and matches them, thereby "training" the neural net. Once a neural net has been trained, new data can be input and the net will output a learned response. Neural nets can readily be integrated by one of skill in the art into an existing computer program. A neural net could thus be used to match or correlate algorithm coefficients with error feedback data so that the error was minimized. Once the neural net was trained with matched algorithm coefficients and error feedback data, the algorithms could be determined as a function of the error feedback data generated during operation of the present invention.

C. Process Control Implementation Program 1030

In a preferred embodiment, process control implementation program 1030 is implemented using the C programming language as part of process control decision and measurement program 1010. The embodiment of process control decision and measurement program 1010 attached hereto in the microfiche appendix includes the code for carrying out process control implementation program 1030. Alternatively, implementation program 1030 may be a separate program that is called by process control decision and measurement program 1010. Program 1030 performs the function of implementing the selected optimum gin process control decision, as indicated by 1032 (see FIG. 10). To implement the optimum gin process control decision, program 1030 controls valves, such as the automated directional valves of the present invention, to route the cotton through the selected machinery sequence, as shown at 1036. Program 1030 uses valve position sensor data 1034 to verify proper valve position.

If a change of valve settings is to be made, program 1030 uses valve position sensor data 1034 to determine what change needs to be made. The appropriate valve control signals 1036 are sent to cause power units, such as air cylinders, rotary actuators, hydraulic motors, electric motors, etc. to be activated to change the position of the valves.

In the preferred embodiment, PLC 2050 (see FIG. 20) is used to send valve control signals 1036 to change the position of the valves. Program 1030 causes signals to be sent from computer system 240 through digital interface 2040 to PLC 2050 to control the valves that put the selected machinery sequence on-line. Lines D17 and D18 output from digital interface 2040 are used by computer system 240 to request that selected lint cleaners be put on-line. Lines D30 and D31 output from digital interface 2040 are used by computer system 240 to request that selected seed cotton cleaners (e.g., impact cleaners and stick machines) be put on-line. Output line D19 is used by computer system 240 as a handshake line with PLC 2050 to ensure that the request is valid.

With reference to the C language program contained in the attached microfiche appendix, the PLC_scc and PLC_lc procedures are used to control the signals sent to PLC 2050 that control the request for seed cotton cleaning equipment and lint cleaning equipment, respectively. Depending on the function passed to each procedure, it can either: (1) set the handshake signal (D19) to untrue, meaning the value on the request lines (D17, D18, D30, and D31) is invalid and no change should be made; or (2) set the handshake signal to true, and set the request lines for 0, 1, 2, or 3 cleaners, meaning that the value is valid and the bits represent proper data for the number of cleaners (seed cotton or lint) to be used.

PLC 2050 is programmed to carry out the instructions generated by process control implementation program 1030. PLC 2050 is programmed to continuously check the settings of the cleaner request lines (D17, D18, D30, and D31) while computer valid line (D20) remains true, and after handshake line D19 returns to true. If the settings of the cleaner request lines have changed, and the switch on ginner's control panel 2060 has been selected for automated control, then PLC 2050 initiates the change in valve settings required to carry out the request for the selected machinery. Once a change in valve settings is initiated by PLC 2050, further changes are not accepted by PLC 2050 until the current change is complete.

In some gins, the ginner may turn power off to certain machinery that is usually in the bypass configuration, such as seed cotton cleaners in excess of the number typically used. In that situation, PLC 2050 may be programmed to check if power is applied to a particular piece of machinery before signaling the valve for that piece of machinery to change from the bypass position to the diversion or on-line position.

Valves are used to control the flow of cotton through the gin. The valves are positioned-to route the cotton through a selected machine (the diversion position with the machine on-line in the cotton flow), or to route the cotton so that it bypasses a particular machine (the bypass position). Particularly preferred valves are the automated valves of the present invention, described above with respect to FIGS. 5–9. Proximity switches or sensors are installed on the valves that control the flow of cotton. Suitable proximity switches include those that are installed on the outside of an air piston cylinder to sense the position of the piston in the air cylinder that is used to control the position of the valve (see, for example, air cylinders 621, 623, and 629 in FIG. 6). Other suitable proximity switches include commercially available reed relay and magnet switches. With such a proximity switch, the magnet is preferably mounted on the shaft of the valve. The reed relay and magnet switches are more sensitive to valve position, more flexible in mounting position, and more sensitive for detecting a larger range of error conditions. A particular valve may be equipped with more than one proximity switch or sensor so that the system could detect whether the valve is positioned in the fully opened or fully closed position. Internal sensors on the cylinders and actuators could alternatively be used.

To change the position or setting of a particular valve, PLC 2050 sends a signal to the air cylinder controlling that valve to either extend or retract, thereby changing the position of the valve in the desired manner. The interface between the air cylinder and PLC 2050 can be done in a conventional manner, and is omitted for brevity. To ensure that the valve is in the desired position, PLC 2050 reads valve position sensor data 1034 to determine the actual valve position. While the position of a valve is being changed, valve position sensor data 1034 indicates that the valve is neither open nor closed. If the valve becomes jammed, or cotton prevents the valve from moving fully into the requested (open or closed) position, PLC 2050 senses an error condition. The error condition signals for operator assistance.

Computer system 240, through the use of PLC 2050, controls the opening and closing of the automated valves of the present invention. PLC 2050 is programmed to sequence the valves to transition from the bypass mode of operation to the diversion mode of operation, and to sequence the valves to transition from the diversion mode of operation to the bypass mode of operation. With the automated valves of the present invention (see FIGS. 5–9), the valves are transitioned without stopping the flow of cotton through the gin. Computer system 240 directs PLC 2050 to change the positions of the automated valves of the present invention while cotton is flowing through the system. To accomplish this, control hardware is provided at ginner's control panel 2060 that preferably includes a thumbwheel switch that can be set to indicate the number of lint cleaners being used. For example, a thumbwheel switch setting of "0" would indicate that no lint cleaners were being used, a setting of "1" would indicate one lint cleaner, etc. The control hardware also preferably includes a push button switch to lock in the lint cleaner selection made through use of the thumbwheel switch. In a preferred embodiment, a series of indicators is included in the control hardware. Each of the lint cleaners has an indicator that indicates whether that lint cleaner has been selected for operation. A "not ready" indicator is also preferably provided that comes on when a new lint cleaning configuration is chosen and stays on until all the valves have been set and the system is ready to resume ginning.

In addition to the automated computer control of the valves through PLC 2050, a set of switches can directly communicate with PLC 2050 to allow the gin operator to select any or all of the valve settings, overriding whatever optimum selection has been indicated.

Figure 19A:
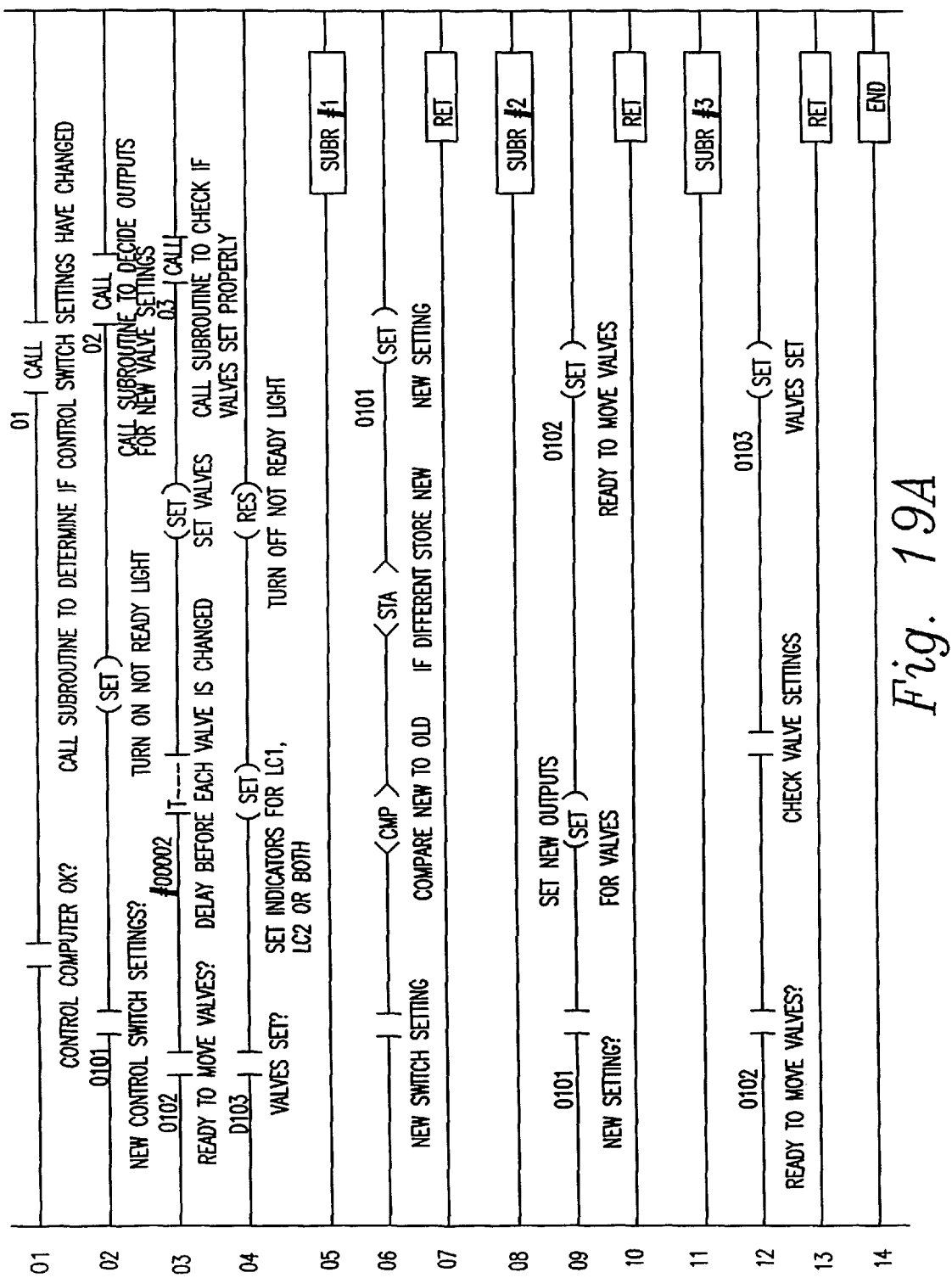
FIG. 19a shows a ladder diagram for implementing an embodiment of the present invention that includes automated valves.
Figure 19B:
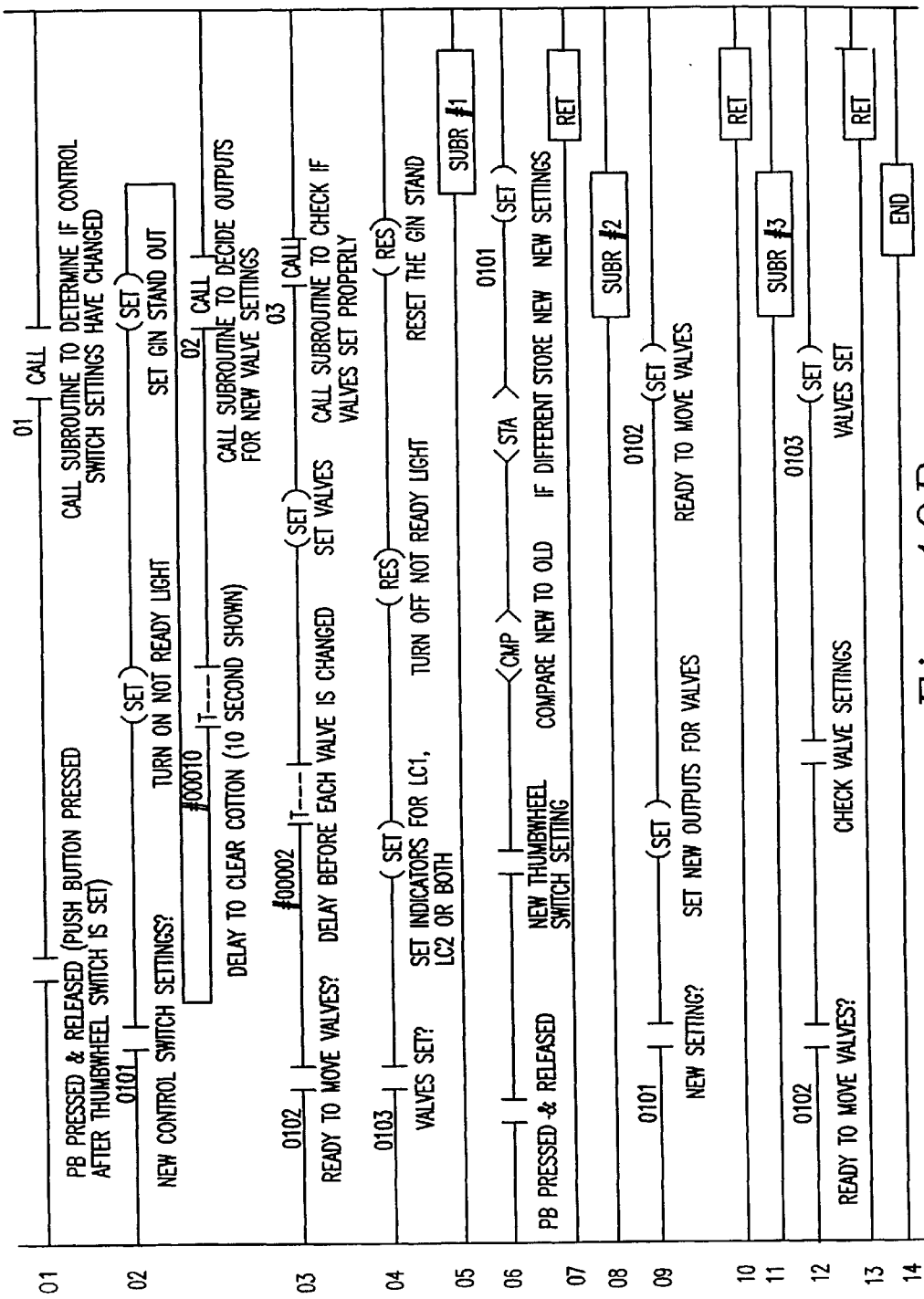
FIG. 19b shows a ladder diagram for implementing an embodiment of the present invention that includes semiautomated valves.

FIG. 19a shows a ladder diagram for programming a PLC to sequence the valves to transition between the diversion and bypass modes of operation. On the ladder diagram shown in FIG. 19a (and 19b discussed below), each line where a function or action is performed starts with a set of double lines that represents a relay or switch contact. If the contact is closed, the function on that line is executed. A relay is indicated in FIGS. 19a and 19b through the use of ( res ) or ( set ).

The main program is contained in lines 01 through 04 of FIG. 19a. Line 01 starts by determining whether the control computer is okay. Subroutine 01 is called to determine if the control switch settings have changed. Line 02 starts by determining whether there is a new control switch setting. This contact is labeled "0101" which corresponds to the "new setting" relay in line 06. Line 02 turns on the "not ready" light and calls subroutine 02 to decide the outputs for the new valve settings.

Line 03 includes a timing relay, represented by two lines enclosing a "T" and spaces for the number of the relay. Above the relay is a number for the delay time in seconds, typically 5–15 seconds. The timing relay in line 03 is used to allow a delay between the changing of each valve. This prevents the valves from physically interfering with each other, and also prevents small voltage surges and errors. After the valves are set, subroutine 03 is called to check if the valves are set properly.

Line 04 is executed last. The indicators for the lint cleaners being used are set, and the "not ready" light is turned off.

Subroutine 01 is contained in line 06. Line 06 includes a relay contact for the new control switch setting. Line 06 also includes two logic symbols, represented by "< >". The first is a "< cmp >" that compares the new switch setting to the old switch setting. The second is a "< sta >" that stores the new switch setting if it is different.

Subroutine 02 is contained in line 09. Line 09 sets new outputs for the valves. This is done by providing a control signal to the air solenoids that change the position of the valves. The correct sequencing of the automated valves to transition between the diversion and bypass modes of operation are carried out in subroutine 02.

Subroutine 03 is contained in line 12. The "check valve settings" contact in line 12 represents several contacts that correspond to the proximity switches used to verify that each valve is in the proper position.

The process control system of the present invention can also be used in a gin that is not equipped with the automated valves of the present invention. Such an embodiment is referred to herein as the semi-automated valve embodiment. In the semi-automated valve embodiment, the existing valves in the gin are equipped with actuators or air cylinders, as well as proximity switches or sensors. The actuators and proximity switches are connected to PLC 2050, in a manner similar to that described above for the automated valves of the present invention. The primary difference between this embodiment and the automated valve embodiment described above, is that the flow of cotton through the system has to be stopped in order for PLC 2050 to control the changing of valve position. In the semi-automated valve embodiment, the PLC is programmed to perform the following functions: sequentially stop gin stand 150; allow the cotton to clear the valves; redirect the valves; verify valve position; and signal the ginner to re-engage gin stand 150. FIG. 19*b* shows a ladder diagram for programming a PLC to carry out these functions.

The main program is contained in lines 01 through 04 of FIG. 19*b*. Line 01 starts by determining whether the push button switch has been pressed and released. If it has been, the contact is closed, and subroutine O1 is called to determine if the thumbwheel switch settings have changed. Line 02 starts by determining whether there is a new thumbwheel switch setting. This contact is labeled "0101" which corresponds to the "new setting" relay in line 06. Line 02 also includes a timing relay to delay to allow the cotton to clear the lint cleaners before the position of the valves is changed. Line 02 also includes a relay to stop the gin stand. Finally, line 02 calls subroutine 02 to decide the outputs for the new valve settings.

Line 03 includes a timing relay to allow a delay between the changing of each valve. This prevents the valves from physically interfering with each other, and also prevents small voltage surges and errors. After the valves are set, subroutine 03 is called to check if the valves are set properly.

Line 04 is executed last. The indicators for the lint cleaners being used are set, the "not ready" light is turned off, and the gin stand is reengaged.

Subroutine 01 is contained in line 06. Line 06 includes a relay contact for the thumbwheel switch. This relay contact actually represents one contact for each of the switches in the thumbwheel. For example, if a thumbwheel is used that has four switches, the relay contact in line 06 represents four contacts, one for each of the four thumbwheel switches. Line 06 also includes two logic symbols, represented by "< >". The first is a "< cmp >" that compares the new switch setting to the old switch setting. The second is a "< sta >" that stores the new switch setting if it is different.

Subroutine 02 is contained in line 09. Line 09 sets new outputs for the valves. This is done by providing a control signal to the air solenoids that change the position of the valves.

Subroutine 03 is contained in line 12. The "check valve settings" contact in line 12 also represents several contacts, in a manner similar to the thumbwheel switch relay contact in line 06. The "check valve settings" contact represents several contacts that correspond to the proximity switches used to verify that each valve is in the proper position.

The source code provided herewith in the microfiche appendix is one embodiment for implementing the present invention. A computer programmer skilled in the relevant art could readily interpret and implement the present invention based on the disclosed source code.

Examples and Results

The ability of the system and method of the present invention to increase returns to the cotton producer is demonstrated by the following examples. A sample run was made using the dynamic programming model of the present invention. Inputs to the model for the sample run were:

| Initial input | Sample data |
| --- | --- |
| Reflectance | 63.0 |
| Plus b | 7.8 |
| Leaf | 4.0 |
| Initial moisture content | 6.0 |
| Maximum turnout | 38.0 |
| Staple length | 1.10 |

All calculations were based on an input mass of 45.4 kg (100 lb) of seed cotton.

The computer model generates a complete set of decision codes for each machine (gin decision matrix) for reflectance (50 to 80), plus b (5.5 to 13.5), leaf (2 to 10), moisture content (3.5 to 9.5%), and lint turnout (30 to 40%). Output of the model also includes the final values for the state variables as well as the monetary returns at the completion of ginning. For the sample run with the inputs given above, the optimum machine sequence was two lint cleaners. Comparison of the model value to the values from the USDA-recommended machinery sequence is shown below.

| Output | Process Control value | Value from USDA-recommended sequence |
| --- | --- | --- |
| Reflectance | 70.5 | 72.1 |
| Plus b | 8.0 | 8.1 |
| Leaf | 3.0 | 2.0 |
| Initial moisture content | 6.0 | 5.0 |
| Turnout | 35.9 | 34.36 |
| Return | 28.58 | 27.35 |

The decisions generated by the dynamic programming model 1020 of the present invention would yield monetary returns of $28.58 for an input of 45.4 kg (100 lb) of seed cotton, whereas the USDA-recommended ginning sequence would yield $27.35. The $1.32 additional return per 100 pounds of seed cotton would equate to $17.22 for the seed cotton (635.6 kg or 1400 lb) that would be necessary to produce a 500 pound bale of lint cotton. An additional example is shown in Table 18a, discussed above.

The process control system of the present invention results in improved fiber quality, as well as improved profitability. Control of fiber moisture and elimination of one or more stages of lint cleaning improves fiber quality by: (1) increasing length; (2) reducing short fibers; (3) increasing seed-coat fragment size and improving removability at the textile mill; (4) decreasing the number of seed-coat fragments; (5) increasing measured strength; and (6) increasing fiber yield. These improvements are documented and quantified in Anthony, W. Stanley, *Process Control for Optimum Lint Quality and Value*, 1992 Beltwide Cotton Conferences, pg. 7–12 (1992).

Processing in a Textile Mill

The system and method of the present invention can also be used to process lint in a textile mill. Lint, the final product of processing in a gin, is further processed in a textile mill. Mill processing can include, for example, cleaning of the lint, as well as blending, carding, combing, drawing, spinning, weaving, dyeing, and finishing.

Figure 21:
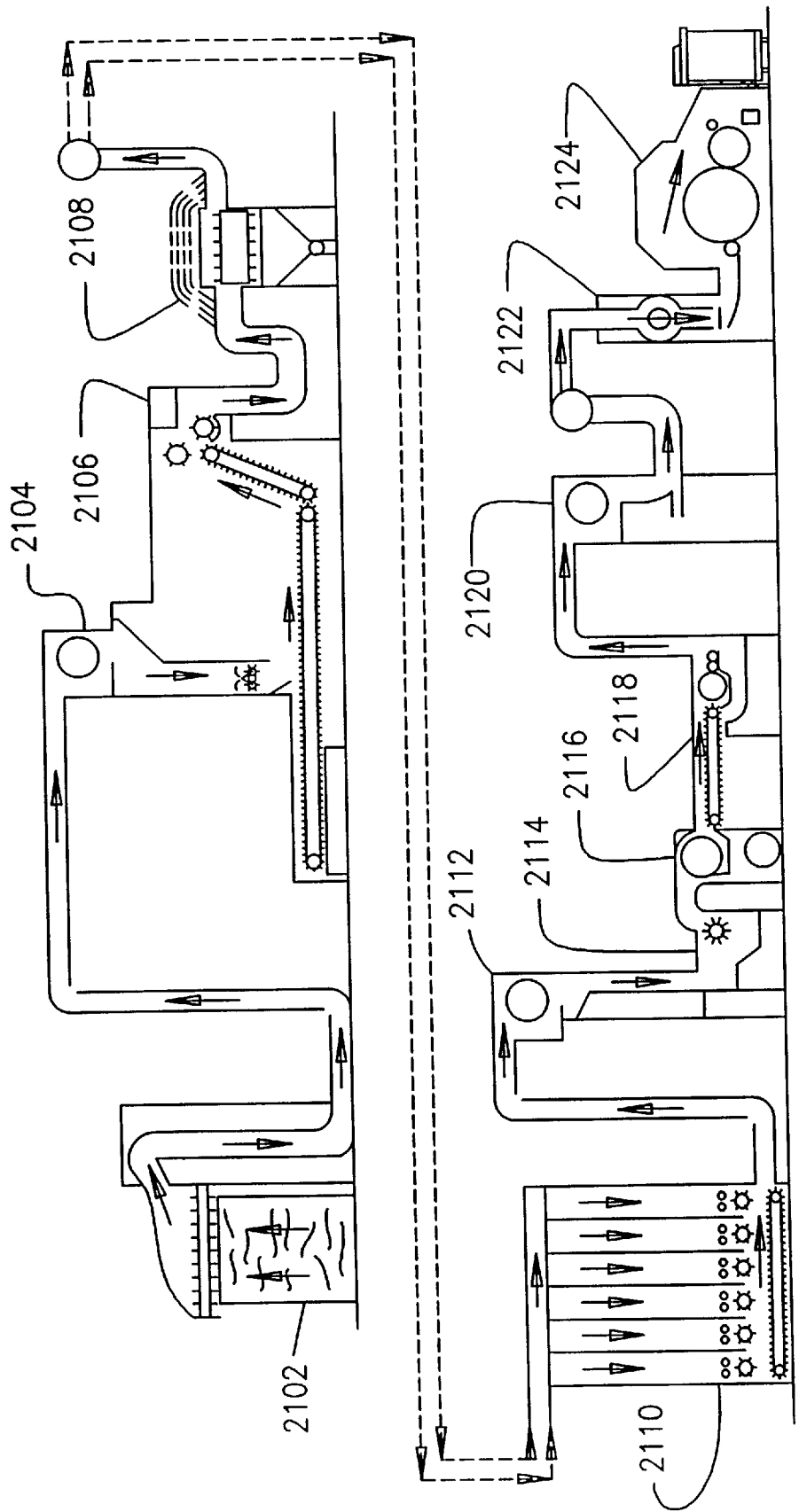
FIG. 21 illustrates one embodiment of a cleaning line in a textile mill.

One embodiment of a cleaning line in a textile mill is illustrated in FIG. 21. The cleaning line of FIG. 21 represents a typical opening and cleaning sequence in a textile mill. It is to be understood that some textile mills use a different sequence, and some mills have more cleaning machines than shown in FIG. 21.

In a typical machine sequence at a textile mill such as that shown in FIG. 21, a bale opener 2102 extracts cotton from bales of lint cotton, such as that produced at a typical cotton gin, and feeds it into an airstream. A condenser 2104 separates the cotton from the air steam, and feeds the cotton into a pre-mixer 2106. Pre-mixer 2106 mixes the cotton from several different bales at one time and feeds it into a double-roll cleaner 2108. Double-roll cleaner 2108 removes foreign matter, and feeds the cotton into a blender 2110. Blender 2110 ensures that the cotton is uniformly mixed and blended together. A condenser 2112 separates the cotton from the airstream, and feeds the cotton into a cleaner 2114 which removes foreign matter, and transfers the cotton to a dust cage 2116. Dust cage 2116 removes dust and feeds the cotton to a cleaner 2118. Cleaner 2118 removes foreign matter. A condenser 2120 then removes cotton from the airstream, and transfers it to a card feeder 2122. Card feeder 2122 feeds cotton into a card machine 2124. Card machine 2124 cleans cotton, and forms a web for further processing. The process sequence described above differs with manufacturers and textile mills as various combinations and models of the cleaning, separating and blending machines are used.

The present invention can be used in a-textile mill to select an optimum mill machine sequence that maximizes lint quality. Automated directional valves as disclosed herein can be used to route lint through the selected sequence of cleaners. In a textile mill configured with the present invention, double-roll cleaner 2108, cleaner 2114, dust cage 2116, and cleaner 2118 can be bypassed. Bypassing of the foregoing machines is not possible in a conventional textile mill (without the process control system of the present invention). Based upon the disclosure herein, one of skill in the relevant arts could readily implement the appropriate algorithms for use in a textile mill.

TABLE 1

Electric Energy Consumption

| | | Electric energy consumption (W-h/kg) for | | | | | |
|---|---|---|---|---|---|---|---|
| Initial grade | Initial moisture content, percent | Drier 1* | Cylinder cleaner† | Stick machine | Drier 2‡ | Impact cleaner† | Lint cleaner 1‡ | Lint cleaner 2‡ |
| 72 | 3.5 | 28.63 | 29.52 | 29.74 | 28.63 | 31.85 | 31.76 | 31.76 |
| | 5.5 | 24.23 | 23.79 | 24.45 | 24.23 | 26.28 | 25.04 | 25.04 |
| | 7.5 | 24.23 | 22.25 | 24.56 | 24.23 | 26.10 | 24.69 | 24.69 |
| | 9.5 | 20.09 | 17.84 | 19.82 | 20.09 | 20.04 | 21.04 | 21.04 |
| 80 | 3.5 | 28.50 | 29.58 | 30.66 | 28.50 | 32.69 | 33.57 | 33.57 |
| | 5.5 | 23.74 | 24.07 | 24.82 | 23.74 | 27.38 | 27.71 | 27.71 |
| | 7.5 | 24.30 | 24.19 | 25.00 | 24.30 | 25.37 | 23.85 | 23.85 |
| | 9.5 | 20.07 | 18.57 | 20.26 | 20.07 | 20.42 | 22.14 | 22.14 |
| 85 | 3.5 | 29.98 | 30.86 | 32.33 | 29.98 | 35.46 | 36.50 | 36.50 |
| | 5.5 | 26.67 | 26.65 | 27.93 | 26.67 | 29.78 | 25.46 | 25.46 |
| | 7.5 | 24.30 | 24.19 | 25.00 | 24.30 | 25.37 | 23.85 | 23.85 |
| | 9.5 | 19.71 | 17.84 | 20.04 | 19.71 | 20.04 | 21.28 | 21.28 |
| 90 | 3.5 | 25.64 | 25.97 | 27.58 | 25.64 | 30.37 | 31.19 | 31.19 |
| | 5.5 | 23.55 | 23.59 | 24.63 | 23.55 | 26.01 | 26.21 | 26.21 |
| | 7.5 | 20.99 | 20.37 | 21.32 | 20.99 | 21.32 | 20.99 | 20.99 |
| | 9.5 | 19.65 | 18.15 | 19.69 | 19.65 | 20.13 | 19.82 | 19.82 |
| 94 | 3.5 | 27.22 | 27.20 | 28.66 | 27.22 | 33.44 | 31.56 | 31.56 |
| | 5.5 | 24.30 | 24.56 | 25.22 | 24.30 | 28.30 | 24.23 | 24.23 |
| | 7.5 | 23.92 | 23.30 | 24.07 | 23.92 | 25.51 | 20.48 | 20.48 |
| | 9.5 | 19.14 | 18.30 | 18.96 | 19.14 | 20.29 | 18.50 | 18.50 |

TABLE 1-continued

Natural gas energy required by either drier 1 or drier 2.

| Initial lint moisture content, percent | Energy (Btu/kg of cotton) required for drier temperature (°C.) of | | | |
|---|---|---|---|---|
| | 65.5 | 93.2 | 120.9 | 131 |
| 14.0 | 350 | 460 | 570 | 681 |
| 12.0 | 350 | 460 | 570 | 681 |
| 10.0 | 350 | 460 | 570 | 681 |
| 9.0 | 350 | 460 | 570 | 681 |
| 8.0 | 350 | 460 | 570 | 681 |
| 7.0 | 350 | 460 | 570 | 681 |
| 6.0 | 350 | 460 | 570 | 681 |
| 5.0 | 350 | 460 | 570 | 681 |
| 4.0 | 350 | 460 | 570 | 681 |

\*Includes only one centrifugal fan and one separator/dropper.
† Includes one centrifugal fan and one separator/dropper as well as the seed cotton cleaner.
‡ Also includes the energy required to convey the lint cotton between machines.

TABLE 2

Possible decisions, transition functions, and optimal return functions for each ginning operation.

| Decision | Transition function* | Optimal return function |
|---|---|---|
| Operation - Press: | | |
| None | None | $F_P(RD_P, PB_P, LF_P, LN_P, M_P, T_P) = (T_P/100) \times$ PRICE $(RD_P, PB_P, LF_P, LN_P, M_P, T_P) \times 100$ |
| Operation - Lint cleaner: | | |
| 0 - none | for $D_L = 0$: $RH'_L = RD_D$, $PB'_L = PB_L$, $LF'_L = LF_L$ $LN'_L = LN_L$, $M'_L = M_L$, $T'_T = T_T$ | for $D_L = 0$; $F_L(RD_L, PB_L, LF_L, LN_L, M_L, T_L) =$ Maximum of $F_P(RD_L, PB_L, LF_L, LN_L, M_L, T_L)$ |
| 1 - one | $RD'_L = t_L(RD_L, PB_L, LF_L, LN_L, M_L, T_L)$ | for $D_L = 1$ or 2: $F_L(RD_L, PB_L, LF_L, LN_L, M_L, T) =$ Maximum of |
| 2 - two | $PB'_L = t_L(RD_L, PB_L, LF_L, LN_L, M_L, T_L)$ $LF'_L = t_L(RD_L, PB_L, LF_L, LN_L, M_L, T_L)$ $LN'_L = t_L(RD_L, PB_L, LF_L, LN_L, M_L, T_L)$ $M'_L = M_L$ $T'_L = t_L(RD_L, PB_L, LF_L, LN_L, M_L, T_L)$ | $F_P(RD_L, PB_L, LN_L, M_L, T_L)$ or $- E_L(RD_L, PB_L, LF_L, LN_L, M_L, T_L) \times D_L \times$ COST E $+ F_P(RD'_L, PB'_L, LF'_L, LN'_L, M_L, T'_L)$ |
| Operation - Gin stand: | | |
| 1 - one | $RD'_G, = t_G(RD_G, PB_G, LF_G, LN_G, M_G, T_G)$ $PB'_G, = t_G(RD_G, PB_G, LF_G, LN_G, M_G, T_G)$ $LF'_G, = t_G(RD_G, PB_G, LF_G, LN_G, M_G, T_G)$ $LN'_G, = t_G(RD_G, PB_G, LF_G, LN_G, M_G, T_G)$ $M'_G = M_G$ $T'_G = t'_G(RD_G, PB_G, LF_G, LN_G, M_G, T_G)$ | $F_G(RD_G, PB_G, LF_G, LN_G, M_G, T_G) = F_L(RD'_G, PB'_G, LF'_G, LN'_G, M_G, T_G)$ |
| Operation - Impact cleaner: | | |
| 0 - do not use | for $D_I = 1$: $RD'_I = RD_I$, $PB'_I = PB_I$, $LF'_I = LF_I$, $LN'_I = LN_I$, $M'_I = M_I$, $T'_I = T_I$ | for $D_I = F_I(RD_I, PB_I, LF_I, LN_I, M_I, T_I) =$ Maximum of $F_G(RD_I, PB_I, LF_I, LN_I, M_I, T_I)$ |
| 1 - use | for $D_I = 1$: $RD'_I = t_I(RD_I, PB_I, LF_I, LN_I, M_I, T_I)$ $PB'_I = t_I(RD_I, PB_I, LF_I, LN_I, M_I, T_I)$ $LF'_I = t_I(RD_I, PB_I, LF_I, LN_I, M_I, T_I)$ $LN'_I = t_I(RD_I, PB_I, LF_I, LN_I, M_I, T_I)$ $M'_I = M_I, T'_I = t'_I(RD_I, PB_I, LF_I, LN_I, M_I, T_I)$ | for $D_I = 1$: $F_I(RD_I, PB_I, LF_I, LN_I, M_I, T_I) =$ Maximum of $F_{D1}(RD_I, PB_I, LF_I, LN_I, M_I, T_I)$ or $- E_L(RD_I, PB_I, LF_I, LN_I, M_I, T_I) \times 100$ COST E $+ F_G(RD'_I, PB'_I, LF'_I, LN'_I, M_I, T'_I)$ |
| Operation - Drier 2: | | |
| 0 - do not use | for $D_{D2} = 0$: $RD'_{D2} = RD_{D2}$, $PB'_{D2} = PB_{D2}$, $LF'_{D2} = LF_{D2}$, $LN'_{D2} = LN_{D2}$, $M'_{D2} = M_{D2}$, $T'_{D2} = T_2$ | for $D_2 = 0$: $F_{D2}(RD_{D2}, PB_{D2}, LF_{D2}, LN_{D2}, M_{D2}, T_{D2}) =$ Maximum of $F_I(RD_{D2}, PB_{D2}, LF_{D2}, LN_{D2}, M_{D2}, T_{D2})$ |
| 1 - use at 65° C. 2 - use at 93° C. 3 - use at 121° C. 4 - use at 131° C. | for $D_{D2} = 1, 2, 3,$ or 4: $RD'_{D2} = t_{D2}(RD_{D2}, PB_{D2}, LF_{D2}, LN_{D2}, M_{D2}, T_{D2})$ $PB'_{D2} = t_{D2}(RD_{D2}, PB_{D2}, LF_{D2}, LN_{D2}, M_{D2}, T_{D2})$ $LF'_{D2} = t_{D2}(RD_{D2}, PB_{D2}, LF_{D2}, LN_{D2}, M_{D2}, T_{D2})$ $LF'_{D2} = t_{D2}(RD_{D2}, PB_{D2}, LF_{D2}, LN_{D2}, M_{D2}, T_{D2})$ $M'_{D2} = t_D(M_{D2}, D_{D2})$ $T'_{D2} = T_{D2} - M'_{D2} + M_{D2}$ | for $D_{D2} = 1, 2, 3,$ or 4: $F_{D2}(RD_{D2}, PB_{D2}, LF_{D2}, LN_{D2}, M_{D2}, T_{D2}) =$ Maximum of $F_{D2}(RD_{D2}, PB_{D2}, LF_{D2}, LN_{D2}, M_{D2}, T'_{D2})$ or $- E_L(RD_{D2}, PB_{D2}, LF_{D2}, LN_{D2}, M_{D2}) \times$ Cost E $-$ Gas $(M_{D2}, D_{D2}) \times$ Cost (RD, PB, LF, LN, M, T) $+ F_I(RD_{D2}, PB_{D2}, LF_{D2}, LN_{D2}, M_{D2}, T_{D2})$ |
| Operation - Stick machine: | | |
| 0 - do not use | for $D_S = 0$: $RD'_S = RD_S$, $PB'_S = PB_S$, $LF'_S = LF_S$, $LN'_S = LN_S$, | for $D_S = 0$: $F_S(RD_S, PB_S, LF_S, LN_S, M_S, T_S) =$ Maximum of $F_{D2}(RD_S, PB_S, LF_S, LN_S, M_S, T_S)$ |
| 1 - use | for $D_S = 1$: $RD'_S, = t_S(RD_S, PB_S, LF_S, LN_S, M_S, T_S)$ $PB'_S, = t_S(RD_S, PB_S, LF_S, LN_S, M_S, T_S)$ $LF'_S, = t_S(RD_S, PB_S, LF_S, LN_S, M_S, T_S)$ | for $D_S = 1$: $F_S(RD_S, PB_S, LF_S, LN_S, M_S, T_S) =$ Maximum of $F_{D2}(RD_S, PB_S, LF_S, LN_S, M_S, T_S)$ or $- E_L(RD_S, PB_S, LF_S, LN_S, M_S, T_S) \times$ Cost E $+ D_{D2}(RD'_S, PB'_S, LF'_S, LN'_S, M'_S, T'_S)$ |

TABLE 2-continued

Possible decisions, transition functions, and optimal return functions for each ginning operation.

| Decision | Transition function* | Optimal return function |
|---|---|---|
| | $LN'_S = t_S (RD_S, PB_S, LF_S, LN_S, M_S, T_S)$ | |
| | $M'_S = M_2$ | |
| | $T'_S = t'_S (RD_S, PB_S, LF_S, LN_S, M_S, T_S)$ | |

Operation - Cylinder cleaner:

| Decision | Transition function | Optimal return function |
|---|---|---|
| 0 - do not use | for $D_C = 0$: $RD'_C = RD_C$, $PB'_C = PB_C$, $LF'_C = LF_C$, $LN'_C = LN_C$, $M'_C = M_C$, $T'_C = T_C$ | for $D_C = 0$: $F_C (RD_C, PB_C, LF_C, LN_C, M_C, T_C)$ = Maximum of $F_S (RD_C, PB_C, LF_C, LN_C, M_C, T_C)$ |
| 1 - use | for $D_C = 1$: $RD'_C = t_C (RD_C, PB_C, LF_C, LN_C, M_C, T_C)$, $PB'_C = t_C (RD_C, PB_C, LF_C, LN_C, M_C, T_C)$, $LF'_C = t_C (RD_C, PB_C, LF_C, LN_C, M_C, T_C)$, $LN'_C = t_C (RD_C, PB_C, LF_C, LN_C, M_C, T_C)$, $M'_C = M_C$, $T'_C = t'_C (RD_C, PB_C, LF_C, LN_C, M_C, T_C)$ | for $D_C = 1$: $F_C (RD_C, PB_C, LF_C, LN_C, M_C, T_C)$ Maximum of $F_S (RD_C, PB_C, LF_C, LN_C, M_C, T_C)$ or $- E_L (RD_C, PB_C, LF_C, M_C, T_C) \times$ COST $E + F_S (RD'_C, PB'_C, LF'_C, LN'_C, M_C, T_C)$ |

Operation - Drier 1:

| Decision | Transition function | Optimal return function |
|---|---|---|
| 0 - do not use | for $D_{D1} = 0$: $RD'_{D1} = RD_{D1}$, $PB'_{D1} = PB_{D1}$, $LF'_{D1} = LF_{D1}$, $LN'_{D1} = LF_{D1}$, $M'_{D1} = M_{D1}$, $T'_{D1} = T_{D1}$ | for $D_1 = 0$: $F_{D1} (RD_{D1}, PB_{D1}, LF_{D1}, LN_{D1}, M_{D1}, T_{D1})$ = Maximum of $F_C (RD_{D1}, PB_{D1}, LF_{D1}, LN_{D1}, M_{D1}, T_{D1})$ |
| 1 - use | for $D_{D1} = 1, 2, 3,$ or $4$: $RD'_{D1} = t_{D1} (RD_{D1}, PB_{D1}, LF_{D1}, LN_{D1}, M_{D1}, T_{D1})$ $PB'_{D1} = t_{D1} (RD_{D1}, PB_{D1}, LF_{D1}, LN_{D1}, M_{D1}, T_{D1})$ $LF'_{D1} = t_{D1} (RD_{D1}, PB_{D1}, LF_{D1}, LN_{D1}, M_{D1}, T_{D1})$ $LN'_{D1} = t_{D1} (RD_{D1}, PB_{D1}, LF_{D1}, LN_{D1}, M_{D1}, T_{D1})$ $M'_D = t_{D1} (M_{D1}, D_{D1})$ $T'_{D1} = T_{D1} - M'_{D1} + M_{D1}$ | for $D_{D1} = 1, 2, 3,$ or $4$: $F_{D1} (RD_{D1}, PB_{D1}, LF_{D1}, LN_{D1}, M_{D1}, T_{D1})$ = Maximum of $F_C (RD_{D1}, PB_{D1}, LF_{D1}, LN_{D1}, M_{D1}, T_{D1})$ or $- E_L (RD_{D1}, PB_{D1}, LF_{D1}, LN_{D1}, M_{D1}) \times$ COST $E -$ GAS $(M_{D1}, D_{D1}) \times$ COST $G + F_C (RD_{D1}, PB_{D1}, LF_{D1}, LN_{D1}, M'_{D1}, T'_{D1})$ |

*Tabular values for the transition function are given in Tables 3–15.

TABLE 3

Final grade, as a function of initial grade and moisture, when only one lint cleaner was used.

| Initial grade | Final grade for moisture content (percent) of | | | | | | |
|---|---|---|---|---|---|---|---|
| | 3.5 | 4.5 | 5.5 | 6.5 | 7.5 | 8.5 | 9.5 |
| 72 | 89.0 | 88.1 | 87.1 | 86.2 | 85.3 | 84.4 | 83.5 |
| 74 | 89.9 | 89.0 | 88.1 | 87.2 | 86.3 | 85.4 | 84.5 |
| 76 | 90.9 | 90.0 | 89.1 | 88.2 | 87.3 | 86.4 | 85.4 |
| 78 | 91.9 | 91.0 | 90.1 | 89.2 | 88.2 | 87.3 | 86.4 |
| 80 | 92.9 | 91.9 | 91.0 | 90.1 | 89.2 | 88.3 | 87.4 |
| 82 | 93.8 | 92.9 | 92.0 | 91.1 | 90.2 | 89.3 | 88.4 |
| 84 | 94.8 | 93.9 | 93.0 | 92.1 | 91.2 | 90.3 | 89.3 |
| 86 | 95.8 | 94.9 | 94.0 | 93.1 | 92.1 | 91.2 | 90.3 |
| 88 | 96.8 | 95.8 | 94.9 | 94.0 | 93.1 | 92.2 | 91.3 |
| 90 | 97.7 | 96.8 | 95.9 | 95.0 | 94.1 | 93.2 | 92.3 |
| 92 | 98.7 | 97.8 | 96.9 | 96.0 | 95.1 | 94.2 | 93.2 |
| 94 | 99.7 | 98.8 | 97.9 | 96.9 | 96.0 | 95.1 | 94.2 |
| 96 | 100.6 | 99.7 | 98.8 | 97.9 | 97.0 | 96.1 | 96.0 |

TABLE 4

Final grade, as a function of initial grade and moisture content, when two lint cleaners were used.

| Initial grade | Final grade for moisture content (percent) of | | | | | | |
|---|---|---|---|---|---|---|---|
| | 3.5 | 4.5 | 5.5 | 6.5 | 7.5 | 8.5 | 9.5 |
| 72 | 93.2 | 92.2 | 91.2 | 90.2 | 89.2 | 88.2 | 87.2 |
| 74 | 94.1 | 93.0 | 92.0 | 91.0 | 90.0 | 89.0 | 88.0 |
| 76 | 94.9 | 93.9 | 92.9 | 91.9 | 90.9 | 89.8 | 88.8 |
| 78 | 95.7 | 94.7 | 93.7 | 92.7 | 91.7 | 90.7 | 89.7 |
| 80 | 96.6 | 95.6 | 94.6 | 93.5 | 92.5 | 91.5 | 90.5 |
| 82 | 97.4 | 86.4 | 95.4 | 94.4 | 93.4 | 92.4 | 91.4 |
| 84 | 98.3 | 97.2 | 96.2 | 95.2 | 94.2 | 93.2 | 92.2 |
| 86 | 99.1 | 98.1 | 97.1 | 96.1 | 95.1 | 95.1 | 93.1 |
| 88 | 99.9 | 98.9 | 97.8 | 96.7 | 95.7 | 94.7 | |
| 90 | 100.8 | 99.7 | 98.8 | 97.8 | 96.7 | 95.7 | 94.7 |
| 92 | 101.6 | 100.6 | 99.6 | 98.6 | 97.6 | 96.6 | 95.6 |
| 94 | 102.5 | 101.4 | 100.4 | 99.4 | 98.4 | 97.4 | 96.4 |
| 96 | 103.3 | 102.3 | 101.3 | 100.3 | 99.3 | 98.3 | 97.3 |

TABLE 5

Final grade, as a function of initial grade and moisture content, when only one gin stand was used.

| Initial grade | Final grade for moisture content (percent) of | | | | | | |
|---|---|---|---|---|---|---|---|
| | 3.5 | 4.5 | 5.5 | 6.5 | 7.5 | 8.5 | 9.5 |
| 72 | 80.0 | 78.0 | 78.5 | 75.0 | 73.0 | 72.0 | 72.0 |
| 74 | 81.0 | 79.0 | 79.5 | 76.5 | 75.0 | 74.0 | 74.0 |
| 76 | 82.0 | 80.0 | 80.0 | 78.5 | 77.0 | 76.0 | 76.0 |
| 78 | 88.0 | 84.4 | 80.8 | 79.6 | 78.4 | 78.0 | 78.0 |
| 80 | 97.0 | 83.0 | 82.0 | 81.5 | 81.0 | 80.0 | 80.0 |
| 82 | 90.0 | 85.0 | 84.0 | 83.2 | 82.7 | 82.0 | 82.0 |
| 84 | 93.0 | 87.0 | 85.9 | 84.0 | 84.4 | 84.0 | 84.0 |
| 86 | 94.0 | 89.0 | 87.8 | 86.6 | 86.3 | 86.0 | 86.0 |

TABLE 5-continued

Final grade, as a function of initial grade and moisture content, when only one gin stand was used.

| Initial grade | Final grade for moisture content (percent) of |  |  |  |  |  |  |
|---|---|---|---|---|---|---|---|
| | 3.5 | 4.5 | 5.5 | 6.5 | 7.5 | 8.5 | 9.5 |
| 88 | 91.0 | 90.3 | 90.0 | 89.4 | 88.7 | 88.0 | 88.0 |
| 90 | 92.0 | 91.5 | 91.3 | 90.9 | 90.5 | 90.0 | 90.0 |
| 92 | 93.0 | 93.0 | 92.5 | 92.5 | 92.5 | 92.0 | 92.0 |
| 94 | 94.0 | 94.0 | 94.0 | 94.0 | 94.0 | 94.0 | 94.0 |
| 96 | 96.0 | 96.0 | 96.0 | 96.0 | 96.0 | 96.0 | 96.0 |

TABLE 6

Final grade, as a function of initial grade and moisture content, when only one impact cleaner was used.

| Initial grade | Final grade for moisture content (percent) of |  |  |  |  |  |  |
|---|---|---|---|---|---|---|---|
| | 3.5 | 4.5 | 5.5 | 6.5 | 7.5 | 8.5 | 9.5 |
| 72 | 77.2 | 77.0 | 76.9 | 76.7 | 76.6 | 76.4 | 76.3 |
| 74 | 78.7 | 78.6 | 78.4 | 78.3 | 78.1 | 78.0 | 77.8 |
| 76 | 80.3 | 80.1 | 80.0 | 79.8 | 79.7 | 79.5 | 79.4 |
| 78 | 81.8 | 81.7 | 81.5 | 81.4 | 81.2 | 81.0 | 80.9 |
| 80 | 83.4 | 83.2 | 83.1 | 82.9 | 82.7 | 82.6 | 82.5 |
| 82 | 85.0 | 84.8 | 84.7 | 84.5 | 84.3 | 84.1 | 84.0 |
| 84 | 86.5 | 86.4 | 86.2 | 86.1 | 85.9 | 85.7 | 85.6 |
| 86 | 88.1 | 87.9 | 87.8 | 87.6 | 87.5 | 87.3 | 87.2 |
| 88 | 89.6 | 89.5 | 89.3 | 89.2 | 89.0 | 88.9 | 88.7 |
| 90 | 91.2 | 91.1 | 90.9 | 90.7 | 90.6 | 90.4 | 90.3 |
| 92 | 92.7 | 92.6 | 92.4 | 92.3 | 92.1 | 92.0 | 92.0 |
| 94 | 94.3 | 94.1 | 94.0 | 94.0 | 94.0 | 94.0 | 94.0 |
| 96 | 96.0 | 96.0 | 96.0 | 96.0 | 96.0 | 96.0 | 96.0 |

TABLE 7

Final grade, as a function of initial grade and moisture content, when only one stick machine was used.

| Initial grade | Final grade for moisture content (percent) of |  |  |  |  |  |  |
|---|---|---|---|---|---|---|---|
| | 3.5 | 4.5 | 5.5 | 6.5 | 7.5 | 8.5 | 9.5 |
| 72 | 75.7 | 75.8 | 75.9 | 76.1 | 76.2 | 76.4 | 76.5 |
| 74 | 77.2 | 77.4 | 77.6 | 77.7 | 77.9 | 78.0 | 78.1 |
| 76 | 78.9 | 78.9 | 79.0 | 79.2 | 79.3 | 79.5 | 79.8 |
| 78 | 80.5 | 80.7 | 80.8 | 81.0 | 81.1 | 81.3 | 81.5 |
| 80 | 82.1 | 83.3 | 82.5 | 82.6 | 82.8 | 82.9 | 83.1 |
| 82 | 83.8 | 83.9 | 84.1 | 84.2 | 84.4 | 84.6 | 84.7 |
| 84 | 85.4 | 85.6 | 85.7 | 85.9 | 86.0 | 86.2 | 86.4 |
| 86 | 87.0 | 87.2 | 87.4 | 87.5 | 87.7 | 87.8 | 88.0 |
| 88 | 88.7 | 88.8 | 89.0 | 89.2 | 89.3 | 89.5 | 89.6 |
| 90 | 90.3 | 90.5 | 90.6 | 90.8 | 90.9 | 91.1 | 91.3 |
| 92 | 92.0 | 92.1 | 92.3 | 92.4 | 92.6 | 92.7 | 92.9 |
| 94 | 94.0 | 94.0 | 94.0 | 94.1 | 94.2 | 94.4 | 94.5 |
| 96 | 96.0 | 96.0 | 96.0 | 96.0 | 96.0 | 96.0 | 96.0 |

TABLE 8

Final grade, as a function of initial grade and moisture content, when only one cylinder cleaner was used.

| Initial grade | Final grade for moisture content (percent) of |  |  |  |  |  |  |
|---|---|---|---|---|---|---|---|
| | 3.5 | 4.5 | 5.5 | 6.5 | 7.5 | 8.5 | 9.5 |
| 72 | 77.5 | 77.3 | 77.0 | 76.7 | 76.4 | 76.1 | 75.8 |
| 74 | 79.1 | 78.8 | 78.5 | 78.2 | 77.9 | 77.7 | 77.4 |
| 76 | 80.6 | 80.3 | 80.0 | 79.7 | 79.5 | 79.2 | 78.9 |
| 78 | 82.1 | 81.8 | 81.5 | 81.3 | 81.0 | 80.7 | 80.4 |

TABLE 8-continued

Final grade, as a function of initial grade and moisture content, when only one cylinder cleaner was used.

| Initial grade | Final grade for moisture content (percent) of |  |  |  |  |  |  |
|---|---|---|---|---|---|---|---|
| | 3.5 | 4.5 | 5.5 | 6.5 | 7.5 | 8.5 | 9.5 |
| 80 | 83.6 | 83.3 | 83.1 | 82.8 | 82.5 | 82.2 | 81.9 |
| 82 | 85.1 | 84.9 | 84.6 | 84.3 | 84.0 | 83.7 | 83.4 |
| 84 | 86.7 | 86.4 | 86.1 | 85.8 | 85.5 | 85.3 | 85.0 |
| 86 | 88.2 | 87.9 | 87.6 | 87.3 | 87.1 | 86.8 | 86.5 |
| 88 | 89.7 | 89.4 | 89.1 | 88.9 | 88.6 | 88.3 | 88.0 |
| 90 | 91.2 | 90.9 | 90.7 | 90.4 | 90.1 | 90.0 | 90.0 |
| 92 | 92.7 | 92.5 | 92.2 | 92.0 | 92.0 | 92.0 | 92.0 |
| 94 | 94.3 | 94.0 | 94.0 | 94.0 | 94.0 | 94.0 | 94.0 |
| 96 | 96.0 | 96.0 | 96.0 | 96.0 | 96.0 | 96.0 | 96.0 |

TABLE 9

Turnout change, as a function of initial grade and moisture content, when one lint cleaner was used.

| Initial grade | Turnout change for moisture content (percent) of |  |  |  |  |  |  |
|---|---|---|---|---|---|---|---|
| | 3.5 | 4.5 | 5.5 | 6.5 | 7.5 | 8.5 | 9.5 |
| 72 | −2.2 | −2.2 | −2.2 | −2.2 | −2.3 | −2.1 | −1.9 |
| 74 | −2.2 | −2.2 | −2.1 | −2.0 | −1.8 | −1.8 | −1.8 |
| 76 | −2.0 | −2.0 | −2.0 | −1.8 | −1.3 | −1.6 | −1.9 |
| 78 | −1.8 | −1.8 | −1.8 | −1.6 | −1.3 | −1.5 | −1.8 |
| 80 | −1.6 | −1.6 | −1.6 | −1.4 | −1.3 | −1.3 | −1.3 |
| 82 | −1.6 | −1.5 | −1.4 | −1.4 | −1.3 | −1.4 | −1.5 |
| 84 | −1.6 | −1.5 | −1.4 | −1.4 | −1.3 | −1.4 | −1.4 |
| 86 | −.9 | −.9 | −1.2 | −1.4 | −1.4 | −1.4 | −1.1 |
| 88 | −.9 | −.9 | −1.2 | −1.4 | −1.4 | −1.4 | −1.1 |
| 90 | −.9 | −.9 | −.9 | −1.4 | −1.3 | −1.3 | −.9 |
| 92 | −.9 | −.9 | −.9 | −1.0 | −.9 | −.9 | −.6 |
| 94 | −.9 | −.8 | −.8 | −.8 | −.6 | −.8 | −.3 |
| 96 | −.7 | −.6 | −.6 | −.5 | −.4 | −.3 | −.2 |

TABLE 10

Turnout change, as a function of initial grade and moisture content, when two lint cleaners was used.

| Initial grade | Turnout change for moisture content (percent) of |  |  |  |  |  |  |
|---|---|---|---|---|---|---|---|
| | 3.5 | 4.5 | 5.5 | 6.5 | 7.5 | 8.5 | 9.5 |
| 72 | −2.0 | −2.0 | −2.3 | −2.3 | −2.6 | −2.5 | −3.0 |
| 74 | −2.0 | −2.0 | −2.3 | −2.3 | −2.6 | −2.5 | −3.0 |
| 76 | −2.2 | −2.2 | −2.1 | −2.1 | −2.0 | −2.5 | −3.0 |
| 78 | −2.3 | −2.3 | −2.1 | −1.9 | −1.8 | −2.0 | −2.4 |
| 80 | −2.6 | −2.5 | −2.0 | −1.8 | −1.5 | −1.8 | −2.0 |
| 82 | −2.5 | −2.3 | −2.0 | −1.6 | −1.1 | −1.6 | −2.0 |
| 84 | −2.5 | −1.4 | −1.5 | −1.5 | −1.6 | −1.8 | −2.1 |
| 86 | −2.5 | −1.6 | −1.7 | −1.7 | −1.8 | −2.0 | −2.2 |
| 88 | −1.9 | −1.8 | −2.0 | −2.2 | −2.4 | −2.7 | −3.0 |
| 90 | −1.3 | −1.3 | −1.4 | −1.6 | −1.8 | −2.1 | −2.4 |
| 92 | −1.4 | −1.3 | −1.5 | −1.7 | −1.9 | −2.2 | −2.5 |
| 94 | −1.4 | −1.3 | −1.5 | −1.7 | −1.9 | −2.2 | −2.5 |
| 96 | −1.4 | −1.3 | −1.5 | −1.7 | −1.9 | −2.2 | −2.5 |

TABLE 11

Turnout change, as a function of initial grade and moisture content, when only a gin stand was used.

| Initial grade | Turnout change for moisture content (percent) of | | | | | | |
|---|---|---|---|---|---|---|---|
| | 3.5 | 4.5 | 5.5 | 6.5 | 7.5 | 8.5 | 9.5 |
| 72 | −1.5 | −1.3 | −0.9 | −0.7 | −0.4 | 0 | 0 |
| 74 | −1.4 | −1.2 | −.9 | −.8 | −.6 | 0 | 0 |
| 76 | −1.4 | −.6 | −.6 | −.6 | −.7 | 0 | 0 |
| 78 | −1.4 | −.5 | −.4 | −.3 | −.2 | 0 | 0 |
| 80 | −1.4 | −.4 | −.3 | −.2 | −.2 | 0 | 0 |
| 82 | −1.5 | −.3 | −.2 | −.2 | −.2 | 0 | 0 |
| 84 | −1.7 | −.3 | −.2 | −.2 | −.2 | 0 | 0 |
| 86 | −1.6 | −.3 | −.2 | −.2 | −.2 | 0 | 0 |
| 88 | −1.6 | −.3 | −.2 | −.2 | −.2 | 0 | 0 |
| 90 | −1.5 | −.3 | −.2 | −.2 | −.2 | 0 | 0 |
| 92 | −1.4 | −.3 | −.2 | −.2 | −.2 | 0 | 0 |
| 94 | −1.2 | −.3 | −.2 | −.2 | −.2 | 0 | 0 |
| 96 | −1.0 | −.3 | −.2 | −.2 | −.2 | 0 | 0 |

TABLE 12

Turnout change, as a function of initial grade and moisture content, when one impact cleaner was used.

| Initial grade | Turnout change for moisture content (percent) of | | | | | | |
|---|---|---|---|---|---|---|---|
| | 3.5 | 4.5 | 5.5 | 6.5 | 7.5 | 8.5 | 9.5 |
| 72 | −0.1 | −0.2 | −0.2 | −0.2 | −0.3 | −0.3 | −0.3 |
| 74 | −.1 | −.2 | −.2 | −.2 | −.3 | −.3 | −.3 |
| 76 | −.1 | −.1 | −.1 | −.1 | −.2 | −.2 | −.3 |
| 78 | −.1 | −.1 | −.1 | −.1 | −.2 | −.2 | −.3 |
| 80 | −.1 | −.1 | −.1 | −.1 | −.1 | −.1 | −.2 |
| 82 | −.3 | −.3 | −.3 | −.3 | −.2 | −.3 | −.4 |
| 84 | −.4 | −.3 | −.3 | −.3 | −.2 | −.5 | −.7 |
| 86 | −.5 | −.4 | −.4 | −.4 | −.7 | −.7 | −.8 |
| 88 | −.1 | −.5 | −.5 | −.6 | −.6 | −.8 | −1.0 |
| 90 | −.1 | −.3 | −.3 | −.3 | −.3 | −.5 | −.5 |
| 92 | −.1 | −.2 | −.2 | −.2 | −.2 | −.2 | −.2 |
| 94 | −.1 | −.1 | −.1 | −.1 | −.1 | −.1 | −.1 |
| 96 | −.1 | −.1 | −.1 | −.1 | −.1 | −.1 | −.1 |

TABLE 13

Turnout change, as a function of initial grade and moisture content, when one stick machine was used.

| Initial grade | Turnout change for moisture content (percent) of | | | | | | |
|---|---|---|---|---|---|---|---|
| | 3.5 | 4.5 | 5.5 | 6.5 | 7.5 | 8.5 | 9.5 |
| 72 | −0.6 | −0.6 | −0.6 | −0.6 | −0.7 | −0.8 | −0.8 |
| 74 | −.6 | −.6 | −.6 | −.6 | −.7 | −.8 | −.8 |
| 76 | −.5 | −.5 | −.5 | −.5 | −.6 | −.7 | −.8 |
| 78 | −.5 | −.4 | −.4 | −.4 | −.6 | −.7 | −.7 |
| 80 | −.5 | −.3 | −.3 | −.3 | −.3 | −.4 | −.4 |
| 82 | −.4 | −.3 | −.3 | −.3 | −.3 | −.3 | −.4 |
| 84 | −.4 | −.3 | −.3 | −.3 | −.2 | −.4 | −.4 |
| 86 | −.4 | −.5 | −.3 | −.3 | −.2 | −.2 | −.2 |
| 88 | −.4 | −.6 | −.6 | −.6 | −.7 | −.5 | −.4 |
| 90 | −.5 | −.5 | −.5 | −.5 | −.4 | −.3 | −.3 |
| 92 | −.5 | −.5 | −.5 | −.4 | −.3 | −.2 | −.2 |
| 94 | −.1 | −.1 | −.1 | −.1 | −.1 | −.1 | −.1 |
| 96 | −.1 | −.1 | −.1 | −.1 | 0 | 0 | 0 |

TABLE 14

Turnout change, as a function of initial grade and moisture content, when one cylinder cleaner plus gin stand were used.

| Initial grade | Turnout change for moisture content (percent) of | | | | | | |
|---|---|---|---|---|---|---|---|
| | 3.5 | 4.5 | 5.5 | 6.5 | 7.5 | 8.5 | 9.5 |
| 72 | −0.2 | −0.3 | −0.2 | −0.2 | −0.3 | −0.5 | −0.8 |
| 74 | −.2 | −.3 | −.2 | −.2 | −.3 | −.5 | −.8 |
| 76 | −.2 | −.3 | −.2 | −.2 | −.2 | −.5 | −.8 |
| 78 | −.2 | −.3 | −.2 | −.2 | −.2 | −.4 | −.6 |
| 80 | −.3 | −.4 | −.3 | −.2 | −.2 | −.4 | −.6 |
| 82 | −.3 | −.4 | −.3 | −.2 | −.2 | −.4 | −.5 |
| 84 | −.4 | −.3 | −.3 | −.3 | −.2 | −.5 | −.7 |
| 86 | −.5 | −.3 | −.4 | −.4 | −.4 | −.5 | −.6 |
| 88 | −.4 | −.2 | −.3 | −.3 | −.3 | −.4 | −.6 |
| 90 | −.3 | −.2 | −.2 | −.2 | −.2 | −.3 | −.4 |
| 92 | −.2 | −.2 | −.2 | −.2 | −.2 | −.3 | −.4 |
| 94 | −.1 | −.1 | −.1 | −.1 | −.1 | −.1 | −.2 |
| 96 | −.1 | −.1 | −.1 | −.1 | −.1 | −.1 | −.1 |

TABLE 15

Turnout change after either drier 1 or drier 2.

| Initial moisture content, pct | Turnout change (percent) after drier at temperature (°F.) of | | | |
|---|---|---|---|---|
| | 150 | 200 | 250 | 300 |
| 14.0 | −1.05 | −1.30 | −1.58 | −1.93 |
| 12.0 | −.70 | −1.40 | −1.58 | −1.93 |
| 10.0 | −.35 | −1.05 | −1.40 | −1.75 |
| 9.0 | −.35 | −.70 | −1.40 | −1.58 |
| 8.0 | −.35 | −.88 | −1.23 | −1.23 |
| 7.0 | −.35 | −.88 | −1.23 | −1.23 |
| 6.0 | −.35 | −.53 | −.70 | −.88 |
| 5.0 | −.18 | −.35 | −.53 | −.70 |
| 4.0 | −.10 | −.10 | −.25 | −.35 |

TABLE 16

Overall machine decisions for color of Middling with a price based on Strict Low Middling at $0.70/pound

| Moisture, % | Machine decisions for initial trash grade of* | | | | | | | | | | | |
|---|---|---|---|---|---|---|---|---|---|---|---|---|
| | 72 | 74 | 76 | 78 | 80 | 82 | 84 | 86 | 88 | 90 | 92 | 94 |
| 3.00 | Q | E | E | Q | Q | P | B | B | B | B | B | A |
| 3.20 | Q | E | E | Q | Q | P | B | B | B | B | B | A |
| 3.50 | Q | E | E | Q | Q | P | B | B | B | B | B | A |
| 3.75 | Q | E | E | Q | Q | P | B | B | B | B | B | A |
| 4.00 | Q | E | E | B | B | N | B | B | B | B | B | A |
| 4.25 | Q | E | E | B | B | N | B | B | B | B | B | A |
| 4.50 | U | F | R | C | F | C | C | B | B | B | B | A |
| 4.75 | F | E | R | B | F | C | C | B | B | B | B | A |
| 5.00 | R | F | R | C | F | C | B | B | B | B | B | A |
| 5.25 | F | F | R | C | F | C | B | B | B | B | B | A |
| 5.50 | O | O | R | R | F | C | B | B | B | B | B | A |
| 5.75 | R | O | O | C | C | I | C | C | B | B | B | A |
| 6.00 | R | O | R | C | F | C | C | B | B | B | B | A |
| 6.25 | O | X | X | R | F | C | C | C | B | B | B | A |
| 6.50 | Q | X | R | R | O | C | C | C | C | B | B | A |
| 6.75 | R | X | X | R | O | C | C | C | C | B | B | A |
| 7.00 | R | X | X | R | O | C | C | C | C | B | B | A |
| 7.25 | R | R | R | O | C | O | C | C | C | B | B | A |
| 7.50 | R | R | R | R | R | O | C | C | C | B | B | A |
| 7.75 | Q | R | R | F | C | C | C | C | C | B | B | A |
| 8.00 | O | X | R | R | O | C | G | C | C | B | B | A |
| 8.25 | E | R | B | R | F | C | G | C | C | B | B | A |
| 8.50 | E | F | B | R | F | C | G | C | C | B | B | A |
| 8.75 | Q | R | R | F | C | C | C | C | C | B | B | A |

TABLE 16-continued

Overall machine decisions for color of Middling with a price based on Strict Low Middling at $0.70/pound

| Moisture, | Machine decisions for initial trash grade of* | | | | | | | | | | | |
|---|---|---|---|---|---|---|---|---|---|---|---|---|
| % | 72 | 74 | 76 | 78 | 80 | 82 | 84 | 86 | 88 | 90 | 92 | 94 |
| 9.00 | R | X | X | R | F | C | C | C | C | C | B | A |
| 9.25 | E | X | X | R | O | C | G | C | C | C | B | A |
| 9.50 | E | X | B | R | O | C | G | C | C | C | B | A |
| 9.75 | E | X | B | R | O | C | G | C | C | C | B | A |
| 10.00 | E | X | B | R | O | C | G | C | C | C | B | A |

*Each alphabetic character represents a different sequence of gin machinery (See Table 17 for description).

TABLE 17

Machine and drier decision codes for dynamic gin model

| | Machine sequence* | | | | | Drier levels† | | |
|---|---|---|---|---|---|---|---|---|
| Machine code | Cylinder cleaner | Stick machine | Cylinder cleaner | Impact cleaner | Lint cleaner | Drier code | First drier | Second drier |
| A | 0 | 0 | 0 | 0 | 0 | A | — | — |
| B | 0 | 0 | 0 | 0 | 1 | B | — | 12 |
| C | 0 | 0 | 0 | 0 | 2 | C | — | 18 |
| Y | 0 | 0 | 0 | 0 | 3 | D | — | 24 |
| D | 0 | 0 | 0 | 1 | 0 | E | — | 24 |
| E | 0 | 0 | 0 | 1 | 1 | F | 12 | — |
| F | 0 | 0 | 0 | 1 | 2 | G | 12 | 12 |
| G | 0 | 1 | 0 | 0 | 0 | H | 12 | 18 |
| H | 0 | 1 | 0 | 0 | 1 | I | 12 | 24 |
| I | 0 | 1 | 0 | 0 | 2 | J | 12 | 24 |
| J | 0 | 1 | 0 | 1 | 0 | K | 18 | — |
| K | 0 | 1 | 0 | 1 | 1 | L | 18 | 12 |
| L | 0 | 1 | 0 | 1 | 2 | M | 18 | 18 |
| M | 1 | 0 | 0 | 0 | 0 | N | 18 | 24 |
| N | 1 | 0 | 0 | 0 | 1 | O | 18 | 24 |
| O | 1 | 0 | 0 | 0 | 2 | P | 24 | — |
| P | 1 | 0 | 0 | 1 | 0 | Q | 24 | 12 |
| Q | 1 | 0 | 0 | 1 | 1 | R | 25 | 18 |
| R | 1 | 0 | 0 | 1 | 2 | S | 24 | 24 |
| S | 1 | 1 | 0 | 0 | 0 | T | 24 | 24 |
| T | 1 | 1 | 0 | 0 | 1 | U | 24 | — |
| U | 1 | 1 | 0 | 0 | 2 | V | 24 | 12 |
| V | 1 | 1 | 0 | 1 | 0 | W | 24 | 18 |
| W | 1 | 1 | 0 | 1 | 1 | X | 24 | 24 |
| X | 1 | 1 | 0 | 1 | 2 | Y | 24 | 24 |
| Z | 1 | 1 | 1 | 1 | 3 | | | |

*Digit indicates the number of each type machine used for the respective code.
† Digit indicates the number shelves of drying used.

TABLE 18

Comparison of typical returns for the USDA recommended sequence and the model sequence

| Initial Values | | | Final Values | | | | | | |
|---|---|---|---|---|---|---|---|---|---|
| | | | USDA sequence | | | Model sequence | | | |
| Grade index | Moisture content, % | Turn-out, % | Grade index | Turn-out, % | Return,* dollar | Grade, index | Turn-out, % | Return,* dollar | Increase,* dollar |
| 73 | 6.0 | 36.0 | 102 | 31.5 | 19.32 | 94† | 33.2 | 20.22 | 0.90 |
| 73 | 9.0 | 36.0 | 98 | 31.2 | 19.02 | 90‡ | 34.6 | 20.55 | 1.53 |

TABLE 18-continued

Comparison of typical returns for the USDA recommended sequence and the model sequence

| Initial Values | | | Final Values | | | | | |
|---|---|---|---|---|---|---|---|---|
| | | | USDA sequence | | | Model sequence | | |
| Grade index | Moisture content, % | Turn-out, % | Grade index | Turn-out, % | Return,* dollar | Grade, index | Turn-out, % | Return,* dollar | Increase,* dollar |

| Grade index | Moisture content, % | Turn-out, % | Grade index | Turn-out, % | Return,* dollar | Grade, index | Turn-out, % | Return,* dollar | Increase,* dollar |
|---|---|---|---|---|---|---|---|---|---|
| 76 | 6.0 | 36.0 | 101 | 31.2 | 19.20 | 94§ | 33.6 | 20.46 | 1.26 |
| 76 | 9.0 | 36.0 | 99 | 31.8 | 19.41 | 91‖ | 33.5 | 19.90 | 0.49 |
| 85 | 6.0 | 346.0 | 101 | 31.5 | 19.32 | 94§ | 34.2 | 20.83 | 1.51 |
| 85 | 9.0 | 36.0 | 100 | 31.8 | 19.42 | 90** | 34.8 | 20.67 | 1.25 |
| 90 | 6.0 | 36.0 | 102 | 31.7 | 19.60 | 90†† | 35.8 | 21.27 | 1.67 |
| 90 | 9.0 | 36.0 | 101 | 32.0 | 19.80 | 90‡‡ | 35.0 | 20.79 | 0.99 |

*Based on 45.4 kg (100 lb) of seed cotton. Does not include energy costs. Multiply by 14 to determine p9er bale value.
† Cylinder cleaner, impact cleaner, and two lint cleaners were used.
‡ One drier at 66° C. and one impact cleaner were used.
§ Two lint cleaners were used.
‖ One drier at 66° C. and two lint cleaners were used.
**Stick machine was used.
†† No conditioning equipment other than gin stand and feeder was used.
‡‡ One drier at 66° C. was used.

TABLE 18a

Comparison of typical monetary returns for the USDA-recommended sequence and the process control sequence.

| Initial values | | | USDA sequence | | | | | | | Process control sequence | | | | | | | Increase, |
|---|---|---|---|---|---|---|---|---|---|---|---|---|---|---|---|---|---|
| Rd | +b | Leaf | Rd | +b | Leaf | %M[1] | TO[2] | LN[3] | $[4] | Rd | +b | Leaf | %M[1] | TO[2] | LN[3] | $[4] | Increazse, $[5] | per bale $ |
| 56.0 | 7.8 | 4.0 | 69.1 | 8.1 | 2.0 | 5.0 | 34.36 | 1.09 | 26.17 | 69.6 | 8.1 | 2.4 | 6.0 | 35.2 | 1.10 | 28.05 | 1.88[6] | 26.32 |
| 63.0 | 7.8 | 4.0 | 72.1 | 8.1 | 2.0 | 5.0 | 34.36 | 1.09 | 27.35 | 70.5 | 8.0 | 3.0 | 6.0 | 35.9 | 1.10 | 28.58 | 1.23[7] | 17.22 |
| 70.0 | 7.0 | 4.0 | 74.6 | 7.9 | 2.0 | 5.0 | 34.66 | 1.09 | 27.35 | 71.8 | 7.5 | 3.7 | 6.0 | 37.3 | 1.10 | 29.70 | 2.35[8] | 32.90 |
| 74.0 | 8.0 | 4.0 | 75.0 | 8.2 | 2.0 | 5.0 | 34.36 | 1.09 | 27.35 | 74.3 | 8.0 | 4.0 | 6.0 | 37.4 | 1.10 | 29.79 | 2.44[9] | 34.16 |
| 56.0 | 7.8 | 6.0 | 69.1 | 8.1 | 4.0 | 5.0 | 34.36 | 1.09 | 27.35 | 69.6 | 8.1 | 4.0 | 6.0 | 35.2 | 1.10 | 28.05 | 1.99[6] | 27.86 |
| 63.0 | 7.0 | 6.0 | 72.1 | 7.9 | 4.0 | 5.0 | 34.36 | 1.09 | 26.06 | 71.5 | 7.7 | 4.2 | 6.0 | 35.5 | 1.09 | 28.29 | 0.94[10] | 13.16 |
| 70.0 | 7.0 | 6.0 | 74.6 | 7.9 | 4.0 | 5.0 | 34.36 | 1.09 | 27.35 | 74.3 | 7.7 | 4.2 | 6.0 | 35.5 | 1.09 | 28.29 | 0.94[10] | 13.16 |
| 74.0 | 8.0 | 6.0 | 75.0 | 8.2 | 4.0 | 5.0 | 34.36 | 1.09 | 27.35 | 75.6 | 8.1 | 4.9 | 6.0 | 36.0 | 1.10 | 28.34 | 0.99[11] | 13.86 |

[1]Assumes limited drying. Initial moisture was 6%.
[2]TO = turnout, %
[3]LN = length, %
[4]Based on a base price of $0.7960 per pound (1995 Commodity Credit Corporation prices).
[5]Based on 100 pounds of initial cotton, at least 1400 pounds are required to produce a 500-pound bale of lint.
[6]Used two cylinder cleaners and two lint cleaners.
[7]Used one cylinder cleaner and one lint cleaner.
[8]Used one cylinder cleaner.
[9]Used no cleaning.
[10]Used two lint cleaners.
[11]Used one lint cleaner.

TABLE 19

Final moisture content after driers.

| Initial moisture content, percent | Drier temperature (°C.) of | | | |
|---|---|---|---|---|
| | 65.5 | 93.2 | 120.9 | 131 |
| 14.0 | 11.0 | 10.3 | 9.5 | 8.5 |
| 12.0 | 10.0 | 8.0 | 7.0 | 6.5 |
| 10.0 | 9.0 | 7.0 | 6.0 | 5.0 |
| 9.0 | 8.0 | 7.0 | 5.0 | 4.5 |
| 8.0 | 7.0 | 5.5 | 4.0 | 4.0 |
| 7.0 | 6.0 | 4.5 | 4.0 | 3.5 |
| 6.0 | 5.0 | 4.5 | 4.0 | 3.5 |
| 5.0 | 4.5 | 4.0 | 3.5 | 3.0 |
| 4.0 | 3.8 | 3.7 | 3.5 | 3.0 |

Conclusion

While various embodiments of the present invention have been described above, it should be understood that they have been presented by way of example only, and not limitation. For example, the present invention can be implemented in hardware only, or through the use of other programming languages. The present invention may also be adapted to process other types of materials, other than cotton. Multiple-leaf valves, high-speed sequential leaf valves, or other suitable types of diversion means may also be used. Thus, the breadth and scope of the present invention should not be limited by any of the above-described exemplary embodiments, but should be defined only in accordance with the following claims and their equivalents.

We claim:

1. A computer program product comprising a computer useable medium having computer program logic recorded thereon for enabling a processor in a computer system to control the processing of cotton through a gin to produce lint, said computer program logic comprising:

measuring means for enabling the processor to measure sensor data that correspond to color, moisture content, and trash content of the cotton as it enters the gin;

gin decision matrix generating means for enabling the processor to generate a gin decision matrix that includes optimum process control decisions that maximize net return from the lint as a function of input state of the cotton entering the gin;

gin process control decision means for enabling the processor to select an optimum process control decision from said gin decision matrix for an input state corresponding to said sensor data, wherein said optimum process control decision corresponds to an optimum gin machine sequence for cotton having said input state corresponding to said sensor data, said optimum gin machine sequence having a first portion and a second portion;

predicting means for enabling the processor to compute and store predicted values for color, moisture content, and trash content for the cotton after processing through said first portion of said optimum gin machine sequence; and gin process control implementation means for enabling the processor to implement said optimum process control decision by routing cotton through said optimum gin machine sequence.

2. The computer program product of claim 1, further comprising:

second measuring means for enabling the processor to measure second sensor data that correspond to color, moisture content, and trash content of the cotton after it has been processed through said first portion of said optimum gin machine sequence.

3. The computer program product of claim 2, further comprising:

error feedback means for enabling the processor to compare said second sensor data to said predicted values to generate an error; and error adjusting means for enabling the processor to adjust said optimum gin machine sequence and to adjust said predicted values to compensate for said error.

4. The computer program product of claim 3, further comprising:

third measuring means for enabling the processor to measure lint sensor data that correspond to color, moisture content, and trash content of the cotton after it has been processed through said second portion of said optimum gin machine sequence.

5. The computer program product of claim 4, further comprising:

second predicting means for enabling the processor to compute and store second predicted values for color, moisture content, and trash content for the cotton after processing through said second portion of said optimum gin machine sequence.

6. The computer program product of claim 5, further comprising:

second error feedback means for enabling the processor to compare said lint sensor data to said second predicted values to generate a second error; and second error adjusting means for enabling the processor to adjust said second portion of said optimum gin machine sequence and to adjust said second predicted values to compensate for said second error.

7. The computer program product of claim 3, wherein said error adjusting means comprises weighting means for enabling the processor to weight said error.

8. The computer program product of claim 6, wherein said second error adjusting means comprises second weighting means for enabling the processor to weight said second error.

9. The computer program product of claim 1, wherein said gin decision matrix generating means comprises a plurality of tabular transition functions.

10. The computer program product of claim 1, wherein said gin decision matrix generating means comprises an algorithm for each gin machine in said optimum gin machine sequence, wherein said algorithm quantifies the effect of that gin machine on leaf trash (LF), moisture content (M), reflectance (RD), turnout (TO), length (LN), and +b (PB).

11. The computer program product of claim 10, wherein said gin decision matrix generating means comprises a cylinder cleaner algorithm as follows:

SLFL=−0.1305−0.0619*SM+1.0599*SLF
SML=SM
SRDL=3.4151−0.0008*SM+0.9606*SRD
STOL=−0.6071−0.0057*SM+1.0127*STO
SLNL=0.2557−0.0012*SM+0.7764*SLN
SPBL=2.8104−0.0137*SM+0.6457*SPB wherein SLFL, SML, SRDL, STOL, SLNL, SPBL represent the values of leaf trash (LF), moisture content (M), reflectance (RD), turnout (TO), length (LN), and +b (PB), respectively, after processing by a cylinder cleaner, and SLF, SM, SRD, STO, SLN, SPB represent the values of leaf trash (LF), moisture content (M), reflectance (RD), turnout (TO), length (LN), and +b (PB), respectively, input to the cylinder cleaner.

12. The computer program product of claim 10, wherein said gin decision matrix generating means comprises a ginstand algorithm as follows:

SLFL=SLF
SML=SM
SRDL=19.52−0.12*SM+0.75*SRD
STOL=9.22+0.14*SM+0.72*STO
SLNL=0.31+0.002*SM+0.72*SLN
SPBL=1.50+0.02*SM+0.81*SPB wherein SLFL, SML, SRDL, STOL, SLNL, SPBL represent the values of leaf trash (LF), moisture content (M), reflectance (RD), turnout (TO), length (LN), and +b (PB), respectively, after processing by a ginstand, and SLF, SM, SRD, STO, SLN, SPB represent the values of leaf trash (LF), moisture content (M), reflectance (RD), turnout (TO), length (LN), and +b (PB), respectively, input to the ginstand.

13. The computer program product of claim 10, wherein said gin decision matrix generating means comprises an impact cleaner algorithm as follows:

SLFL=−0.1305−0.0619*SM+1.0599*SLF
SML=SM
SRDL=3.4151−0.0008*SM+0.9606*SRD
STOL=−0.6071−0.0057*SM+1.0127*STO
SLNL=0.2557−0.0012*SM+0.7764*SLN
SPBL=2.8104−0.0137*SM+0.6457*SPB wherein SLFL, SML, SRDL, STOL, SLNL, SPBL represent the values of leaf trash (LF), moisture content (M), reflectance (RD), turnout (TO), length (LN), and +b (PB), respectively, after processing by an impact cleaner, and SLF, SM, SRD, STO, SLN, SPB represent the values of leaf trash (LF), moisture content (M), reflectance (RD), turnout (TO), length (LN), and +b (PB), respectively, input to the impact cleaner.

14. The computer program product of claim 10, wherein said gin decision matrix generating means comprises a one lint cleaner algorithm as follows:

SLFL=−0.6665+0.0937*SM+0.8296*SLF
SML=SM
SRDL=25.9279−0.0834*SM+0.6757*SRD
STOL=−8.0604−0.1694*SM+1.2043*STO
SLNL=0.1742+0.0003*SM+0.8288*SLN
SPBL=3.3751−0.0222*SM+0.5970*SPB wherein SLFL, SML, SRDL, STOL, SLNL, SPBL represent the values of leaf trash (LF), moisture content (M), reflectance (RD), turnout (TO), length (LN), and +b (PB), respectively, after processing by one lint cleaner, and SLF, SM, SRD, STO, SLN, SPB represent the values of leaf trash (LF), moisture content (M), reflectance (RD), turnout (TO), length (LN), and +b (PB), respectively, input to the one lint cleaner.

15. The computer program product of claim 10, wherein said gin decision matrix generating means comprises a two lint cleaner algorithm as follows:

SLFL=−1.0150+0.1483*SM+0.7278*SLF
SML=SM
SRDL=38.1983−0.2905*SM+0.5302*SRD
STOL=−12.6405−0.1969*SM+1.3191*STO
SLNL=−0.0520+0.0003*SM+1.0266*SLN
SPBL=2.3649−0.0183*SM+0.7439*SPB wherein SLFL, SML, SRDL, STOL, SLNL, SPBL represent the values of leaf trash (LF), moisture content (M), reflectance (RD), turnout (TO), length (LN), and +b (PB), respectively, after processing by two lint cleaners, and SLF, SM, SRD, STO, SLN, SPB represent the values of leaf trash (LF), moisture content (M), reflectance (RD), turnout (TO), length (LN), and +b (PB), respectively, input to the two lint cleaners.

16. The computer program product of claim 10, wherein said gin decision matrix generating means comprises a stick machine algorithm as follows:

SLFL=0.1625−0.0710*SM+1.0326*SLF
SML=SM
SRDL=2.3777−0.0299*SM+0.9736*SRD
STOL=1.8168−0.0011*SM+0.9419*STO
SLNL=0.1996−0.0003*SM+0.8226*SLN
SPBL=1.8629−0.0025*SM+0.7587*SPB wherein SLFL, SML, SRDL, STOL, SLNL, SPBL represent the values of leaf trash (LF), moisture content (M), reflectance (RD), turnout (TO), length (LN), and +b (PB), respectively, after processing by a stick machine, and SLF, SM, SRD, STO, SLN, SPB represent the values of leaf trash (LF), moisture content (M), reflectance (RD), turnout (TO), length (LN), and +b (PB), respectively, input to the stick machine.

17. The computer program product of claim 1, wherein said gin decision matrix generating means comprises a drier algorithm as follows:

SLFL=SLF
SRDL=SRD
STOL=STO*(1.0−(SM−SML)/100.0)
SLNL=SLN
SPBL=SPB
SML=4.2767+0.6397*SM−0.01713*TEMP wherein SLFL, SRDL, STOL, SLNL, SPBL, SML represent the values of leaf trash (LF), reflectance (RD), turnout (TO), length (LN), +b (PB), and moisture content (M), respectively, after processing by the drier, and SLF, SRD, STO, SLN, SPB, SM represent the values of leaf trash (LF), reflectance (RD), turnout (TO), length (LN), +b (PB), and moisture content (M), respectively, input to the drier, and TEMP represents the temperature of the drier.

18. The computer program product of claim 1, wherein said gin process control implementation means comprises:
    valve control means for enabling the processor to change a position of valves that divert the flow of cotton through said optimum gin machine sequence; and
    valve position determining means for enabling the processor to determine the position of the valves.

19. The computer program product of claim 1, further comprising:
    display means for enabling the processor to display said sensor data and said optimum gin machine sequence.

20. A control system for controlling the processing of cotton through a gin to produce lint, the gin having a plurality of auxiliary treatment units and a duct through which entrained cotton flows, said control system comprising:
    measuring means for measuring sensor data that correspond to color, moisture content, and trash content of the cotton;
    processing means coupled to said measuring means, said processing means processing said sensor data and selecting a set of said plurality of auxiliary treatment units through which the cotton is processed to produce lint, said set corresponding to an optimum gin machine sequence that maximizes net return from the lint; and
    cotton diversion means coupled to each of said plurality of auxiliary treatment units and coupled to said processing means, wherein said processing means activates said cotton diversion means to divert cotton to flow through each of said plurality of auxiliary treatment units in said set and wherein said processing means deactivates said cotton diversion means to bypass each of said plurality of auxiliary treatment units not in said set.

21. The control system of claim 20, further comprising:
    second measuring means coupled to said processing means, said second measuring means measuring lint cleaner sensor data that correspond to color, moisture content, and trash content of the cotton as it enters a lint cleaning stage that contains a plurality of lint cleaners, wherein said processing means processes said lint cleaner sensor data and selects a set of lint cleaners through which the cotton is processed to produce lint, said set of lint cleaners corresponding to an optimum lint cleaning sequence that maximizes revenue from the lint, wherein said processing means activates said cotton diversion means to divert cotton to flow through each of said plurality of lint cleaners in said set and wherein said processing means deactivates said cotton diversion means to bypass each of said plurality of lint cleaners not in said set.

22. The control system of claim 21, wherein said cotton diversion means for each of said plurality of lint cleaners comprises:
   a supply valve for controlling flow of cotton through a supply conduit connecting said lint cleaner to the duct at a supply connection location;
   a return valve for controlling flow of cotton through a return conduit connecting said lint cleaner to the duct at a return connection location downstream from said supply connection location; and
   a duct valve for controlling flow of cotton through the duct, said duct valve disposed between said supply connection location and said return connection location.

23. The control system of claim 22, wherein said processing means activates said cotton diversion means by closing said duct valve while substantially simultaneously opening said supply valve and said return valve.

24. The control system of claim 23, wherein said processing means deactivates said cotton diversion means by opening said duct valve while substantially simultaneously closing said supply valve, and then closing said return valve after a pre-determined time delay.

25. The control system of claim 21, further comprising:
   third measuring means coupled to said processing means for measuring color, moisture content, and trash content of the lint after processing by said set of auxiliary treatment units.

26. The computer program product of claim 6, wherein said gin decision matrix generating means comprises an algorithm for each gin machine in said optimum gin machine sequence, wherein said algorithm quantifies the effect of that gin machine on leaf trash (LF), moisture content (M), reflectance (RD), turnout (TO), length (LN), and +b (PB), wherein coefficients for said algorithm are determined as a function of said error and said second error.

27. A control system for controlling the processing of lint through a mill, the mill having a plurality of auxiliary treatment units and a duct through which lint flows, said control system comprising:
   measuring means for measuring sensor data that correspond to color, moisture content, and trash content of the lint;
   processing means coupled to said measuring means, said processing means processing said sensor data and selecting a set of said plurality of auxiliary treatment units through which the lint is processed to produce lint of a predetermined quality, said set corresponding to an optimum mill machine sequence; and
   lint diversion means coupled to each of said plurality of auxiliary treatment units and coupled to said processing means, wherein said processing means activates said lint diversion means to divert lint to flow through each of said plurality of auxiliary treatment units in said set and wherein said processing means deactivates said lint diversion means to bypass each of said plurality of auxiliary treatment units not in said set.

28. The control system of claim 27, further comprising:
   second measuring means coupled to said processing means, said second measuring means measuring sensor data that correspond to color, moisture content, and trash content of the lint as it enters a second cleaning stage, wherein said processing means processes said sensor data and selects a set of cleaners in said second cleaning stage through which the lint is processed, said set of cleaners corresponding to an optimum cleaning sequence that maximizes quality of the lint, wherein said processing means activates said lint diversion means to divert lint to flow through each of said set of cleaners and wherein said processing means deactivates said lint diversion means to bypass cleaners not in said set.

29. The control system of claim 27, wherein said lint diversion means for each of said plurality of auxiliary treatment units comprises:
   a supply valve for controlling flow of lint through a supply conduit connecting said auxiliary treatment unit to the duct at a supply connection location;
   a return valve for controlling flow of lint through a return conduit connecting said auxiliary treatment unit to the duct at a return connection location downstream from said supply connection location; and
   a duct valve for controlling flow of lint through the duct, said duct valve disposed between said supply connection location and said return connection location.

30. The control system of claim 29, wherein said processing means activates said lint diversion means by closing said duct valve while substantially simultaneously opening said supply valve and said return valve.

31. The control system of claim 30, wherein said processing means deactivates said lint diversion means by opening said duct valve while substantially simultaneously closing said supply valve, and then closing said return valve after a pre-determined time delay.

* * * * *